United States Patent
Agarwal et al.

(10) Patent No.: US 12,099,428 B1
(45) Date of Patent: Sep. 24, 2024

(54) MULTIPLE MODALITIES OF DATA COLLECTION AND ANALYSIS FOR REAL-TIME MONITORING (RUM) IN A MICROSERVICES-BASED ARCHITECTURE

(71) Applicant: SPLUNK INC., San Francisco, CA (US)

(72) Inventors: Mayank Agarwal, Mountain View, CA (US); Jonathan Dillman, San Jose, CA (US); Rahul Gidwani, Oakland, CA (US); Justin Smith, San Francisco, CA (US); Joshua Walters, Irvine, CA (US)

(73) Assignee: SPLUNK Inc., San Francisco, CA (US)

( * ) Notice: Subject to any disclaimer, the term of this patent is extended or adjusted under 35 U.S.C. 154(b) by 628 days.

(21) Appl. No.: 17/162,607

(22) Filed: Jan. 29, 2021

(51) Int. Cl.
  *G06F 11/34* (2006.01)
  *G06F 11/30* (2006.01)
  *G06F 16/2455* (2019.01)
  *G06F 16/28* (2019.01)

(52) U.S. Cl.
  CPC ........ *G06F 11/3438* (2013.01); *G06F 11/302* (2013.01); *G06F 16/24556* (2019.01); *G06F 16/285* (2019.01)

(58) Field of Classification Search
  None
  See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,375,370 B2 | 2/2013 | Chaar et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |

(Continued)

FOREIGN PATENT DOCUMENTS

CN 109656792 A 4/2019

OTHER PUBLICATIONS

Splunk Enterprise 8.0.0 Overview, available online, retrieved May 20, 2020 from docs.splunk.com.

(Continued)

*Primary Examiner* — Amresh Singh
(74) *Attorney, Agent, or Firm* — Kilpatrick Townsend & Stockton LLP

(57) ABSTRACT

A method of persisting and querying Real User Monitoring (RUM) data comprises grouping together spans associated with a user-interaction with a webpage or application that are ingested during a given time duration. The method also comprises generating one or more data sets each associated with an analysis modality using the grouped spans, wherein each analysis modality extracts a different level of detail from the spans. Further, the method comprises selecting, based on a first user query, a first analysis modality for generating a response to the first user query and accessing a data set that is associated with the first analysis modality. The method also comprises generating the response to the first user query using the data set associated with the first analysis modality, wherein the first user query requests information pertaining to a performance of the application in response to the user-interaction.

20 Claims, 34 Drawing Sheets

(56) References Cited

U.S. PATENT DOCUMENTS

| | | | |
|---|---|---|---|
| 11,283,900 | B2 | 3/2022 | Myers et al. |
| 11,329,905 | B1 | 5/2022 | Pangeni et al. |
| 11,360,881 | B2 | 6/2022 | Gardner et al. |
| 11,762,759 | B1 | 9/2023 | Agarwal et al. |
| 2002/0087949 | A1 | 7/2002 | Golender et al. |
| 2008/0127108 | A1* | 5/2008 | Ivanov ............... G06F 11/3476 717/128 |
| 2014/0215443 | A1 | 7/2014 | Voccio et al. |
| 2016/0098342 | A1 | 4/2016 | Faizanullah et al. |
| 2017/0242784 | A1 | 8/2017 | Heorhiadi et al. |
| 2018/0089287 | A1 | 3/2018 | Haggie et al. |
| 2018/0136931 | A1 | 5/2018 | Hendrich et al. |
| 2018/0144064 | A1* | 5/2018 | Krasadakis ........ G06F 16/90332 |
| 2018/0150383 | A1* | 5/2018 | Alaranta ............. G06F 11/3636 |
| 2019/0098106 | A1 | 3/2019 | Mungel et al. |
| 2021/0232485 | A1 | 7/2021 | Agarwal et al. |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Thalheim , et al., "Sieve: Actionable Insights from Monitored Metrics in Distributed Systems", Proceedings of the 18th ACM/IFIP/USENIX Middleware Conference, 2017, 17 pages.

Zheng , et al., "A Detailed and Real-time Performance Monitoring Framework for Blockchain Systems", Proceedings of the 40th International Conference on Software Engineering: Software Engineering in Practice, 2018, pp. 134-143.

Akbulut , et al., "Performance Analysis of Microservices Design Patterns", IEEE Internet Computing, vol. 23, No. 6, Available Online at: https://people.engr.ncsu.edu/hp/papers/Akhan2.pdf, Nov. 4, 2019, pp. 1-6.

Al-Masri , "Enhancing the Microservices Architecture for the Internet of Things", IEEE International Conference on Big Data (Big Data), Dec. 10-13, 2018, pp. 5119-5125.

Amaral , et al., "Performance Evaluation of Microservices Architectures Using Containers", IEEE 14th International Symposium on Network Computing and Applications, Sep. 30, 2015.

Barakat , "Monitoring and Analysis of Microservices Performance", Journal of Computer Science and Control Systems, vol. 10, No. 1, May 2017, pp. 19-22.

Coulson, et al., "Adaptive Microservice Scaling for Elastic Applications", IEEE Internet of Things Journal, vol. 7, No. 5, Jan. 7, 2020, pp. 4195-4202.

EP21705770.2 , "Office Action", Aug. 16, 2023, 3 pages.

Jha , et al., "A Holistic Evaluation of Docker Containers for Interfering Microservices", IEEE International Conference on Services Computing (SCC), Jul. 7, 2018.

Jindal , et al., "Performance Modeling for Cloud Microservice Applications", Proceedings of the 2019 ACM/SPEC International Conference on Performance Engineering, Available Online at: https://research.spec.org/icpe_proceedings/2019/proceedings/p25.pdf, Apr. 7-11, 2019, pp. 25-32.

Khazaei , et al., "Efficiency Analysis of Provisioning Microservices", IEEE International Conference on Cloud Computing Technology and Science (CloudCom), Dec. 15, 2016, pp. 261-268.

Kistowski , et al., "Teastore: A Micro-Service Reference Application for Benchmarking, Modeling and Resource Management Research", Institute of Electrical and Electronics Engineers 26th International Symposium on Modeling, Analysis, and Simulation of Computer and Telecommunication Systems (MASCOTS), 2018, 14 pages.

PCT/US2021/014348 , "International Search Report and Written Opinion", Apr. 16, 2021, 9 pages.

\* cited by examiner

| from service name | to service name | from span.kind | to span.kind | from region | to region | Request count |
|---|---|---|---|---|---|---|
| Service A | Service B | client | server | us-west | us-east | 2 |
| Service A | Service B | client | server | us-west | us-west | 1 |

1490 points to the first data row; 1492 points to the second data row.

FIG. 14

Node_Health Exemplars:

| svc_name | env | pod | code | operation | trace_ids | Exemplar type |
|---|---|---|---|---|---|---|
| frontend | prod | frontend-d aliuytgq-d d58f | 200 | /product | "ff0558ae875 a250e" | request |
| product catalog service | prod | productcat alongservi ce-18iodsf h27-r234t | 200 | /GetProduct | "ff0558ae875 a250e" | request |

Edge_Health Exemplars:

| from service name | to service name | from pod | to pod | from operation | to operation | trace_ids | Exemplar type |
|---|---|---|---|---|---|---|---|
| frontend | product catalog service | front end-d aliuy tgq -dd58f | product catalog service-18iodsfh 27-r234t | /Product | /GetProduct | "ff0558ae875 a250e" | request |

FIG. 15C

MULTIPLE MODALITIES OF DATA COLLECTION AND ANALYSIS FOR REAL-TIME MONITORING (RUM) IN A MICROSERVICES-BASED ARCHITECTURE

BACKGROUND

Computer systems may run applications or services that are provided via a server or cloud computing environment. A client computer system may send a request to a server that retrieves application installation files in an underlying database. The applications or services may be developed and deployed as a single unit or as multiple units, such as a collection of microservices. Applications that are developed as a single unit may be monolithic applications that include a user interface and data access codes combined into a single program from a single platform. Monolithic applications are self-contained and independent from other computing applications. With the advent of cloud computing, however, these large centralized monolithic systems are being decoupled and distributed to address scalability needs and to allow companies to deliver value faster.

Microservices or a "microservices architecture" are used in a software development method wherein software applications are developed as a suite of independently deployable smaller cooperating services. The cooperating services run processes and communicate to serve a business goal to form an enterprise application. More specifically, in a microservices architecture, an application is developed as a collection of small services; each service implements business capabilities, runs in its own process and communicates via Application Program Interfaces ("APIs"), e.g., hypertext transfer protocol (HTTP) APIs, or messaging. Each microservice may be deployed, upgraded, scaled and restarted independent of other services in the application, typically as part of an automated system, enabling frequent updates to live applications without impacting end customers.

With the rise of cloud native applications, e.g., Software as a Service (SaaS) applications, which include microservices, there has been a shift in the manner in which software is built and deployed, and also in the manner in which it is monitored and observed. Microservices-based applications have to operate within environments of dramatically increased complexity and many more layers of abstraction compared to previous generations of monolithic applications. Compared to monolithic applications, microservices architectures generally introduce complexity in network communication, feature short lifecycles and require resiliency in dynamic environments.

Diligent application performance monitoring (APM) is needed on the part of developers of microservices-based applications to ensure that their software delivers a steady baseline of performance. APM typically involves carefully managing the performance, availability and user experience of software applications, in particular micro-served based applications deployed in a cloud computing environment. Using APM-based tools, software developers for microservices-based applications monitor different aspects of the software they develop by instrumenting the software. These aspects include performance of the software, disk utilization of the software, CPU utilization of the software, errors encountered during execution of the software, significant events encountered during execution of the software, information describing which parts of code are being executed and which parts are not being executed, among others. After development, similar aspects of the software are also monitored during production, such as when software is being executed in a cloud architecture.

Conducting APM effectively involves not only monitoring the services deployed on the backend of a cloud computing environment but also monitoring service quality delivered by, for example, the frontend of an application or website (e.g., for a SaaS application). A critical aspect of APM involves gauging user experience, including key metrics such as the load time of a particular website. Real User Monitoring (RUM) (also referred to as real user measurement or end-user experiencing monitoring) is a type of passive performance monitoring that captures and analyzes each transaction by users of a website or an application (e.g., a cloud-based microservices-based application). Monitoring actual user interaction with a website or an application is important to operators (e.g., site reliability engineering teams or developer teams of a website or a cloud-based application) to determine if users are being served quickly and without errors and, if not, which part of a business process is failing. SaaS and application service providers use RUM to monitor and manage service quality delivered to their clients and to detect errors or slowdowns on web sites. The data may also be used to determine if changes that are propagated to sites have the intended effect or cause errors.

As companies begin to increasingly rely on cloud native applications and microservices architectures, they run into operational complexity and struggle to efficiently monitor their environments. Performance monitoring for cloud-based applications is complicated because it involves monitoring many micro-transactions both on the frontend and the backend, where the transactions are handled by a variety of hosts, containers and infrastructure platforms.

One of the challenges associated with performance monitoring, for example, is providing a developer of a website, or cloud-based application, end-to-end visibility into the performance of the website or application for trouble-shooting purposes. Providing a unified view that allows for end-to-end performance visibility is challenging, in part, because of the significant amounts of data (e.g., span data, trace data, etc.) generated by both the frontend (e.g., the website) or the backend (e.g., a database on the backend) in an application owner's architecture, and using the data efficiently to provide a developer with insights into the performance of a website or application or to detect problematic conditions associated with, for example, browser performance, network performance, erroneous processes, failing services, etc. Further, providing a unified monitoring view for diagnosing problems and troubleshooting can be complex because it requires establishing a link between the manner in which backend problems surface (or present themselves) at the frontend, and vice versa.

Another challenge with respect to performance monitoring, for example, is efficiently ingesting and aggregating significant amounts of span and trace data generated by various frontend websites or applications and also backend services in an application owner's architecture. Traditional monitoring and troubleshooting tools, designed as symptom-based solutions with single purpose capabilities, are simply unable to keep up with tracking the performance of dynamic cloud native applications and analyzing the significant amounts of span and trace data they generate. Thus, systems that can efficiently and accurately conduct performance monitoring for websites and cloud-based applications, and further aggregate the collected information in a meaningful way, are the subject of considerable innovation.

BRIEF DESCRIPTION OF THE DRAWINGS

In the drawings:

FIG. 14 is a table illustrating an exemplary manner in which selected tags for each service in a cross-service span pair may be mapped to tag attributes and stored as part of a memory-resident data object associated with an edge in the service graph, in implementations according to the present disclosure.

FIG. 15C illustrates the manner in which data in the metric events modality is persisted using an edge data object comprising a memory-resident table of extracted indexed tag attributes with associated Trace IDs and using a node data object comprising a memory-resident table of extracted tags with associated Trace IDs, in implementations according to the present disclosure.

DETAILED DESCRIPTION

Figure 1A:
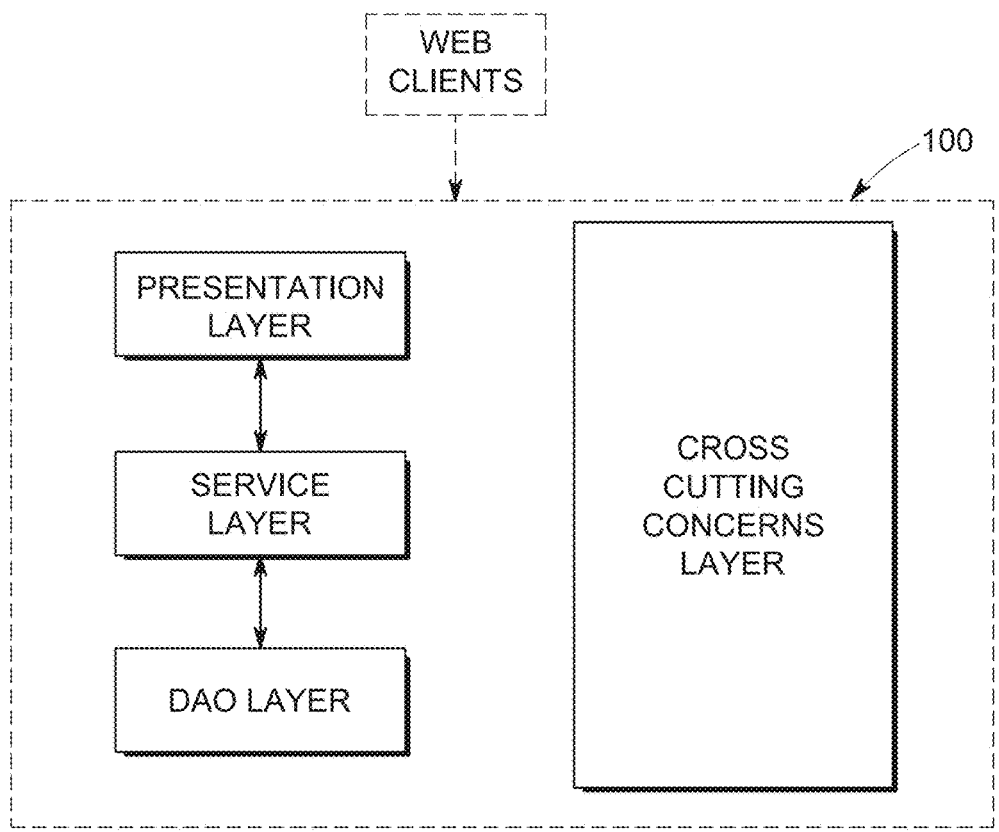
FIG. 1A illustrates an exemplary monolithic multi-layer architecture.

Implementations are described herein according to the following outline:
1.0 Terms
2.0 General Overview
3.0 Data Collection
    3.1 Logs, Traces and Metrics
4.0 Multiple Modalities for Performing Application Performance Monitoring (APM)
    4.1 Metric Time Series
        4.1.1 Generating Metric Data Streams Using Span Identities
        4.1.2 Real-Time Monitoring Using Metric Time Series Data
    4.2 Metric Events
        4.2.1 Metric Events Data Generation and Persistence
    4.3 High-Fidelity Data
5.0 Multiple Modalities for Performing Real User Monitoring (RUM)
    5.1 End-to-End Visibility of a Real User Session
    5.2 Connecting Frontend RUM-related Spans with Backend APM-related Traces
        5.2.1 Rendering a Service Graph to Illustrate Page Provider Dependencies at an Aggregate Level
        5.2.2 Rendering a Service Graph to Illustrate Page Provider Dependencies at Query Time Using Exemplars
6.0 Seamless Navigation Between Modes 1.0 TERMS The term "trace" as used herein generally refers to a record of the manner in which a single user request, also referred to as a transaction, propagates from one microservice (hereinafter interchangeably referred to as "service") to the next in a distributed application. A transaction is generally described as an end-to-end request-response flow, from the making of the user's initial request to receiving the final response. A transaction often involves the interaction of multiple services. A trace is a record of a transaction and each trace may be identified using a unique trace identifier ("Trace ID"). The trace follows the course of a request or transaction from its source to its ultimate destination in a distributed system. In one implementation, a trace may be conceptualized as a highly dimensional structured log that captures the full graph of user-generated and background request execution within an application, and includes valuable information about interactions as well as causality.

The term "span" as used herein generally refers to the primary building block of a trace, representing an individual unit of work done in a distributed system. A trace is composed of one or more spans where a span represents a call within the request. It is appreciated that a call may be to a separate microservice or a function within a microservice. The trace represents the work done by each microservice which is captured as a collection of linked spans sharing the same unique Trace ID. Each component of the distributed system may contribute a span—a named, timed operation representing a piece of the workflow. A span may also include a unique span ID, a service name (e.g., "analytics"), an operation name (e.g., "start"), duration (latency), start and end timestamps and additional annotations and attributes (e.g., tags such as key:value pairs). The annotations and attributes can describe and contextualize the work being done under a span. For example, each span may be annotated with one or more tags that provide context about the execution, such as the client instrumenting the software, a document involved in the request, an infrastructure element used in servicing a request, etc.

The term "tags" as used herein generally refers to key:value pairs that provide further context regarding the execution environment and enable client-defined annotation of spans in order to query, filter and comprehend trace data. Tag information is typically included with each span and there may be different levels of tag information included in a span. Tag information (including the 'key' and corresponding 'value') is typically included with each span and there may be different levels of tag information included in a span.

"Global tags" generally represent properties of a user-request (e.g., tenant name, tenant level, user location, environment type, etc.) and may be extracted from any span of the trace based on configured rules. A global tag for a particular span in a trace may be attributed to the other spans in a trace, because each span within a single trace may comprise the same global attributes. For example, if one span within a trace comprises a tag relating it to a request from a "gold" level "tenant," it may be inferred that other spans in the same trace are associated with the same request and, accordingly, from the same "gold" level "tenant." Consequently, the "tenant:gold" key-value pair or tag may be attributed to the other spans in the same trace.

"Span-level tags" comprise attributes that are specific to a particular span.

The term "root span" as used herein generally refers to the first span in a trace. A span without a parent is called a root span.

The term "child span" as used herein generally refers to a span that follows a root span, including a child of a child.

The term "parent span" as used herein generally refers to a span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user-request into a trace.

A "metric" as used herein generally refers to a single quantifiable measurement at a specific point in time. Combining the measurement with a timestamp and one or more dimensions results in a metric data point. A single metric data point may include multiple measurements and multiple dimensions. Metrics are used to track and assess the status of one or more processes. A metric typically comprises a numeric value that is stored as a timeseries. A timeseries is a series of numeric data points of some particular metric over time. Each time series comprises a metric plus one or more tags associated with the metric. A metric is any particular piece of data that a client wishes to track over time.

2.0 GENERAL OVERVIEW

One of the fundamental shifts in modern day computing has been the shift from monolithic applications to microservices-based architectures. As previously mentioned, this is the shift from an application being hosted together (e.g., on a single system) to each piece of an application being hosted separately (e.g., distributed). FIG. 1A illustrates an exemplary monolithic multi-layer architecture. A monolithic application is traditionally built as a single unit. The monolithic application consists of a single self-contained unit in which code exists in a single codebase 100 and in which modules are interconnected. At deployment time, the entire codebase is deployed and scaling is achieved by adding additional nodes.

Figure 1B:
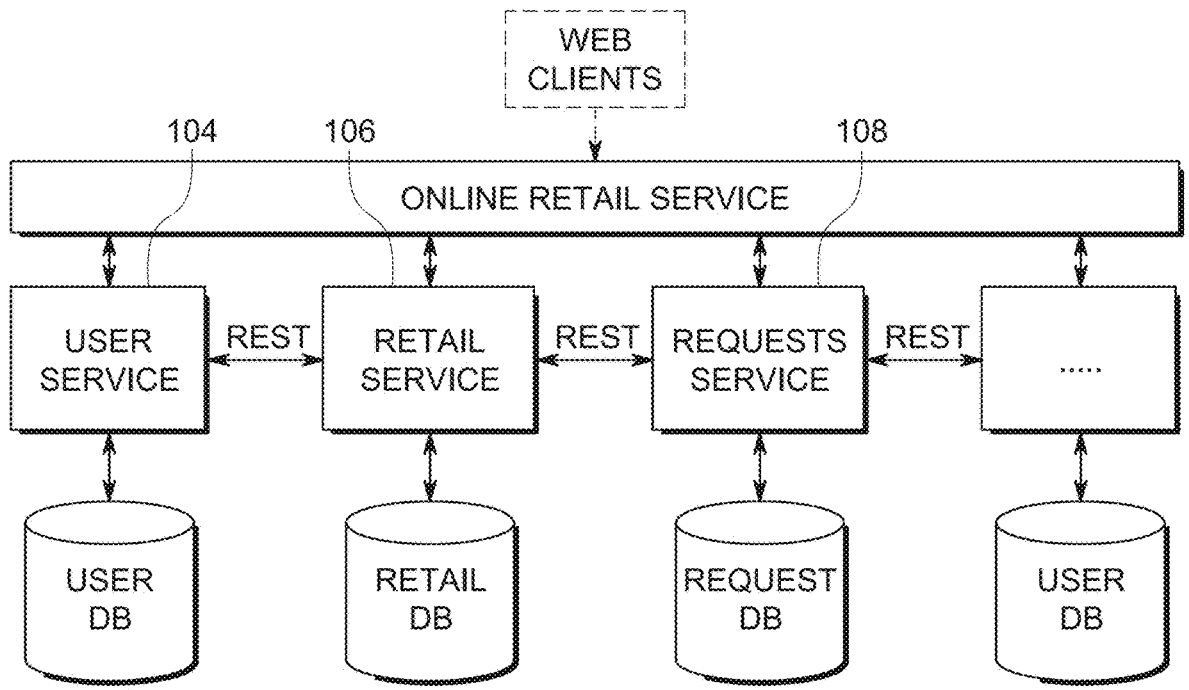
FIG. 1B illustrates an exemplary microservices architecture.

FIG. 1B illustrates an exemplary microservices architecture. A microservices architecture involves the building of modules (e.g., modules 104, 106 and 108) that address a specific task or business objective. As a result, these modules tend to exhibit low coupling and high cohesion. A microservices architecture is often achieved by decoupling a monolithic application into independent modules that each include the components necessary to execute a single business function. These services typically communicate with each other using language agnostic Application Programming Interfaces ("APIs") such as Representational State Transfer (REST).

Microservices were created in order to overcome the issues and constraints of monolithic applications. Monolithic applications have a tendency to grow in size over time. As applications become larger and larger, the tight coupling between components results in slower and more challenging deployments. Because of the tight coupling, the potential for a failure of the entire application due to a recently deployed feature is high. In some cases, deployments may take several months to a year, greatly reducing the number of features that may be rolled out to users. This tight coupling also makes it difficult to reuse and replace components because of the effect they may have on other components throughout the application.

Microservices address these issues by being small in scope and modular in design. Modular design results in components being loosely coupled, which offers enormous benefits from the standpoint of being both fault tolerant and independently deployable. This results in functionality that may be frequently deployed and continuously delivered. The attribute of loosely coupled modules without a central orchestrator in a microservices architecture, however, leads to considerable challenges in terms of monitoring, troubleshooting and tracking errors.

These challenges have led to the rise of observability, a new generation of monitoring, the foundation for which is built, in part, on distributed tracing. Distributed tracing, also called distributed request tracing, is an application performance monitoring (APM) method used to profile and monitor applications, especially those built using a microservices architecture. Distributed tracing helps pinpoint where failures occur and what causes poor performance. Distributed tracing, as the name implies, involves tracing user requests through applications that are distributed. A trace represents a single user request, also referred to as a transaction, and represents the entire lifecycle of a request as it traverses across the various services or components of a distributed system.

While distinct from the methodologies employed for APM, real user monitoring (RUM) is considered one of the critical strategies employed for performance monitoring by focusing on the manner in which end users' experiences might inform application optimization strategies. RUM surfaces meaningful diagnostic information on frontend performance so developers can optimize frontend code and deliver the best possible user experience. APM meanwhile typically monitors the performance of server-side code and offers detailed insight on improving it to reduce infrastructure costs and creating faster applications for users.

RUM utilizes data related to the end users' experiences to help developers track and improve a website or application's performance. RUM focuses on measuring the experience of real users of a website or an application. It does this by tracking and reporting on several metrics including time-to-first-byte, full page load time, load time of specific elements, DNS timing, transaction paths, JavaScript errors, etc. With RUM, real user data can be tracked across browser versions, operating systems and end-user configurations. Tracking real users allows RUM to provide critical real-world measurements and helps developers identify whether certain user engagements or activities are triggering a lag in performance or causing errors. RUM, therefore, contributes to successful performance monitoring by analyzing how the end users' experiences might inform application-optimization strategies.

RUM-based and APM-based methods together monitor the speed at which both frontend and backend transactions are performed both by end-users and by the systems and network infrastructure that support a software application, providing an overview of potential bottlenecks and service interruptions. This typically involves the use of a suite of software tools—or a single integrated SaaS or on-premises tool—to view and diagnose an application's speed, reliability, and other performance metrics to maintain an optimal level of service.

Computing operations of instrumented software may be described by spans and traces. The spans and traces are produced by various instrumented services in an architecture and are communicated to an analysis system that analyzes the traces and spans to enable a software developer to monitor and troubleshoot the services within their software.

Figure 2A:
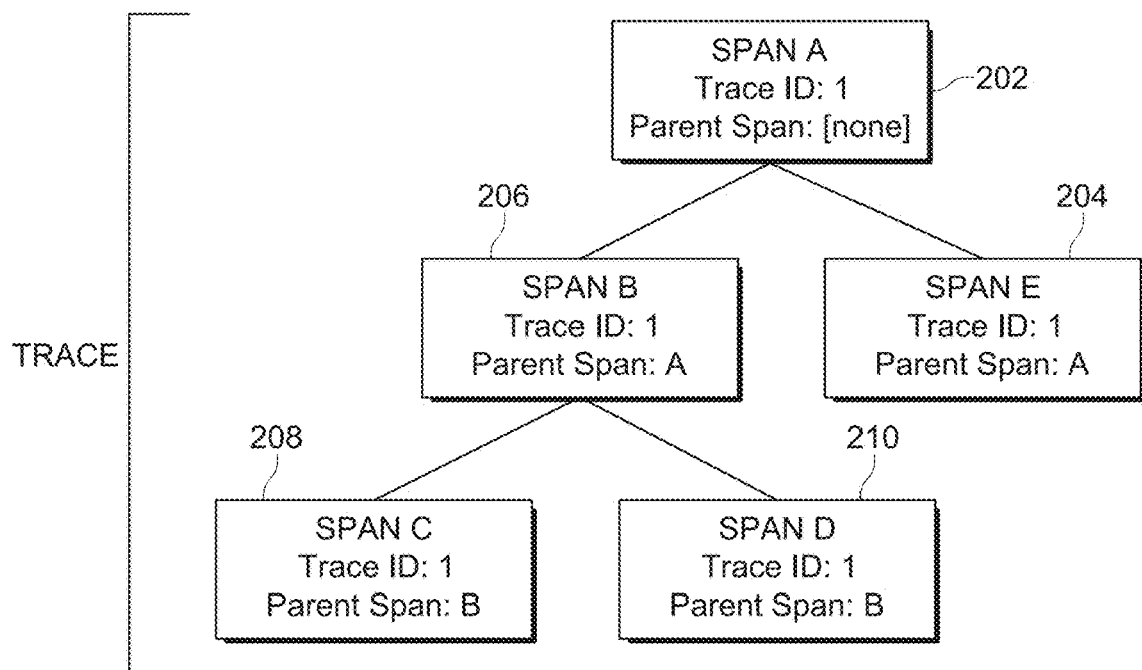
FIG. 2A illustrates an exemplary trace tree.

FIG. 2A illustrates an exemplary trace tree. The first span in the trace tree, Span A 202, is known as the root span. A trace tree typically comprises a root span, which is a span that does not have a parent. It may be followed by one or more child spans. Child spans may also be nested as deep as the call stack goes. Span B 206 and Span E 204 are child spans of the parent span, Span A. Further, Span C 208 and Span D 210 are child spans of the parent Span B 208.

Figure 2B:
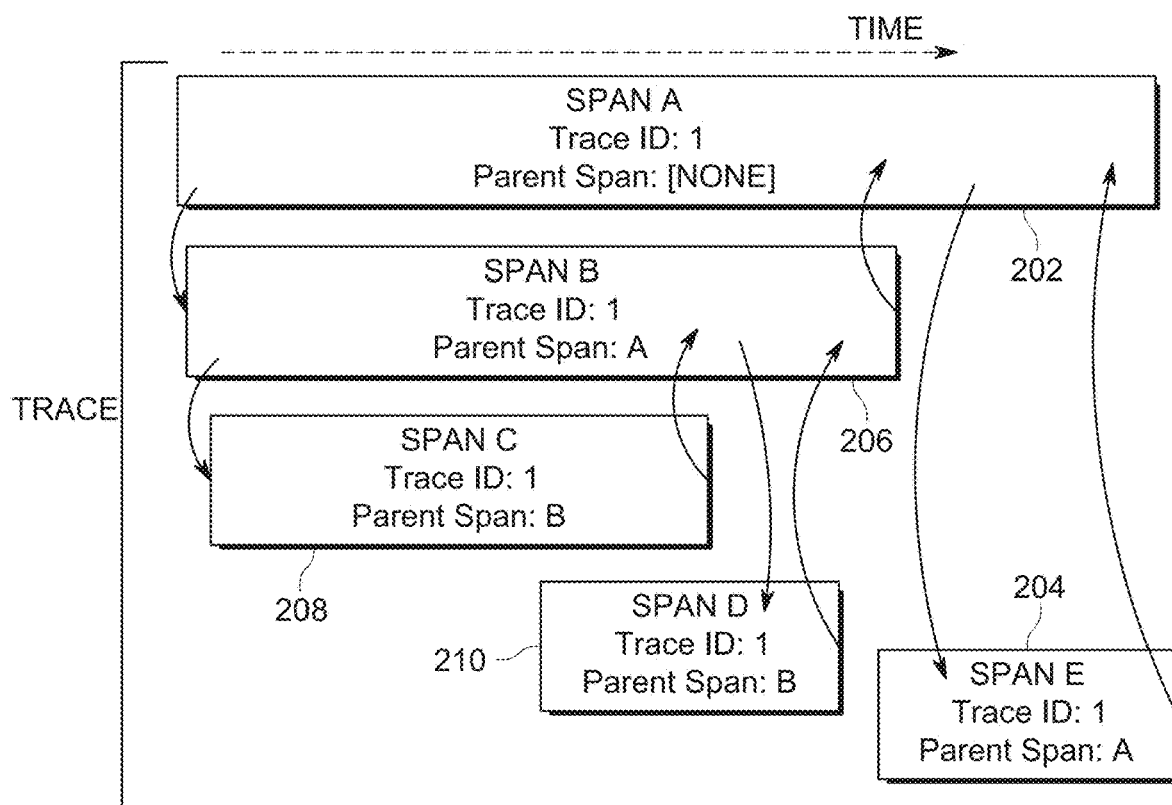
FIG. 2B illustrates an alternate view of the trace from FIG. 2A adjusted for timeline.

FIG. 2B illustrates an alternate view of the trace from FIG. 2A adjusted for timeline. The trace starts with the Span A 202, the root span, where the request starts. When the trace starts, a Trace ID is generated (e.g., Trace ID: 1 as shown in FIG. 2B), which follows the request as it propagates through the distributed system. A new span is generated for each logical chunk of work in the request, where the new span includes the same Trace ID, a new Span ID and a Parent Span ID, which points to the span ID of the new span's logical parent. The Parent Span ID creates a parent-child relationship between spans.

A given request typically comprises one span (e.g., the root Span A 202) for the overall request and a child span for each outbound call made to another service, database, or a function within the same microservice etc. as part of that request. For example, in the example of FIG. 2B, the Span A 202 is the root span for the overall request and generates several child spans to service the request. The Span A 202 makes a call to the Span B 206, which in turn makes a call to the Span C 208, which is a child span of the Span B 206. The Span B 206 also makes a call to the Span D 210, which is also a child span of the Span B 206. The Span A 202 subsequently calls the Span E 204, which is a child span of the Span A 202. Note, that the spans in a given trace comprise the same Trace ID. The Trace ID along with the Parent Span ID may be used to consolidate the spans together into a trace.

3.0 DATA COLLECTION

Distributed tracing data is generated through the instrumentation of browsers, microservices-based applications, libraries and frameworks. Software may be instrumented to emit spans and traces. The spans and traces may be generated according to an industry standard, such as the OpenTracing standard. Other common open source instrumentation specifications include OPENTELEMETRY and OpenCensus. Each span may be annotated with one or more tags that provide context about the execution, such as the client instrumenting the software, a document involved in the request, an infrastructure element used in servicing a request, etc.

The instrumentation handles the creating of unique session IDs, trace and span IDs, tracking duration, adding metadata and handling context data. Handling context data, also known as context propagation is critical and is responsible for passing context (e.g. Trace ID) between function/microservice calls, thereby, enabling an observer to view the entire transaction at each step along the way. Context propagation may, for example, be based on REST. REST is header-based and requires a transaction to pass headers between service-to-service calls. In order to work properly, services within a request use the same context propagation format. Once the code has been instrumented and context propagation has been implemented using a standard format, the trace data generated by the services may be collected and analyzed to monitor and troubleshoot the microservices-based applications generating the trace data.

Figure 3:
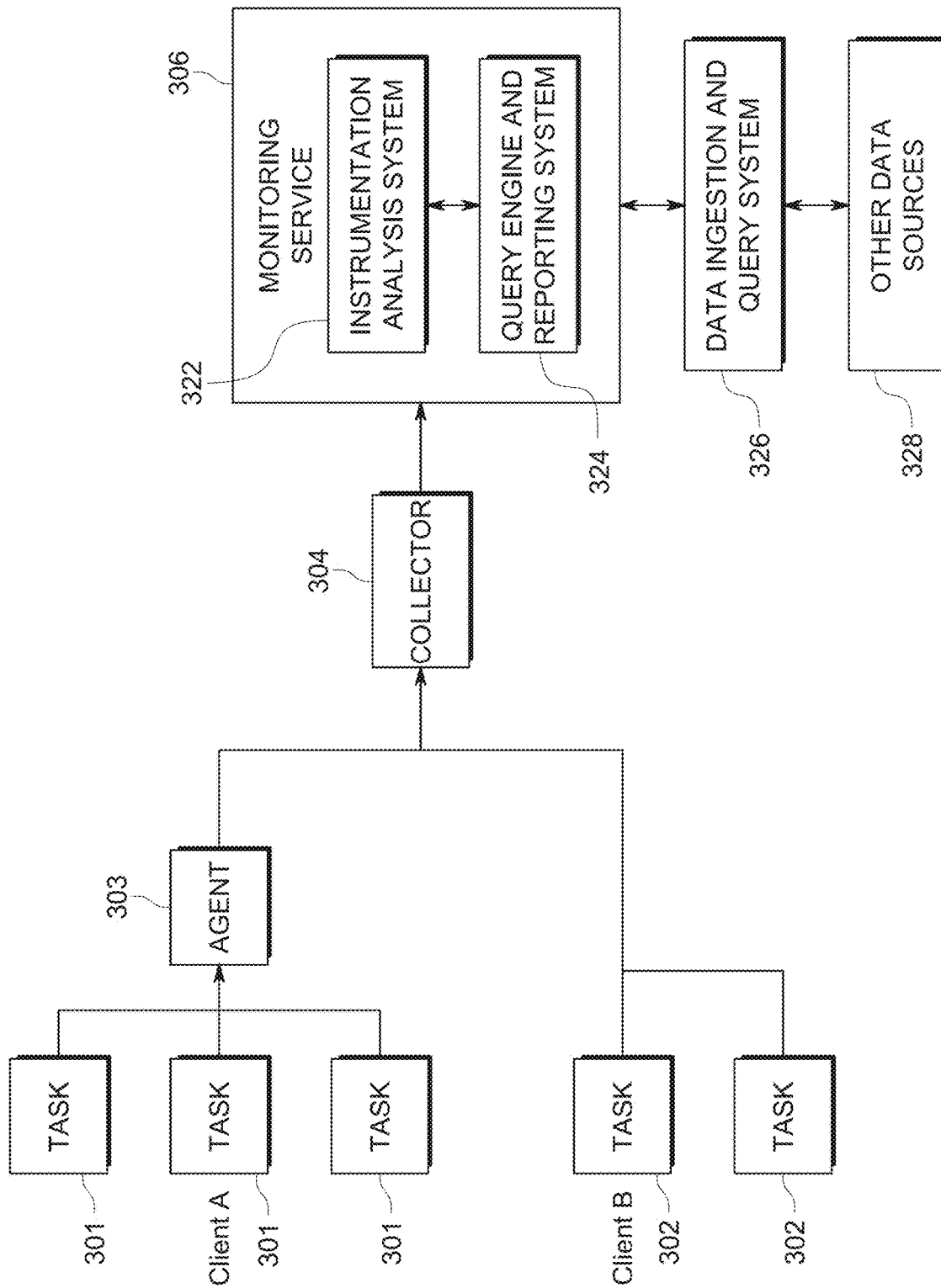
FIG. 3 is a flow diagram that illustrates the manner in which trace data may be collected and ingested for further analysis within a computer system, in accordance with implementations of the monitoring service disclosed herein.

FIG. 3 is a flow diagram that illustrates the manner in which trace data may be collected and ingested for further analysis within a computer system, in accordance with an implementation of the monitoring service disclosed herein. Tasks 301 represent client applications that execute within a client data center for Client A. Similarly, tasks 302 represents client applications that execute within a client data center for Client B. The tasks 301 or 302 may comprise services or applications within a client's on-premises ("on-prem") software. Alternatively, they may comprise services or applications running in the cloud computing environment, e.g., in an AMAZON WEB SERVICES (AWS) Virtual Private Cloud (VPC).

The tasks 301 and 302 may be instrumented using open source or common commercial tracing libraries, from tracing applications (e.g., Jaeger or Zipkin), in-house formats, or auto-instrumentation. Each task may be configured to generate spans that describe the processing of a portion of a request as the request traverses through the various tasks (or services) on the client-side.

It should be noted that while the tasks 301 and 302 may comprise instrumented application software, the techniques disclosed herein are not limited to application software but are applicable to other kinds of software, for example, server software, software executing on customer devices, websites and so on. Furthermore, a client device (e.g., a device at a data center for Client A or Client B) may include any computing system that is configured to execute instrumented software, whether or not it is used for development of improved software. For example, the client device may be a computing system used for testing purposes, staging purposes, or any production system executing in an enterprise.

An agent 303 is typically configured at the client-side host or service for receiving spans collected from the various tasks on the client-side and transmitting the spans to a collector 304. An agent may receive generated spans locally using, for example, User Datagram Protocol (UDP). The tasks 302 may comprise instrumented tasks that are not using an agent and may be configured to span directly to the collector 304. The tasks may include various front-end tasks such as those performed by a web browser running on a client's computer. While spans may be collected from the client-side tasks without configuring an agent (e.g., in the case of Client B), using an agent may provide benefits including batching, buffering and updating trace libraries.

Batches of span data collected by the agent 303 are periodically received at the collector 304. The collector may be implemented within a client's on-prem software or in the cloud computing environment (e.g., in an AWS VPC). The collector 304 may also, for example, be implemented in a cloud computing environment by the same entity as the one implementing monitoring service 306. Traces often generate duplicative data that is not relevant for monitoring or troubleshooting. The collector 304 may avoid redundancies by sampling the data before processing and storing it. The collector 304 runs the span data through a processing pipeline and may store it in a specified storage or analytics backend such a monitoring service 306. It should be noted that the collector 304 may interact with the monitoring service 306 through a network (not shown).

In an implementation, the collector 304 may consolidate data from several client devices and combine the data to send to the monitoring service 306 (e.g., without sampling). For example, the collector 304 may comprise a server that receives data streams internally from different client devices and, periodically, sends the combined data (in batch form) to the monitoring service 306. The data streams may comprise trace related or metrics information. This improves efficiency of external communications from the enterprise.

In one implementation, the collector 304 may comprise a beacon module 388 configured to collect all data associated with RUM sessions, e.g., users' browsing sessions, users' interactions with an application or data generated by users' web browsers, etc. The beacon module 388 may, for example, be configured to collect all the spans generated by browser instrumentation configured on a client's device or a client's web-browser. The beacon may, among other functions, enrich the spans generated at the frontend (e.g., by a browser) with additional information (e.g., with HTTP client's IP address) before forwarding the information to be ingested by the monitoring service 306. Note that the beacon module 388 may not necessarily be a component within the collector 304 but may also be implemented as a standalone module. Further note that similar to the collector 304, the beacon module 388 may be implemented within a client's on-prem software or in the cloud computing environment (e.g., in the same environment in which monitoring service 306 is implemented).

In an implementation, the monitoring service 306 receives and analyzes the span data for monitoring and troubleshooting purposes. It should be noted that, in addition to monitoring service 306, span and tracing data might also be simultaneously transmitted to other types of storage and monitoring back-end services, e.g., a data ingestion and query system 326.

In one implementation, the monitoring service 306 may be a Software as a Service (SaaS) based service offering. Alternatively, in another implementation, it may also be implemented as an on-prem application. The monitoring service 306 receives the observability data collected by the collector 304 and provides critical insights into the collected trace data to a client of the monitoring service, who may be an application owner or developer. In an implementation, the monitoring service 306 may be hosted on a computing system that includes one or more processors, memory, secondary storage and input/output controller. The computing system used for hosting the monitoring service 306 is typically a server class system that uses powerful processors, large memory resources and fast input/output systems.

The monitoring service 306 may comprise an instrumentation analysis system 322 (also referred to herein as an "analytics engine") and a query engine and reporting system 324. The instrumentation analysis system 322 receives data comprising, for example, trace information, span information and/or values of metrics sent by different clients. As noted previously, a task or software program may be instrumented to generate spans with a common field in their data structures to designate spans that are part of a common trace. For example, the spans may include a trace identifier such that spans with the same trace identifier are a part of the same trace.

The tasks (or software) executing on the client device are configured to send information generated as a result of instrumenting the software to the instrumentation analysis system 322 of the monitoring service 306. For example, the tasks may send span information collected from the various services at the client end to the instrumentation analysis system 322. Alternatively, traces may be sampled to generate metric values, and the tasks may send values corresponding to various metrics as they are generated to the instrumentation analysis system 322. The tasks may send group values of metrics periodically to the instrumentation analysis system 322. Different tasks may send the same metric or different metrics at different rates. The same task may send different metrics at different rates.

In an implementation, the tasks (e.g., tasks 301 and 302) and the collector 304 may send data to the monitoring service 306 by invoking an API supported by the monitoring service 306 and the instrumentation analysis system 322. In one implementation, a customer name may be specified for the instrumented software. The instrumented software includes the customer name when it identifies a data stream associated with that particular customer. The ability to associate a data stream with a customer allows the instrumentation analysis system 322 to perform customer specific analysis, for example, report on usages of systems for each customer, identify customers reporting more than a threshold number of errors and so on.

In one implementation, an application owner or developer may submit queries to the query engine and reporting system 324 to gain further insight into the spans and traces (or metrics) received and analyzed by the instrumentation analysis system 322. For example, the query engine and reporting system 324 within the monitoring service 306 may be configured to generate reports, render graphical user interfaces (GUIs) and/or other graphical visualizations to represent the trace and span information received from the various clients. The query engine and reporting system 324 may, for example, interact with the instrumentation analysis system 322 to generate a visualization, e.g., a histogram or an application topology graph (referred to interchangeably as a "service graph" herein) to represent information regarding the traces and spans received from a client. Alternatively, the query engine and reporting system 324 may be configured to respond to specific statistical queries submitted by a developer regarding one or more services within a client's application.

3.1 Logs, Traces and Metrics

As mentioned above, the shift from monolithic applications to microservices-based architectures has increased the usefulness of analyzing traces in a distributed system. In one or more implementations, the tracing data may be coupled with log data and/or metrics data, in order to provide clients with a more complete picture of the system. For example, the trace data may be coupled with log or other data from the data ingestion and query system 326. In one implementation the data ingestion and query system 326 may be comprised within the monitoring service 306.

One example of a data ingestion and query system 326 is the event-based data intake and query SPLUNK® ENTERPRISE system developed by Splunk Inc. of San Francisco, California. The SPLUNK® ENTERPRISE system is the leading platform for providing real-time operational intelligence that enables organizations to collect, index and search machine-generated data from various data sources 328, for example, websites, applications, servers, networks and mobile devices that power their businesses. In one implementation the other data sources 328 may be associated with the same clients (e.g., Client A and Client B) that generate the trace data received by the monitoring service 306.

The SPLUNK® ENTERPRISE system is particularly useful for analyzing data which is commonly found in system log files, network data and other data input sources. In another example, the data ingestion and query system 326 may be an on-premises application or based on a distributed or cloud-based service.

In one implementation, the trace data may be ingested into the data ingestion and query system 326, or may be coupled with outputs from the data ingestion and query system 326 e.g., from searches that may be based on trace data and run on the data ingestion and query system 326. In some implementations, the data ingestion and query system 326 described above may be integrated with or into the monitoring service 306 that analyzes trace data, e.g., the monitoring service 306. The monitoring service 306 may, accordingly, comprise a full suite of services including, for example, analyzing spans generated by users' browsing sessions and other frontend activities, analyzing trace data, generating metrics data from the trace data, ingesting and analyzing log data, ingesting metrics data and providing insights generated from the metrics data, including aggregating and/or correlating trace data, log data and metrics data, in order to gain insights into a computing platform.

As described above, the span, trace and other data received from the collector 304 may be sent to systems configured to ingest and search data, such as the data ingestion and query systems 326 described above. In some implementations data ingestion and query system 326 may be configured to generate metrics data from the trace data received from the collector 304. Additionally, other implementations may use a stream processor that may perform transformations and other operations on incoming data prior to, concurrently with, and/or as an alternative to, ingestion of the data. In some implementations, the system may also be configured to ingest metrics data and may be optimized to ingest, query and generate insights from metrics data.

In other implementations, metrics may be generated by instrumentation (e.g., from instrumenting client software and tasks, e.g., tasks 301, 302 etc. as described above) and sent to a SaaS-based processing system, e.g., the monitoring service 306. For example, software may be instrumented to send metrics to a gateway or to a instrumentation analysis engine, where metrics may be aggregated, queried and alerted.

As above, the trace data may be paired with data from the data ingestion and query system 326, metrics generated by instrumentation, and other data sources, and correlated in various ways to provide insights. For example, as a broad-based correlation example, the metrics data may be used in a thresholding comparison to determine that there is an issue that needs attention, the trace data may be used to determine which component or microservice requires attention, and log data from the data ingestion and query system 326 may be used to determine exactly why the component or microservice needs attention. Other correlations and uses for the combination of metrics data, log data and event data are also contemplated herein. As noted above, the various features and services may be provided within an integrated monitoring platform (e.g., the monitoring service 306), wherein the platform comprises, among other things, an instrumentation analysis system (e.g., the instrumentation analysis system 322), a query engine and reporting system (e.g., the query engine and reporting system 324) and a data ingestion and query system (e.g., the data ingestion and query system 326).

4.0 MULTIPLE MODALITIES FOR PERFORMING APPLICATION PERFORMANCE MONITORING (APM)

As noted previously, APM methods such as distributed tracing are used to profile and monitor applications, especially those built using a microservices architecture, at the backend of a website or application. Historically, there have been several challenges associated with implementing an analytics tool such as the monitoring service 306 within a heterogeneous distributed system. One of the challenges associated with APM for example, is efficiently ingesting and aggregating significant amounts of span and trace data generated by various services in an architecture. Conventional tracing and monitoring systems are typically unable to ingest the vast amounts of span and tracing data generated by clients' application and have to resort to sampling the data intelligently to reduce the volume of stored trace data. Using sampling exclusively, however, results in loss of data and, as a result, conventional monitoring tools do not allow clients access to all the traces generated by their application. Furthermore, conventional monitoring tools may calculate metrics (e.g., requests, errors, latency, etc.) based on the sampled set of data and, accordingly, the calculations may be approximate at best and inaccurate at worst.

Advantageously, implementations of the monitoring service (e.g. monitoring service 306) disclosed herein allow clients of the monitoring service the ability to ingest up to 100% of the spans and create streams of metric data using the ingested spans prior to consolidating the spans into traces (through a sessionization process). The metric time series provide valuable real-time information pertaining to services or endpoints within an application and also allow alerts to be configured to manage anomalous behavior on the endpoints.

Implementations of the monitoring service disclosed herein also sessionize and store up to 100% of the spans received from the client in real time. Implementations of the monitoring service disclosed herein comprise an ingestion streaming pipeline that is able to ingest and consolidate the incoming spans into traces, and is further able to use advanced compression methods to store the traces. Additionally, because incoming trace and span information may be efficiently ingested and aggregated in real time, a monitoring platform is able to advantageously convey meaningful and accurate information regarding throughput, latency and error rate (without the need for sampling) for the services on the backend in the microservices-based application. High-cardinality metrics pertaining to throughput, latency and error rate may be calculated with a high degree of accuracy because all incoming data is accounted for and there is no data loss as a result of sampling. It should be noted that that monitoring service disclosed herein is able to ingest and store up to 100% of the spans for both APM and RUM.

Implementations of the monitoring service disclosed herein further allow a client to store and analyze the span and trace data using multiple modalities of analysis for both APM and RUM. The manner in which multiple modalities of analysis are supported for RUM will be discussed further below in connection with FIG. 17. In one implementation, a first modality comprises converting incoming spans from one or more clients into a plurality of metric data streams (also referred to as metric time series) prior to sessionizing the spans. Each metric time series is associated with a single span identity, where a base span identity comprises a tuple of information corresponding to an associated type of span. Each metric time series in this modality (referred to herein as "metric time series modality") represents a plurality of tuples, each tuple representing a data point. Key performance metrics (KPIs) can be extracted directly from the metric time series in real-time and reported to a client. Because the metric time series are created without paying a time penalty associated with sessionization, they can be used to perform real-time monitoring with sub-second resolution and generate alerts within two to three seconds if a condition is violated.

In one or more implementations, a second modality of analysis sessionizes the incoming spans and supports deriving higher-cardinality metrics (as compared with metric time series data) for a selected set of indexed tags, e.g., user-selected tags, global tags of the trace, etc. over selected time durations (referred to herein as the "metric events modality"). This modality is particularly useful for clients that need accurate SLI information for a larger set of high-value indexed tags. The metric events modality enables developers to aggregate metrics that have been pre-generated using the sessionized trace data to efficiently respond to queries submitted by a client. The aggregated metrics provide a client visibility into the performance of services within a microservices-based application. The metric events modality may deprioritize speed as compared to the metric time series to provide a client resolution into a larger set of indexed tags. As such, responses provided by the metric events modality are typically slightly slower as compared with the sub-second response rates of the metric time series.

In one or more implementations, the metric events modality may also keep track of exemplary traces associated with a pre-configured set of indexed tags. The tags to be indexed may be pre-selected by the client or the monitoring platform. The Trace IDs may be used to retrieve the associated traces and analysis on the actual traces may be performed to generate more particularized information, e.g., span duration, span count, span workload percentage, etc. for each span in a given trace. In one implementation, once the traces are retrieved, an analysis may be run on an arbitrary set of tags (in addition to the pre-configured indexed tags).

Additionally, in one or more implementations, a third modality of analysis may comprise a "full-fidelity" modality where a full-fidelity analysis may be conducted on any dimension or attribute of data to gauge the performance of services in the microservices-based application. The full-fidelity modality allows clients to search most or all of the incoming trace data (including all the tag data) that was ingested by the monitoring platform without relying on sampling. The full-fidelity modality may sacrifice speed for accuracy, and may be used by clients that need a more thorough analysis of the services across every dimension or attribute.

In an implementation, the three modalities may be supported by the monitoring platform simultaneously by storing ingested trace data using three different formats, wherein each format corresponds to one of the three available modalities of analysis. Note that implementations of the monitoring service disclosed herein are not restricted to three discrete data sets. The data sets for the different modalities may overlap or may be saved as part of a single data set. When a client submits a query, the monitoring platform may determine which of the data sets is most suitable for addressing the query. Thereafter, the monitoring platform executes the query against the selected data set to deliver results to the client. By comparison, conventional monitoring systems typically focus on a single modality and do not provide clients the ability to seamlessly navigate between different modalities. Conventional monitoring systems also do not provide the ability to automatically select the most appropriate modality based on the content, structure, syntax or other specifics pertaining to an incoming query.

Figure 4:
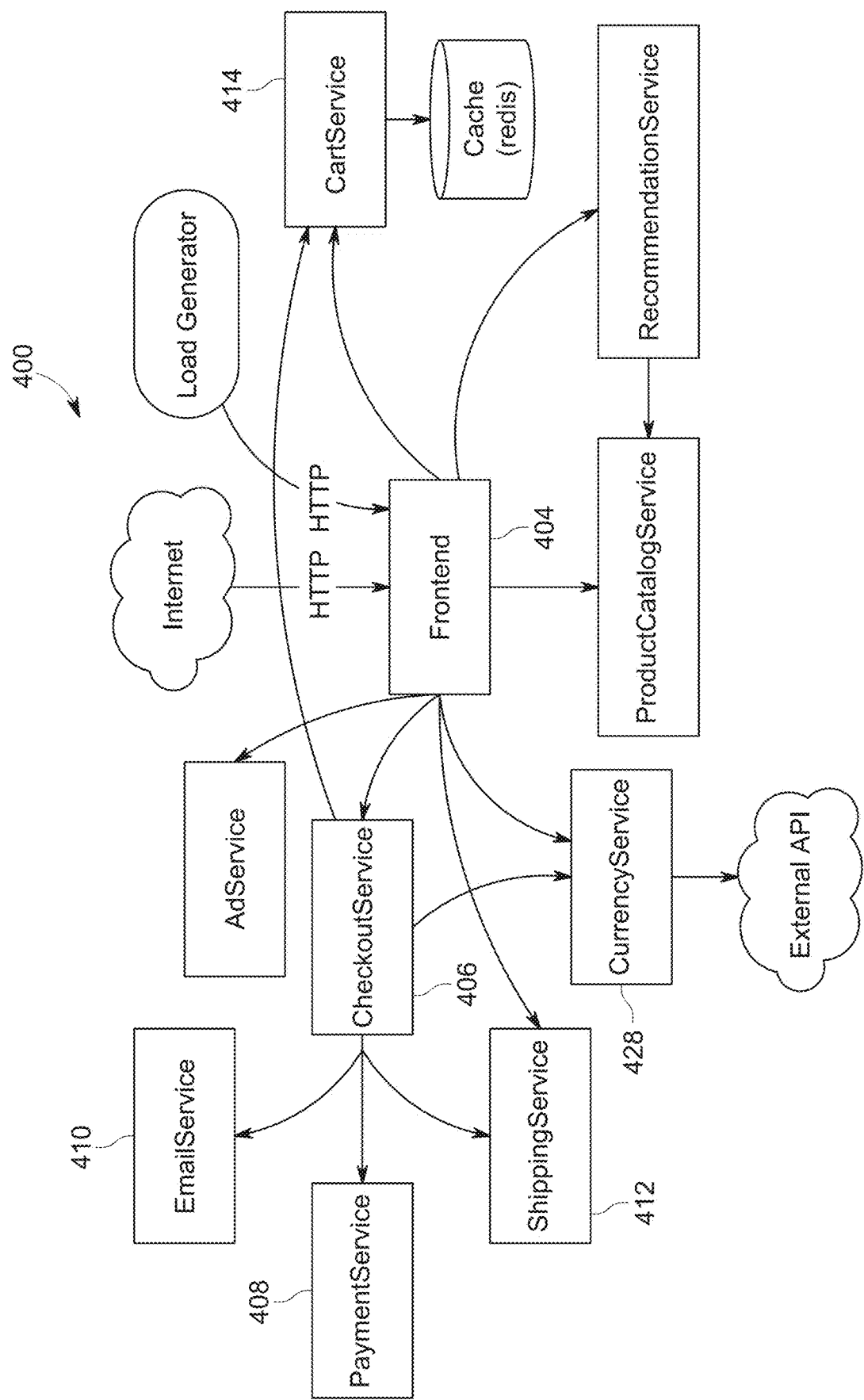
FIG. 4 illustrates the backend components of an exemplary microservice application for an online retailer that are monitored using APM.

FIG. 4 illustrates the backend components of an exemplary microservice application for an online retailer that are monitored using APM. A user needing to conduct a transaction may visit the website of the online retailer which would initiate a call to the retailer's Front-end service 404 on a server. The call to the Front-end service 404 may subsequently trigger a chain of calls on the retailer's back-end that would not be transparent to the client. For example, if the user proceeds to complete the transaction by checking out, several calls may be made to the back-end to services such as a CheckOutService 406, a PaymentService 408, an EmailService 410, a ShippingService 412, a CurrencyService 428 and a CartService 414 that may be involved in processing and completing the user's transactions. Note that a given request submitted by a user to the website would involve a subset of the services available and, typically, a single request would not result in a call to each of the services illustrated in FIG. 4.

As mentioned above, a request that the user initiates would generate an associated trace at the backend. It is appreciated that each user request will be assigned its own Trace ID, which will then propagate to the various spans that are generated during the servicing of that request. Each service may process a portion of the request and generate one or more spans depending on the manner in which instrumentation is configured for a respective service. The Trace ID may then be used by the server to group the spans together into a trace with that Trace ID. So, for example, the user's checkout transaction may generate a call at the Front-end service 404, which may in turn generate calls to various microservices including the CheckoutService 406. The CheckoutService 406 may, in turn, generate calls to other services such as the PaymentService 408, the EmailService 410 and the ShippingService 412. Each of these calls passes the Trace ID to the respective service being called, wherein each service in the call path could potentially generate several child spans.

It should be noted that a service does not necessarily need to make calls to other services—for instance, a service may also generate calls to itself (or, more specifically, to different operations and sub-functions within the same service), which would also generate spans with the same Trace ID. Through context propagation then, each of the spans generated (either by a service making a call to another service or a service making a call to various operations and sub-functions within itself) is passed the Trace ID associated with the request. Eventually, the spans generated from a single user request would be consolidated (e.g., by the collector 304 or the monitoring service 306 of FIG. 3) together using the Trace ID (and the Parent Span IDs) to form a single trace associated with the request.

As noted above, conventional distributed tracing tools are not equipped to ingest the significant amounts of span and tracing data generated by clients' application and have to resort to sampling the data intelligently to reduce the volume of stored trace data. Further, conventional distributed tracing tools do not provide application owners multiple modalities of storing and querying trace data with the flexibility of switching between the different modalities depending on the level of detail required to respond to a client's query.

Referencing FIG. 4 again, an owner of the application 400 may, for example, need varying degrees of detail regarding the services in the application. For example, the application owner may need to monitor certain metrics (e.g., RED metrics associated with Request, Errors, Durations) in real-time associated with a particular service, e.g., CheckoutService 406. Assuming there are errors generated by a call made from the Frontend service 404 to the CheckoutService 406, the owner may require further information pertaining to additional tags (indexed or non-indexed) associated with CheckoutService 406. The application owner may also need to access each of the spans or full trace(s) associated with the request from the Frontend service 404 to the CheckoutService 406 to perform a more detailed analysis. Each of the requests requires a different degree of detail extracted from the span and trace information.

In one implementation, the metric time series modality allows the client to monitor RED metrics associated with a given service, e.g., CheckoutService 406 in the online retailer's application in real-time. In one implementation, the metric time series modality can also be configured to deliver real-time alerts to a client based on each of the RED metrics, e.g., anomalies related to the request rate, error rate, or latency (duration).

If the client needs Service Level Indicators (SLIs) pertaining to certain indexed tags related to the call between Frontend service 404 and CheckoutService 406 for a given time duration, the metric event modality may enable the client to perform aggregations of metrics data computed from the indexed tags associated with the spans generated by the call between the Frontend service 404 and the CheckoutService 406. The metrics aggregation may be a numeric summation, for example, and may be performed relatively quickly.

The metric event modality, in accordance with implementations of the monitoring service disclosed herein, associates the selected tags indexed from the incoming span data (e.g., the same indexed tags used for performing metrics extraction) with Trace IDs (or Span IDs in the case of RUM data as will be discussed in connection with FIG. 17 below) for exemplary traces. The Trace IDs (or Span IDs in the case of RUM data) may be used to retrieve the exemplary traces (or spans) associated with indexed tags. Thereafter, the monitoring platform may analyze the exemplary spans or traces to generate more particularized information, e.g., span duration, span count, span workload percentage, etc. for each span in a given trace. For the example of FIG. 4, if the client requires a performance summary for the spans generated by the call made from the Frontend service 404 to the CheckoutService 406, the associated query submitted by the client may access the data set associated with the metric event modality. Using the Trace IDs (or Span IDs for RUM) corresponding to the indexed tags, the monitoring platform may then perform the computations necessary on the corresponding exemplary traces (or spans) to provide the client further information regarding the span performances. In an implementation, the client may also be able to extract meaningful information from the unindexed tags associated with the spans generated by the call using the exemplary traces.

If the client wants to search all the incoming trace data associated with the call between Frontend service 404 to the CheckoutService 406, implementations of the monitoring service disclosed herein provide a third modality of analysis. In the full-fidelity modality, a full-fidelity analysis may be conducted on any dimension, tag or attribute of the span or trace data. For example, the client may be able to search previously indexed or unindexed tags across each of the traces associated with the call the between the Frontend service 404 and the CheckoutService 406. The full-fidelity modality allows an analysis to be performed across any relevant span or trace. Conventional tracing systems are unable to provide that level of flexibility and detail for developers or application owners needing to investigate performance issues with their applications. Note that this modality of analysis may be more time-consuming because trace data may be detailed and require significant storage space.

Implementations of the monitoring service disclosed herein ingest and aggregate the span information from the online retailer's application (for APM) and from a user's interactions with a browser or other interface on the frontend (for RUM). Further, implementations of the monitoring service disclosed herein extract information from the incoming span data and store the information using multiple formats to support multiple modalities of data analysis for a client. Each modality is configured to allow the clients access to a different format in which incoming trace information may be represented and stored, where each format conveys a different degree of resolution regarding the ingested traces to a client and, accordingly, may occupy a different amount of storage space.

Figure 5:
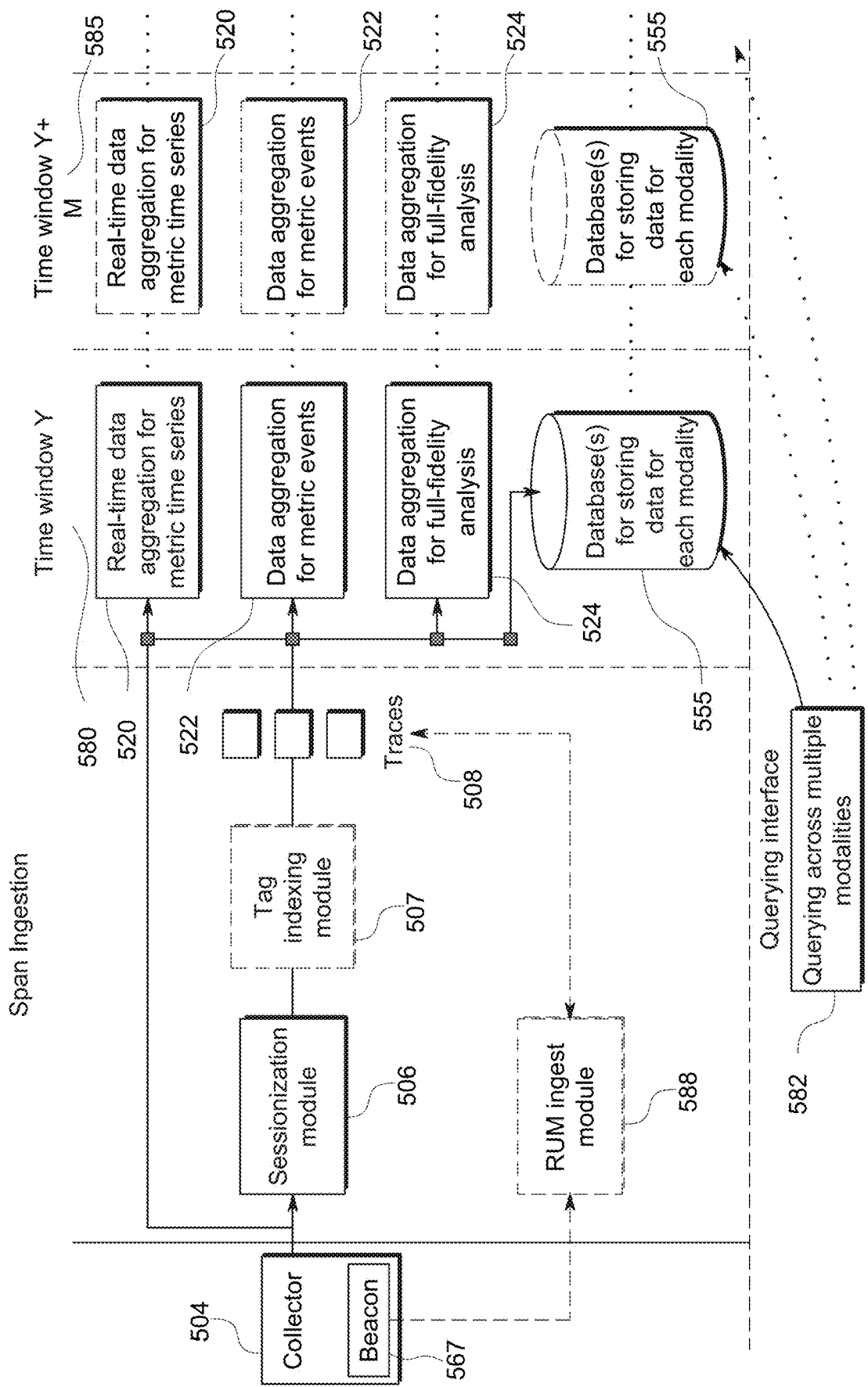
FIG. 5 is a flow diagram that illustrates an exemplary method of ingesting and aggregating span information to support multiple modalities of analysis for APM, in accordance with implementations of the monitoring service disclosed herein.

FIG. 5 is a flow diagram that illustrates an exemplary method of ingesting and aggregating span information to support multiple modalities of analysis for APM, in accordance with implementations of the monitoring service disclosed herein. As mentioned in connection with FIG. 3, span information is received at the monitoring service 306 from the collector (e.g., the collector 504 in FIG. 5).

As noted previously, in one implementation, incoming spans from one or more clients are converted into a plurality of metric data streams prior to consolidating the spans into traces through a sessionization process. The incoming spans are received and the metric data streams are generated by module 520 prior to the spans being sessionized. Because the metric time series are created without paying a time penalty associated with sessionization, they can be used to perform real-time monitoring and alerting.

The incoming spans for APM (e.g., monitoring microservices at the backend of an application) are also sessionized where the span information is combined into traces in a process called sessionization. The APM sessionization module 506 is responsible for stitching together or combining the traces 508 using, among other things, the Trace IDs associated with each user-request (and typically also the Parent Span IDs of each span). Note that, in one implementation, the sessionized traces may also be inputted to the module 520 to create metric time series to track traces (separately from the time series created to track spans).

The spans associated with RUM (ingested, for example, from the beacon 567), are, in one implementation, ingested and analyzed separately from the spans associated with APM. In one implementation, RUM-related spans may need to be treated differently from APM-related spans. For example, the spans related to RUM may need to be ingested and sharded by a session identifier (session ID) (and, optionally, an organization identifier) instead of using the Trace ID. A session ID is an identifier that connects a series of traces. RUM data is typically organized into page views (which show details of a page visit) and sessions (which group all the page views by a user in a single visit). A session ID is typically used to filter for all the views in a specific session.

For RUM, a developer is typically more interested in the behavior of a user over the course of a session, e.g., a user session interacting with a particular website or application. Accordingly, spans associated with RUM are usually sharded and tracked using a session identifier (or session ID). Spans associated with RUM that are received from the collector 504 are, therefore, ingested using a separate RUM ingestion module 588 (details of which will be covered in FIG. 17).

In an implementation, information extracted from the traces 508 may also be transmitted to the RUM ingest module 588 in order to facilitate a connection between the frontend RUM traces and the backend APM traces. In this implementation, a RUM span on the RUM frontend may comprise the associated Trace ID/Span ID of an APM span, so the RUM frontend would initiate the retrieval of the connection information from the APM backend.

In addition to a Trace ID, each trace also comprises a time-stamp; using the time-stamps and the Trace IDs, the APM sessionization module 506, which is associated with APM-related spans, creates traces 508 from the incoming spans in real time and sessionizes them into discrete time windows. For example, the sessionization process may consolidate traces (from spans) within a first time window (associated with time window Y 580) before transmitting the traces to modules 520, 522 or 524. Each of the modules 520, 522 and 524 support a different modality of analysis for APM. Thereafter, the sessionization process may consolidate traces within the subsequent time window (associated with time window "Y+M" 585) before transmitting those traces to the modules 520, 522, or 524. It should be noted that the time windows associated with each of the modules 520, 522, and 524 may be different. In other words, the metric time series data may be collected over short time windows of 10 seconds each. By comparison, traces for the metric events modality (associated with the module 522) may be collected over 10 minute time windows.

In some implementations of the monitoring service disclosed herein, the sessionization module is able to ingest, process and store all or most of the spans received from the collector 504 in real time. By comparison, conventional monitoring systems do not accept all of the incoming spans or traces; instead, they sample incoming spans (or traces) to calculate SLIs at the root level of a trace before discarding the spans. Implementations of the monitoring service disclosed herein, by comparison, comprise an ingestion streaming pipeline that is able to ingest and consolidate all the incoming spans into traces in real time, and is further able to use advanced compression methods to store the traces. Further, implementations of the monitoring service disclosed herein are able to generate metric time series from the span data (prior to sessionizing the spans) to provide real-time monitoring and alerting of certain KPIs.

As noted above, the APM sessionization module 506 has the ability to collect all the traces within a first time window Y 580 using the time-stamps for the traces. Subsequently, the sessionized traces are fed to the modules 522 and 524, for the respective modalities (metric events and full-fidelity) for extraction and persistence.

In one implementation, subsequent to consolidation, the trace data is indexed by an optional tag indexing module 507, which indexes one or more tags in the trace data. The tags may be client-selected tags or tags that the monitoring platform is configured to index by default. In a different implementation, tag indexing may be performed as part of data aggregation, e.g., by module 522 associated with metric events.

In an implementation, data sets associated with each of the modalities may be persisted in one or more databases 555. As noted previously, the data sets for the respective modalities may be separate data sets, overlapping data sets or a single data set that supports all the modalities. Note that the databases 555 may be a single database that stores data sets corresponding to all three modalities. Alternatively, the databases 555 may represent different respective databases for each of the three modalities. Furthermore, the databases 555 may also represent distributed databases across which relevant information for each of the three modalities is stored.

In one implementation, data associated with each of the three modalities is generated at the time of ingestion and stored separately from each other. The structure, content, type or syntax of query submitted by a client will typically dictate which of the three modalities and corresponding data set will be selected. In one implementation, an interface through which the query is submitted may also determine which of the three modalities and corresponding data set is selected. In an implementation, there may be some commonality in the data for the three modalities in which case the storage for the data may overlap. An alternative implementation may also comprise one or two of the three modalities (instead of all three) described above.

A client may send in a request to retrieve information pertaining to an application through query interface 582. The underlying querying engine (e.g., the query engine and reporting system 324 from FIG. 3) will analyze the structure, content, type and/or syntax of the query, and also the interface through which the query is submitted, to determine which of the three modalities and respective data set to access to service the query. In an implementation, the three data sets corresponding to the three modalities are structured in a way that allows the querying engine to navigate between them fluidly. For example, a client may submit a query through the query interface 582, which may potentially result in the query engine accessing and returning data associated with the metric events modality. Thereafter, if the client requires more in-depth information, the querying engine may seamlessly navigate to data associated with a different modality (e.g., full-fidelity) to provide the client with further details. Conventional monitoring systems, by comparison, do not provide more than a single modality or the ability to navigate between multiple modalities of data analysis.

4.1 Metric Time Series

Implementations of the monitoring service disclosed herein allow trace data associated with APM to be stored and analyzed using multiple modalities of analysis. In one implementation, incoming spans from one or more clients are converted into a plurality of metric data streams (also referred to as metric time series) and transmitted to the analytics engine (e.g., the instrumentation analysis system 322) for further analysis. Most of the metric data streams are created directly from the incoming spans prior to the sessionization process to generate metric time series related to spans. Each metric time series is associated with a single "span identity," where a base span identity comprises a tuple of information corresponding to an associated type of span. Each metric time series in the metric time series modality represents a plurality of tuples with each tuple representing a data point. KPIs can be extracted in real-time directly from the metric time series and reported to a client. Because the metric time series are created without paying a time penalty associated with sessionization, they can be used to perform real-time monitoring with sub-second resolution and generate alerts within two to three seconds if some condition is violated.

4.1.1 Generating Metric Data Streams Using Span Identities

A client application associated with, for example, an online retailer's website may potentially generate millions of spans from which a monitoring platform may need to extract meaningful and structured information. To organize the significant amounts of incoming span data, in an implementation, incoming spans may be automatically grouped by mapping each span to a base "span identity," wherein a base span identity comprises some key attributes that summarize a type of span. An exemplary span identity may be represented as the following exemplary tuple: {operation, service, kind, isError, httpMethod, isServiceMesh}, where the operation field represents the name of the specific operation within a service that made the call, the service field represents the logical name of the service on which the operation took place, the kind field details relationships between spans and may either be a "server" or "client," the isError field is a "TRUE/FALSE" flag that indicates whether a span is an error span, the httpMethod field relates to the HTTP method of the request for the associated span and the isServiceMesh field is a flag that indicates whether the span is part of a service mesh. A service mesh is a dedicated infrastructure layer that controls service-to-service communication over a network. Typically, if software has been instrumented to send data from a service mesh, the trace data transmitted therefrom may generate duplicative spans that may need to be filtered out during monitoring. Accordingly, the 'isServiceMesh' flag allows the analytics engine to filter out any duplicative spans to ensure the accuracy of the metrics computations.

In some implementations, the tuple used to represent the span identity may include other identifying dimensions as well. For example, if a client needs visibility into metadata tags from the spans in addition to the dimensions extracted for a base span identity by default (e.g., service, operation, kind, etc.), an extended identity may be created. An extended identity supports custom dimensionalization by a client, where dimensionalization refers to the ability to extract information pertaining to additional tags or metadata in a span. An extended identity provides a customer the ability to dimensionalize the span using pre-selected dimensions. Conventional methods of monitoring by comparison did not offer customers the flexibility to add custom dimensions to streams of metric data. An extended identity comprises the span's base identity and additionally a map of the span's tag key:value pairs that matched a client's configuration settings. An exemplary extended identity may be represented as the following exemplary tuple: {operation, service, kind, isError, httpMethod, isServiceMesh, keyValueMap . . . }, where the keyValueMap field represents one or more additional tags or dimensions configured by the client to be extracted as part of the span's identity, e.g., customer name, member ID, etc.

By extracting information related to additional tags, higher cardinality metrics may be computed using the metric time series modality. Further, a client is able to configure alerts on the custom dimensions as well, wherein the alerts inform a client if a particular dimension has crossed some critical threshold. In alternate implementations of the monitoring service disclosed herein, the tuple used to represent a span's base or extended identity may contain fewer elements.

If the tuple of information of an incoming span happens to be the same as another span, both spans relate to the same identity. In an implementation, spans with the same base identity may be grouped together. A fixed size bin histogram is generated for each span identity to track metrics associated with the span identity. In this way the same type of spans are organized together and the client can track one or more metrics associated with each group of spans sharing a common identity. In an implementation, a fixed size bin histogram is generated for each unique span identity. The fixed size bin histogram may be a data structure, for example, that is preserved in memory.

As noted above, each span identity may be tracked with a respective histogram. The histograms associated with the corresponding span identities, in one implementation, are generated and updated in fixed time duration windows. For example, histogram data may be generated for the incoming spans in memory every 10 seconds. At the end of each fixed duration, metrics associated with the histograms are emitted and the histogram is reset for the next time window. By emitting metrics for each time duration, data streams of metrics may be generated from the histogram data. The streams of metric data associated with each span identity, in one implementation, may be aggregated by a monitoring platform to provide a client of the monitoring platform meaningful information regarding the application being monitored.

Figure 6:
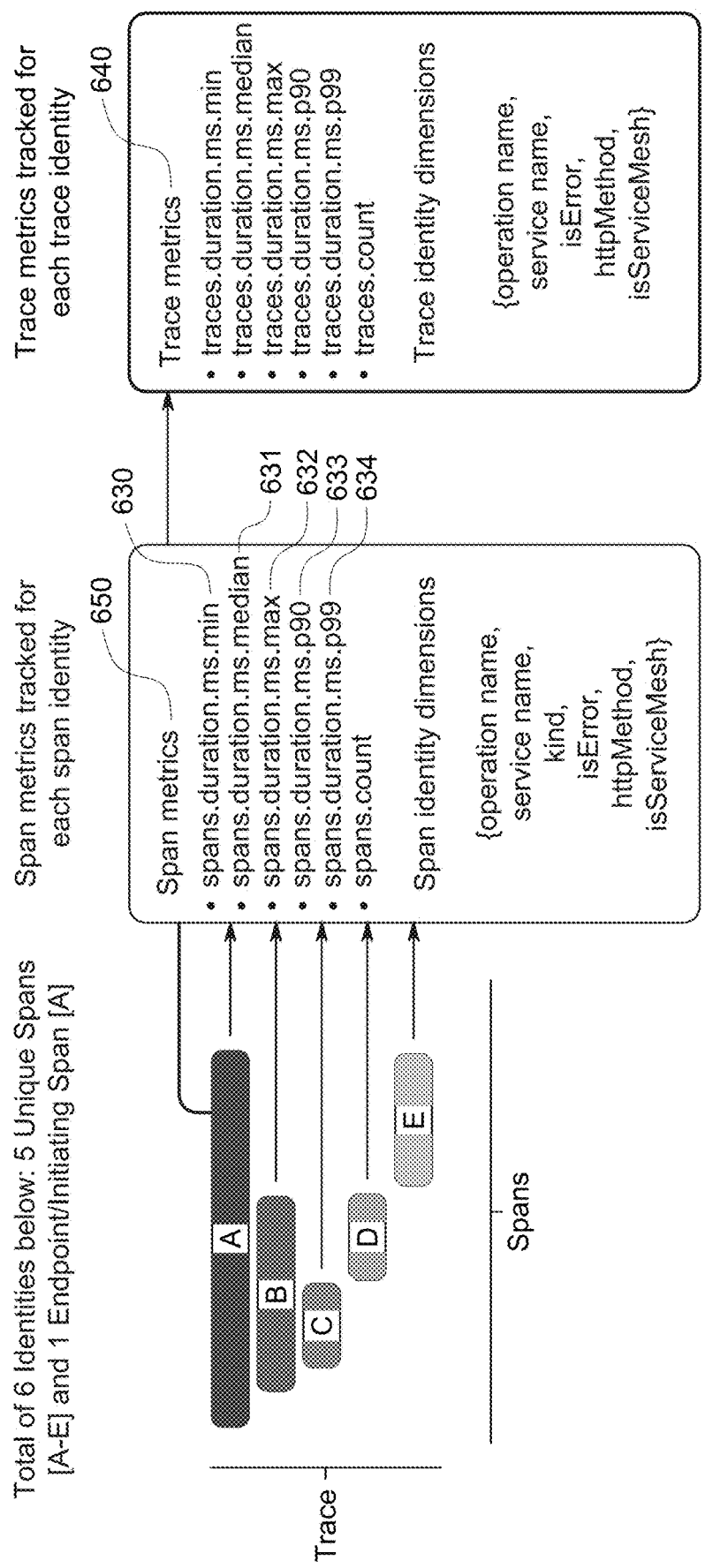
FIG. 6 illustrates the manner in which span metrics and trace metrics are generated, in accordance with implementations of the monitoring service disclosed herein.

FIG. 6 illustrates the manner in which span metrics and trace metrics are automatically generated, in accordance with implementations of the monitoring service disclosed herein. FIG. 6 illustrates 5 unique spans (A-E) including a root span (an initiating span) A. In an implementation, each group of spans identified by the same span identity is associated with one or more span metrics 650. For example, a minimum span duration 630, a median span duration 631, a maximum span duration 632, a p90 latency value 633, a p99 latency value 634 and a span count (how many times a particular identity was counted) may be tracked for each span identity. A histogram corresponding to the span identity may track these metrics over fixed sized durations, e.g., 10 seconds. For example, over a 10 second window, the histogram may comprise fixed size bins that track a minimum span duration, a median span duration, a maximum span duration, a p90 value, a p99 value and a count of all spans received corresponding to a given identity. At the end of each duration, the metrics are emitted and the histogram is reset. The emitted metrics are used to generate streams of metrics data corresponding to each span identity. Each data point on a metric data stream comprises the span identity dimensions or the extended identity dimensions if the client has configured additional metadata to be extracted from the spans.

As shown in FIG. 6, in an implementation, the initiating span A comprises a trace identity that is used to emit trace metrics 640. The initiating span A helps define an identity for a trace which allows the monitoring platform to logically group together all traces that represent the same flow through an endpoint of the application. The duration of the identity for a trace is calculated as the end time of the latest span in the trace minus the start time of its initiating span. An exemplary trace identity may be represented as the following exemplary tuple: {operation, service, isError, httpMethod, isServiceMesh}, where the operation field represents the name of the specific operation within a service that made the call, the service field represents the logical name of the service on which the operation took place, the isError field is a "TRUE/FALSE" flag that indicates whether the trace is associated with an error, the httpMethod field relates to the HTTP method of the request for the associated trace and the isServiceMesh field is a flag that indicates whether the trace is part of a service mesh. The trace metrics 640 are computed after the spans have been consolidated into a trace following a sessionization process. The trace metrics are also turned into streams of metric data similar to the metric time series associated with the spans.

Figure 7:
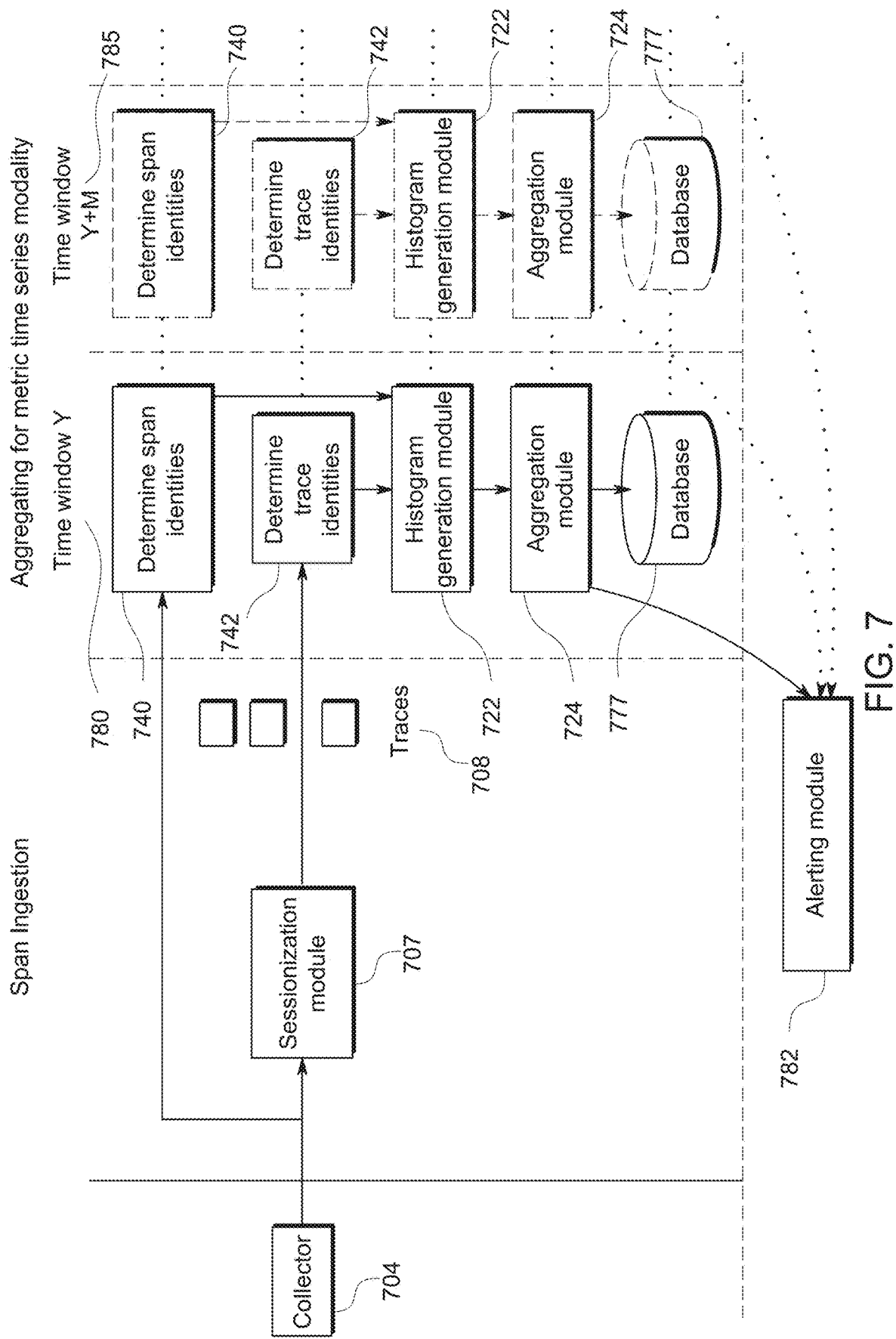
FIG. 7 is a flow diagram that illustrates an exemplary method of generating metric time series from ingested spans, in accordance with implementations of the monitoring service disclosed herein.

FIG. 7 is a flow diagram that illustrates an exemplary computer implemented method of generating metric time series from ingested spans, in accordance with implementations of the monitoring service disclosed herein. As mentioned previously, incoming spans are received at a monitoring service from a collector 704. Prior to being sessionized, span identities are generated for the spans and the spans with identical base identities are grouped together by module 740.

In one implementation, a histogram generation module 722 generates a histogram respective to each span identity. The histogram may represent a distribution of durations for a set of spans. Information from each incoming span (e.g., span duration information) corresponding to a given span identity is added to the fixed size bins of the respective histogram for the identity. The histogram is maintained for a fixed sized time window Y 780 (e.g., 10 seconds) after which the histogram generation module 722 emits the aggregated metrics and resets all the counters in the histogram for the next segment. Subsequently, the histogram generation module 722 generates metrics for the next duration of time Y+M 785, and emits metrics corresponding to that time window. In this way, histogram generation module periodically emits one or more metrics (e.g., six span metrics as seen in FIG. 6), including client-configured custom metrics, corresponding to each type of span to the analytics engine.

In one implementation, the span information is also combined into traces 708 using a sessionization module 707 as discussed in connection with FIG. 5. The sessionization process may consolidate traces (from spans) within a first minute window (associated with time window Y 780). Thereafter, the sessionization process may consolidate traces within the subsequent window (associated with time window "Y+M" 785). Trace identities are determined for the sessionized traces 708 using module 742 after which the trace metrics (as discussed in connection with FIG. 6) are determined using the histogram generation module 722 in a process similar to the manner in which span metrics are generated.

In an implementation, an aggregation module 724 may aggregate the periodic metric data from the histogram generation module 722 and create metric time series from the data for each span identity. In some implementations, the aggregation module 724 may generate quantized data streams from the metric data received from the histogram generation module 722. The quantized data stream has data values occurring periodically at fixed time intervals.

In one implementation, the aggregation module 724 may identify a function for aggregating the metric for which values are provided by one or more input data streams. The aggregation module 724 generates the quantized data streams by determining an aggregate value for each input data stream for each fixed time interval by applying the identified function over data values of the input data stream received within the fixed time interval. The aggregation module 724 may further receive a request to evaluate an expression based on the data values from the input data streams. The system periodically evaluates the expression using the data values of the quantized data streams.

In one implementation, the aggregation module 724 may, for example, perform aggregations on the various metric time series to provide real-time monitoring of certain higher priority endpoints in the application. For example, aggregations may be performed to determine request, error and latency metrics for certain designated services. In order to do that, the aggregation module 724 may, for example, aggregate values across all span identities that are associated with the designated service.

Further, in some implementations, alerting module 782 may monitor one or more metric time series from the aggregation module 724 and may be configured to generate alerts if certain metrics being monitored exhibit anomalous behavior. For example, if a maximum span duration associated with a given span identity crosses over a certain threshold, an alert configured using the alerting module 782 may be triggered. The alert may, for example, be responsive to a metric time series associated with span metric 632 from FIG. 6, wherein the alert is triggered if the maximum span duration exceeds a given threshold.

In one implementation, the histograms generated by the histogram generation module 722 may be stored in database 777. In an implementation, the histogram data may be stored as parquet-formatted files.

4.1.2 Real-Time Monitoring Using Metric Time Series Data

Figure 8:
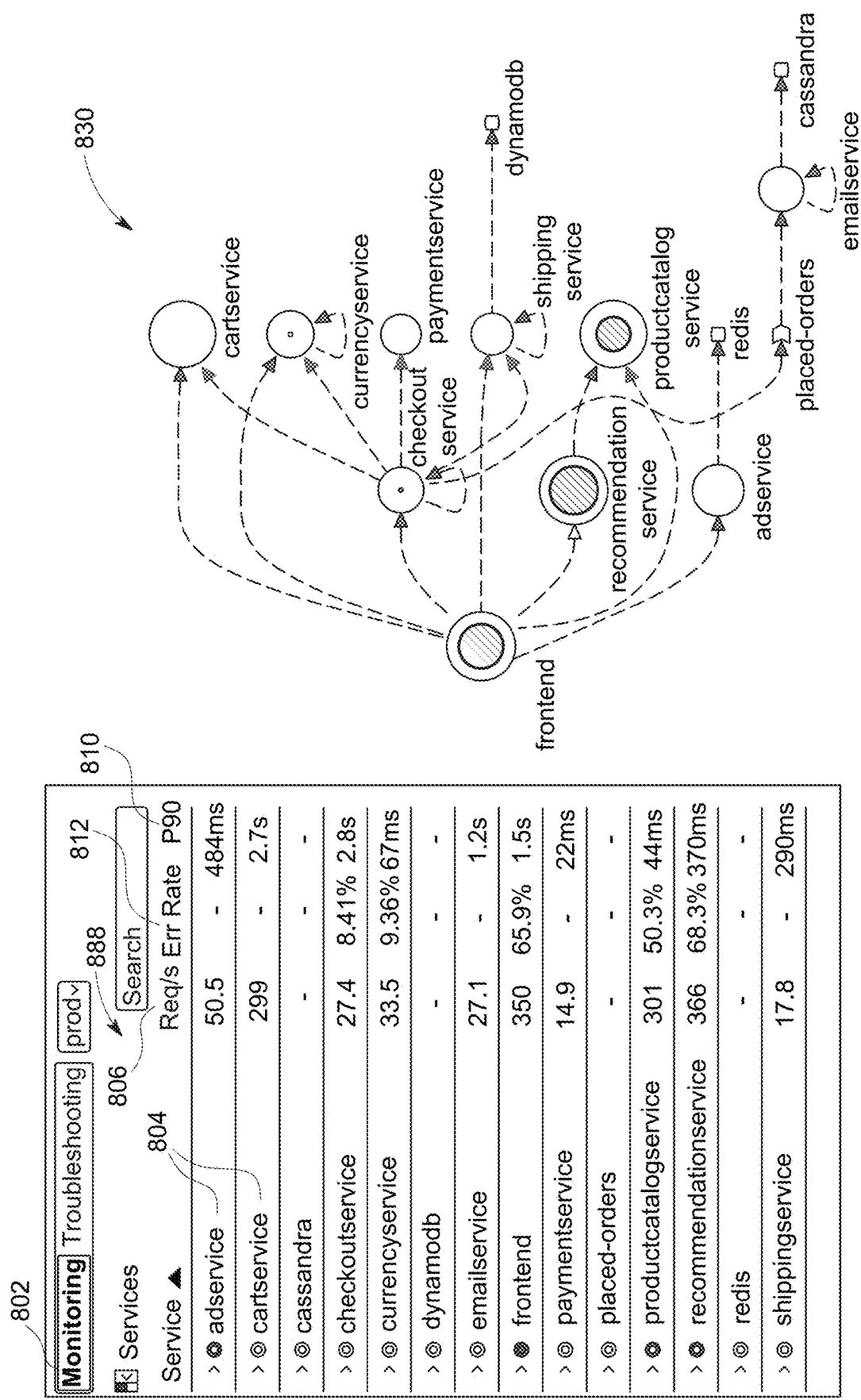
FIG. 8 illustrates an exemplary on-screen GUI for APM illustrating a monitoring mode for an application displaying metric values aggregated from metric time series data, in accordance with implementations of the monitoring service disclosed herein.

FIG. 8 illustrates an exemplary on-screen GUI for APM illustrating a monitoring mode for an application displaying metric values aggregated from metric time series data, in accordance with implementations of the monitoring service disclosed herein. In one implementation, the GUI of FIG. 8 displays a monitoring mode indication when a corresponding monitoring mode option 802 is selected. The monitoring mode displays a panel 888 listing services 804 comprised within the application being monitored. Each service is displayed alongside metrics pertaining to requests/second 806, error rate 812 and P90 latency values 810. The metrics data displayed in the panel 888 is computed in real-time and is aggregated using the metric time series data. In an implementation, an aggregation module similar to the aggregation module 724 discussed in connection with FIG. 7 performs the necessary aggregations from the various metric time series to display metrics associated with each of the services. The service level KPIs may be computed through the real-time aggregation pipeline discussed in connection with FIG. 7 before the histogram metadata is stored in the backend of the analytics engine.

The monitoring mode also comprises an application topology graph 830. An application topology graph (or service graph) typically decomposes an application into all its component services and draws the observed dependencies between the services so a client can identify potential bottlenecks and get a better understanding of the manner in which data flows through the software architecture. The service graph 830 also facilitates visualizing cross-service relationships between services comprised within the application and external to the application (as will be discussed further in connection with the metric events modality). In an implementation, the service graph may be created using information gleaned from the metric time series data aggregated by the aggregation module 724 discussed in connection with FIG. 7.

By ingesting up to 100% of the incoming spans from the client software and implementing monitoring service 306 as a Software as a Service (SaaS) based service offering, implementations of the monitoring service disclosed herein advantageously retain valuable information pertaining to the spans that is further analyzed in the SaaS backend. Span identities and histogram information (e.g., various counts and metrics data) associated with the incoming spans that are stored may be used to conduct further analysis. For example, metadata may be analyzed to identify certain offending services or operations, and data regarding those services or operations may be surfaced for further analysis.

Conventional monitoring systems typically expunged the span data after extracting the relevant metrics from them. By comparison, implementations of the monitoring service disclosed herein retain high-fidelity information related to all the incoming spans for deeper analysis. The metadata retained provides a client the ability to filter based on certain dimensions and services that would not have been possible using conventional monitoring systems. Further, the metadata retained may be used in conjunction with data sets for other modalities such as metric events and full-fidelity to allow a client to provide a thorough investigation of an alert.

In one implementation, using, for example, the "service," "operation," and "kind" fields in the tuple, the aggregation module 724 (from FIG. 7) may be able to determine span identities associated with cross-service calls. Spans associated with inter-service calls are of interest to a client because they provide client information regarding the manner in which two services within an application are interacting. Implementations of the monitoring service disclosed herein are able to advantageously use the metadata saved for the metric time series to perform post-processing and determine services associated with inter-services calls. For example, the value of the "kind" field related to a span identity may be either "client" or "server" where the analytics engine may be able to use that information in post-processing to determine if the span is related to a cross-service call.

If it is determined that a particular span is related to a cross-service call, those spans could be processed through the analytics engine to discover further information regarding the dependencies. For example, in one implementation, if a client identifies a span identity associated with a cross-service call or a span identity associated with a high value operation, the client may create an extended identity for the corresponding span identities and supplement those identities with additional custom dimensions to be monitored. For example, the client may want to monitor a customer name association with such spans. The client may simply reconfigure the analytics engine to extract the additional customer name dimension as part of the spans' extended identity.

Retaining span information associated with incoming spans provides a client additional metadata to perform intelligent processing. In an implementation, the client may only collect data pertaining to select operations. In other words, the client may filter out data pertaining to select operations that are of less interest to a client.

The number of unique span identities may typically roughly correlate with the number of unique operation names present on the span. In an implementation, the client is able to turn off or filter out span identities associated with certain operations if they are not particularly useful. In other words, the monitoring platform can be configured to turn off metric generation related to selected span identities. This advantageously reduces loads on the metrics analytics engine because it does not need to track and store metric time series for spans that are of little interest to a client. For example, spans associated with calls that a service makes to operations internal to the service do not convey information and can be filtered. Accordingly, additional resources can be directed towards processing spans associated with services and operations that are of greater interest to a client. Conventional monitoring systems by comparison would not have the flexibility to selectively focus on spans associated with high value services or operations by filtering out the less valuable spans.

4.2 Metric Event Modality

The metric event modality generates and stores aggregated rows of metrics values for selected indexed tags from the incoming trace data for given time durations. The selected tags may, for example, be indexed from the incoming spans when the spans are ingested. Metrics data may, for example, comprise, but is not limited to, number of requests (e.g., between two services), number of errors and latency. The aggregated rows of metrics data are stored efficiently for fast aggregation. The metric events data may be rapidly vectorized and aggregated in response to queries from a client.

Figure 9:
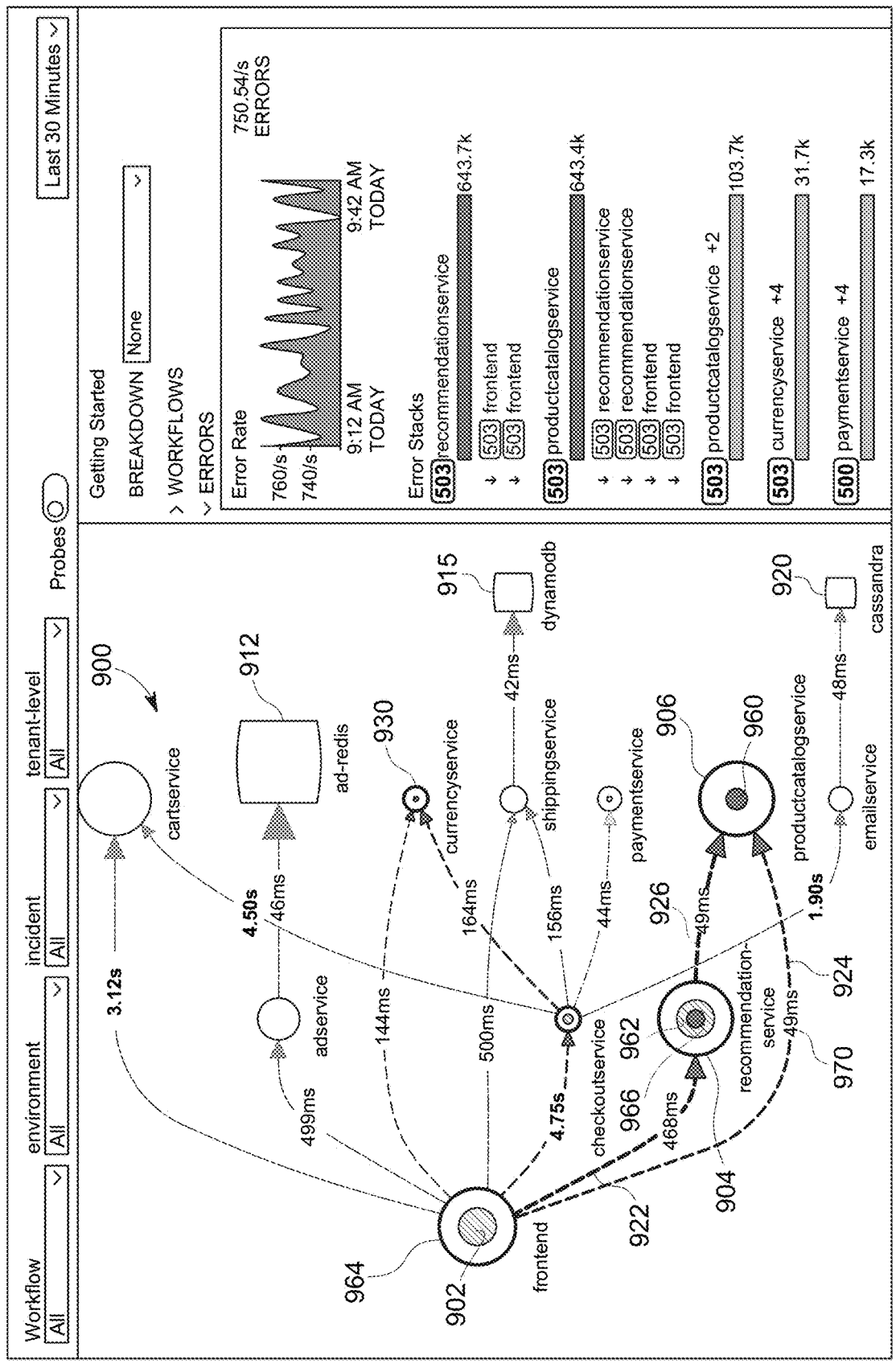
FIG. 9 illustrates an exemplary on-screen GUI comprising an interactive topology graph for an application created from the aggregated metric events data, in accordance with implementations of the monitoring service disclosed herein.

Implementations of the monitoring service disclosed herein use the aggregated rows of metrics data created in association with the metric events modality to generate a full-context application topology graph using the metric events data (e.g., by module 522 in FIG. 5). As noted above, an application topology graph (or service graph) typically decomposes an application into all its component services and draws the observed dependencies between the services so a client can identify potential bottlenecks and get a better understanding of the manner in which data flows through the software architecture. FIG. 9 illustrates an exemplary on-screen GUI comprising an interactive topology graph for an application created from the aggregated metric events data, in accordance with implementations of the monitoring service disclosed herein. The service graph facilitates visualizing cross-service relationships between services comprised within the application and external to the application. The exemplary GUI of FIG. 9 also enables customers to track the causal chain of operations resulting in an error.

It should be noted that the service graph may also be generated using the metric time series data as noted earlier, however, storage for the metric events data set may be significantly less because it does not need to store as much metadata as metric time series data. Accordingly, generating the service graph using metric events data is more efficient from a storage standpoint.

FIG. 9 illustrates an on-screen GUI comprising an interactive full-context service graph 900, which is constructed for an exemplary microservices-based application using the metrics data generated in connection with the metric events modality. Each circular node (e.g., nodes associated with services 902, 904 and 906 of FIG. 9) represents a single microservice. Alternatively, in an implementation, a circular node may also represent a group of multiple microservices, where the GUI for the monitoring platform (associated with, for example, the monitoring service 306) provides a client the ability to expand the node into its sub-components.

In an implementation, services that are part of the client's application may be represented differently from services that are external to the client's application. For example, circular nodes (e.g., nodes associated with services 902, 904 and 906) of the exemplary application represented by service graph 900 are associated with services comprised within the client's application. By contrast, squarish nodes (e.g., nodes associated with databases dynamodb 915, Cassandra 920, ad-redis 912) are associated with services or databases that are external to the client's application.

A user may submit a request at the front-end service 902; the user's request at the front-end service 902 may set off a chain of subsequent calls. For example, a request entered by the user at the front end of the platform may generate a call from the front-end service 902 to the recommendation service 904, which in turn may generate a further call to the product catalog service 906. As noted previously, a chain of calls to service a request may also comprise calls that a service makes to internal sub-functions or operations within the same service.

Each edge in the service graph 900 (e.g., the edges 922, 924 and 926) represents a cross-service dependency (or a cross-service call). The front-end service 902 depends on the recommendation service 904 because it calls the recommendation service 904. Similarly, the recommendation service 904 depends on the product catalog service 906 because it makes a call to the product catalog service 906. The directionality of the edge represents a dependency of a calling node on the node that is being called. Each of the calls passes the Trace ID for the request to the respective service being called. Further, each service called in the course of serving the request could potentially generate several spans (associated with calls to itself or other services). Each of the spans generated will then carry the Trace ID associated with the request, thereby, propagating the context for the trace. Spans with the same Trace ID are, thereafter, grouped together to compose a trace.

In some implementations, the GUI comprising service graph 900 may be configured so that the nodes themselves provide a visual indication regarding the number of errors that originated at a particular node versus errors that propagated through the particular node but originated elsewhere. In an implementation, the high-cardinality metrics data aggregated in association with the metric events modality may be used to compute the number of errors that are used to render the nodes of the service graph.

For example, as shown in the service graph of FIG. 9, the front-end service 902 makes calls to the recommendation service 904. Errors may be generated at the recommendation service 904 not only in response to calls from the front-end service 902, but also in response to calls that the recommendation service 904 makes to itself (e.g., in response to sub-functions or operations that are part of recommendation service). For such errors, the recommendation service 904 would be considered the "originator" for the error. The recommendation service 904 also makes calls to the product catalog service 906 and these calls may result in their own set of errors for which the product catalog service 906 would be considered the error originator. The errors originating at the product catalog service 906 may propagate upstream to the front-end service 902 through the recommendation service 904; these errors would be observed at the recommendation service 904 even though the recommendation service 904 is not the originator of those errors.

It is appreciated that conventional monitoring technologies would not provide adequate means for a client to distinguish between errors that originated at the recommendation service 904 versus errors that propagated through the recommendation service 904 but originated elsewhere. By performing computations using the metrics data associated with the metric events modality, implementations of the monitoring service disclosed herein are able to render a service graph that visually indicates critical information regarding the services in an architecture, e.g., number of requests between services, the number of errors generated by a service, number of errors for which the service was the root cause, etc. The service graph 900 allows clients the ability to visually distinguish between errors that originated at the recommendation service 904 as compared with errors that simply propagated through the recommendation service 904. As shown in FIG. 9, the node associated the recommendation service 904 comprises a solid-filled circular region 966 and a partially-filled region 962, where the region 966 represents errors that originated at the recommendation service 904 while the region 962 represents errors that propagated through the recommendation service 904 but originated elsewhere (e.g., at the product catalog service 906).

Similarly, solid-filled region 960 within the node associated with the product catalog service 906 represents the errors that originated at the product catalog service. Note that the errors returned by the product catalog service 906 originated at the product catalog service. In other words, the product catalog service 906 does not have errors from another downstream service propagating through it because it does not make calls to another service that is further downstream in the execution pipeline. Conversely, the front-end service 902 comprises a partially-filled region 964 because the errors observed at the front-end service 902 propagated to it from other downstream services (e.g., the recommendation service 904, the currency service 930, the product catalog service 906, etc.) The front-end service 902 was not the originator of errors in the example shown in FIG. 9. Note that in other implementations solid-filled regions (e.g., region 966) and partially-filled regions (e.g., region 964) may be represented differently. For example, different shades, patterns, or colors may be used to distinguish these regions from each other.

Implementations of the monitoring service disclosed herein use the aggregated rows of metrics data created for the metric events modality to determine full-fidelity SLIs associated with the services in an application (e.g., by the module 522 in FIG. 5). An SLI is a service level indicator-a defined quantitative measure of some aspect of the level of service that is provided. The SLIs are aggregated and extracted for the various services in a microservices architecture so that the behavior of applications may be understood. Most clients consider request latency how long it takes to return a response to a request—as a key SLI. Other common SLIs include the error rate (often expressed as a fraction of all requests received) and system throughput, typically measured in requests per second. The measurements are often aggregated over a measurement window using the metrics data associated with the metric events modality and then turned into a rate, average, or percentile.

In one implementation, the GUI comprising service graph 900 is interactive, thereby, allowing a developer to access the SLIs associated with the various nodes and edges within the application by interacting with respective portions of the service graph. Referring to FIG. 9, in an implementation, a client may be able to hover their cursor over various regions of the on-screen displayed service graph 900, including but not limited to the nodes (e.g., the nodes associated with services 904, 906 etc.) and edges (e.g., the edges 922, 926, etc.), to receive SLI-related information for the associated microservices through a pop-up window or other interface.

Figure 10:
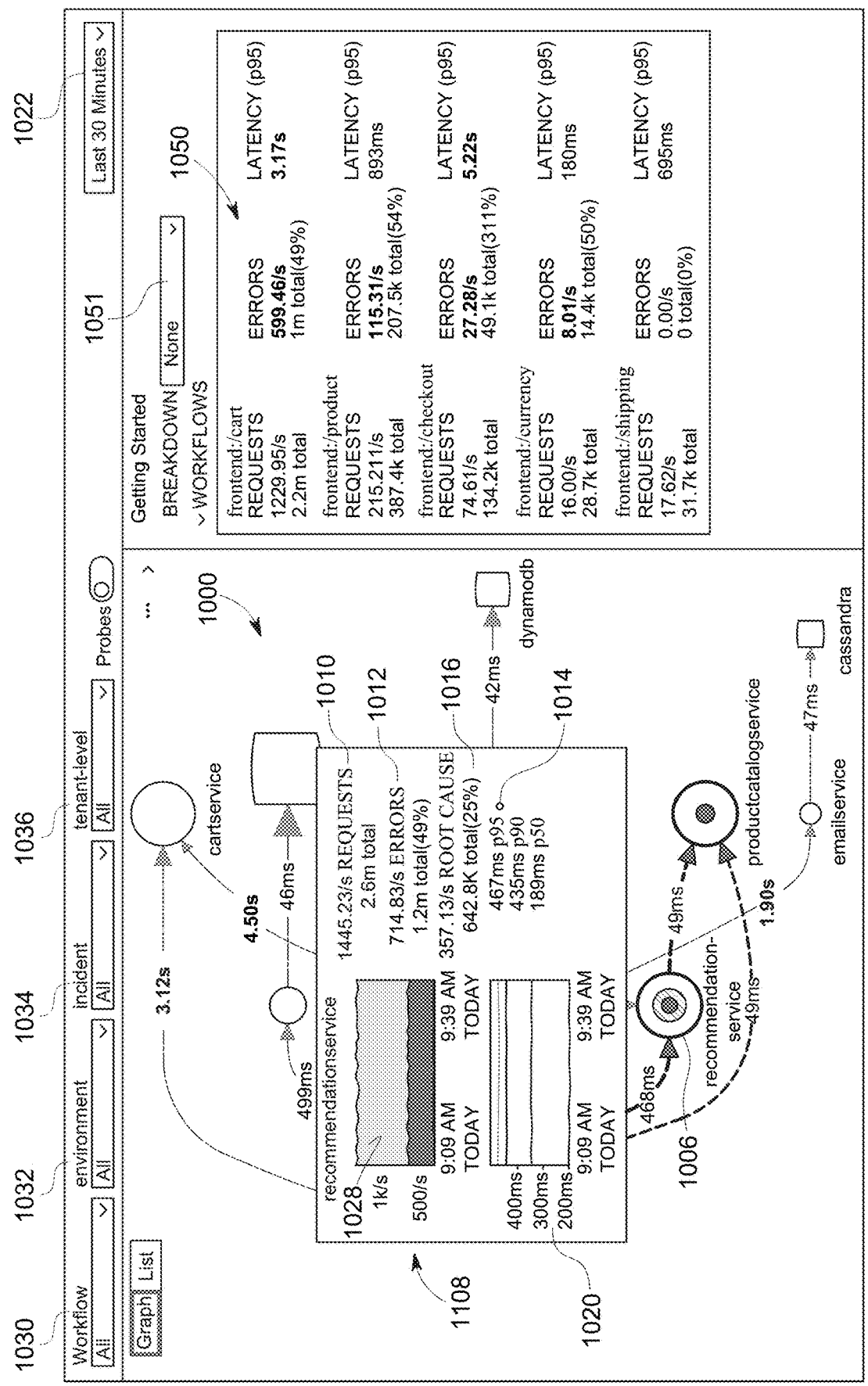
FIG. 10 illustrates an exemplary on-screen displayed GUI showing the manner in which a client may access SLIs pertaining to a service within an interactive topology graph, in accordance with implementations of the monitoring service disclosed herein.

FIG. 10 illustrates an exemplary on-screen displayed GUI showing the manner in which a client may access SLIs pertaining to a service within an interactive topology graph, in accordance with implementations of the monitoring service disclosed herein. As shown in FIG. 10, when a client hovers the cursor over the node associated with, for example, the recommendation service 1006, a pop-up window 1008 is overlaid on the service graph 1000 comprising SLIs pertaining to the recommendation service 1006. Specifically, SLIs pertaining to Requests 1010, Errors 1012 and Latency percentiles 1014 are provided. Furthermore, in an implementation, information pertaining to Root Cause 1016 is also provided to the client.

For example, the SLIs related to Requests 1010 comprise information regarding the rate of requests and number of requests serviced by the recommendation service 1006 during a specific time duration. The time duration over which the SLIs are calculated may be adjusted using drop-down menu 1022. The time duration over which SLIs are calculated may vary, for example, from 1 minute to 3 days. As indicated by the time axis on hover chart 1028, for this example, a time window of 30 minutes (from 9:09 to 9:39 a.m.) is selected.

In an implementation, the pop-up window 1008 also provides the client information pertaining to SLIs related to Errors 1012. In the example of FIG. 10, the pop-up window 1008 provides information regarding the error rate and the total number of errors that occurred during the specified time duration. The client is also provided information regarding what percentage of the total number of requests resulted in errors.

In an implementation, the pop-up window 1008 also provides the client information pertaining to Latency Percentiles 1014 and a graphical representation 1020 of the same. For example, SLI p95 indicates that for 95% of the users, the latency for servicing the requests was less than 467 ms. Latency-related SLIs also include information regarding p90 and p50 percentiles. The graphical representation 1020, in the example of FIG. 10, shows the latency information regarding the p95 percentile graphically.

In one implementation of the monitoring service disclosed herein, the pop-up window 1008 also displays information pertaining to errors for which the selected service was the root-cause. The Root Cause information 1016 includes the number of errors for which the selected service (e.g., the recommendation service 1006 in the example of FIG. 10) was the originator, the associated error rate and the percentage of the total number of requests that represents. In this way, implementations of the monitoring service disclosed herein, in addition to providing clients visual cues for identifying root cause error originators, are also able to provide meaningful and accurate quantitative information to help clients distinguish between root cause-related errors and errors associated with downstream causes.

Note that the SLIs displayed in the pop-up window 1008 are computed accurately using the metrics data gathered for the metric events modality. Because implementations of the monitoring service disclosed herein are able to ingest up to 100% the incoming span data (without sampling), the SLIs are computed factoring in all the incoming data, which results in accurate measurements. For the example of FIG. 10, there were a total of 2.6 million requests served by the recommendation service 1006 at a rate of 1445.23 requests/second ("sec"). Of these, 1.2 million of the requests resulted in errors at a rate of 714.83/sec, which represents approximately 49% of the total number of requests. In this way, implementations of the monitoring service disclosed herein provide a modality of analysis that enables a client to gather critical SLIs pertaining to the recommendation service 1006 including an indication of how many of the errors originated at the recommendation service 1006.

Figure 11:
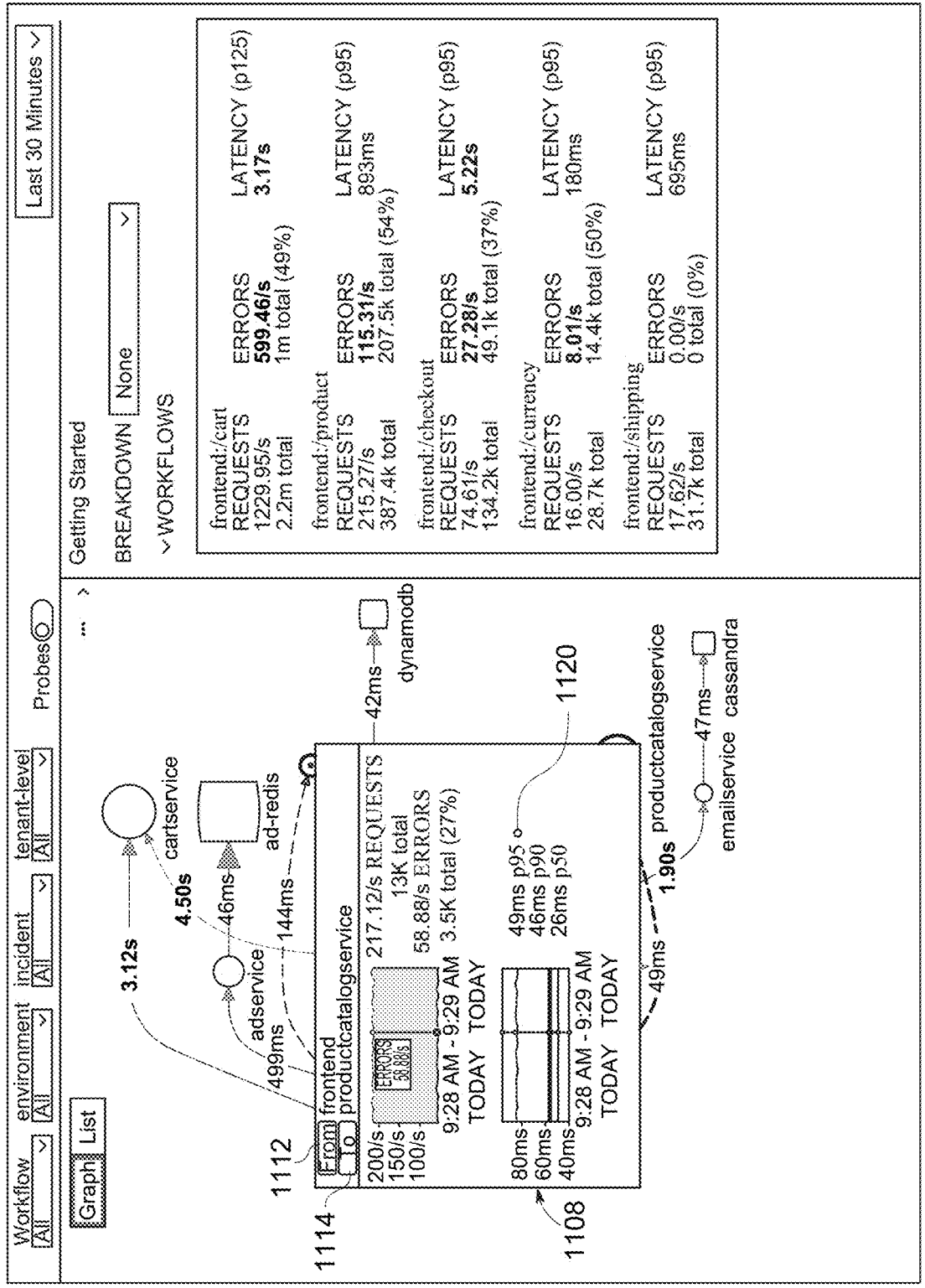
FIG. 11 illustrates an exemplary on-screen GUI showing the manner in which a client may access SLIs pertaining to an edge within an interactive topology graph, in accordance with implementations of the monitoring service disclosed herein.

FIG. 11 illustrates an exemplary on-screen GUI showing the manner in which a client may access SLIs pertaining to an edge within an interactive topology graph, in accordance with implementations of the monitoring service disclosed herein. The SLIs pertaining to edges are also computed using the metrics data associated with the metric events modality. As shown in FIG. 11, if a client hovers over or selects a particular edge, e.g., the edge 924 (as shown in FIG. 9) (which represents the cross-service dependency of the front-end service 902 on the product catalog service 906) a pop-up dialog box 1108 opens up on-screen that reports SLIs specific to the dependency. The "From" field 1112 represents the service that executes the call and the "To" field 1114 represents the service that is called (the service that the calling service depends on). As shown in the dialog box 1108, SLIs pertaining to the number of requests (or calls) that were made, the number of those that returned in errors, and the latency associated with servicing the requests are provided. It should be noted that a latency value 1120 of 49 ms shown in FIG. 11 for this particular dependency may be annotated directly on the edge of the service graph. For example, as shown in service graph 900 of FIG. 9, edge 924 of the service graph 900 in FIG. 9 indicates the latency value 970 (e.g., 49 ms) directly on the edge in the service graph allowing a client to efficiently gather information regarding latency associated with the dependency.

In an implementation, as shown in FIG. 9, the edges within the application topology graph are annotated with their corresponding latency values. In this way, implementations of the monitoring service disclosed herein efficiently compute SLI data from the metrics information aggregated for this modality and advantageously enable developers to gather meaningful and accurate information regarding cross-service dependencies directly from the service graph 900.

In one implementation, the metrics data associated with the metric events modality are used to compute accurate SLIs across multiple dimensions. Further, implementations of the monitoring service disclosed herein support high dimensionality and high cardinality tags for the metric events modality. In one implementation, the GUI of FIG. 10 may display one or more attribute (or tag) categories that comprise dimensions that may be varied across the service graph 1000. In other words, the metrics data and the service graph may both be scoped by one of the various dimensions and also a time-range, which is helpful for keeping track of an architecture that is evolving.

For example, attribute categories (e.g., Workflow 1030, environment 1032, incident 1034 and tenant-level 1036) may be depicted within the GUI, each of which may correspond to attributes that may be varied to compute SLIs and error-related information for different combinations of the attributes. The categories of dimensions across which the SLIs may be computed, include, but are not limited to, workflow 1030, environment 1032, incident 1034 and tenant-level 1036. Each of the categories comprises a drop-down menu with options for the different dimensions. Using the drop-downs to select a different scope may result in a re-drawing of the service graph or a re-calculation of the metrics data to correspond with the selected scope. The metrics events data allows clients to easily and rapidly compute measurements across various cross-combinations of tags or attributes.

In an implementation, the GUI may include a panel 1050 that may display SLIs across the various workflows. Further, the GUI allows clients the ability to break down the workflows across multiple different attributes using drop down menu 1051. The computations for each of the break-downs may be efficiently determined using the metrics data aggregated for the metric events modality.

Figure 12:
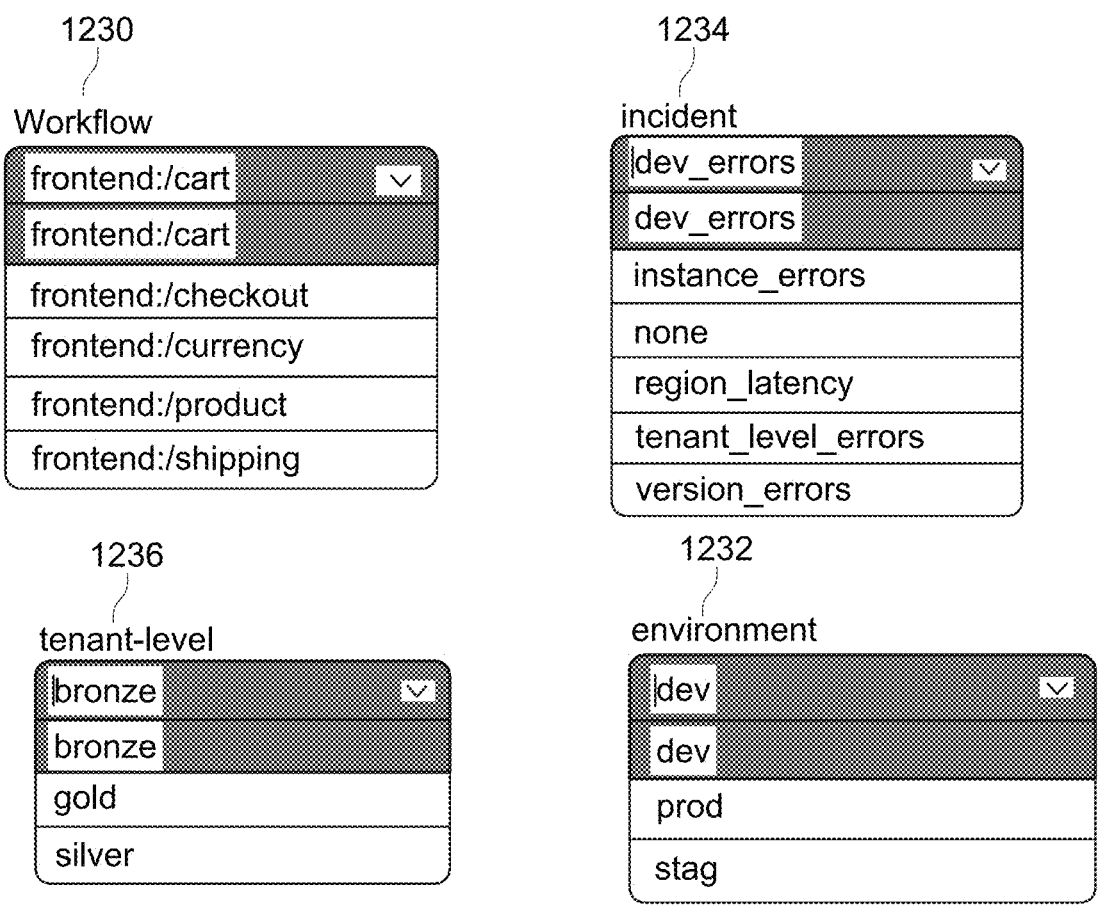
FIG. 12 illustrates on-screen displays that represent exemplary categories of dimensions across which SLIs may be computed, in accordance with implementations of the monitoring service disclosed herein.

FIG. 12 illustrates on-screen displays that represent exemplary categories of dimensions across which SLIs may be computed, in accordance with implementations of the monitoring service disclosed herein. The exemplary category of dimensions corresponds to the categories associated with drop-down menus (e.g., 1030, 1032, 1034 and 1036) discussed in connection with FIG. 10. The metrics data aggregated using the metric event modality allows clients to easily and rapidly compute measurements across various cross-combinations of attributes. As noted above, using the drop-downs to select a different scope may result in a re-drawing of the service graph or a re-calculation of the metrics data to correspond with the selected scope. Drop-down on-screen menu 1230, for example, corresponding to workflow, illustrates different workflows specific to the application discussed in connection with FIG. 9. A "workflow" is a type of category of dimension of the request that was processed; a workflow may be conceptualized as a type of "global tag" that is attributed to each span in a given trace. A workflow may, for example, be associated with a type of client process, e.g., "checkout," that is generated on the back-end in response to a request.

Similarly, drop down on-screen menus 1234, 1236 and 1232, relating to incident, tenant-level and environment respectively, provide further categories of dimensions across which SLIs may be computed. Each of the drop down on-screen menus 1230, 1232, 1234 and 1236 comprises various dimensions (associated with the respective categories) across which aggregations may be scoped. For example, the client may submit a query asking for the number of requests in a trace where "Workflow=frontend:/ cart" and "incident=instance_errors" and "tenant-level= gold." By aggregating metrics data associated with the indexed tags, the metric events modality is able to respond to the client's query rapidly and efficiently.

Note that SLIs may be computed for each attribute of the categories in FIG. 12 and also for each combination of attributes associated with the categories. In an implementation, for each combination of attributes selected using one or more of the drop-down menus, the client may be able determine the computed SLIs (e.g., by hovering a cursor over the various nodes and edges of the graph after the dimensions have been selected using, for example, the drop-down menus shown in FIG. 10). In this way, implementations of the monitoring service disclosed herein enable a client to use the metric events modality to slice the application topology graph across several different attributes.

It should be noted that clients might have different attributes or dimensions that may be of interest for their respective application. In an implementation, the monitoring platform may be configured to provide insight into client-specific dimensions. Consequently, the specific attributes or dimensions available in each of the drop-down menus may vary by client.

4.2.1 Metric Events Data Generation and Persistence

Figure 13:
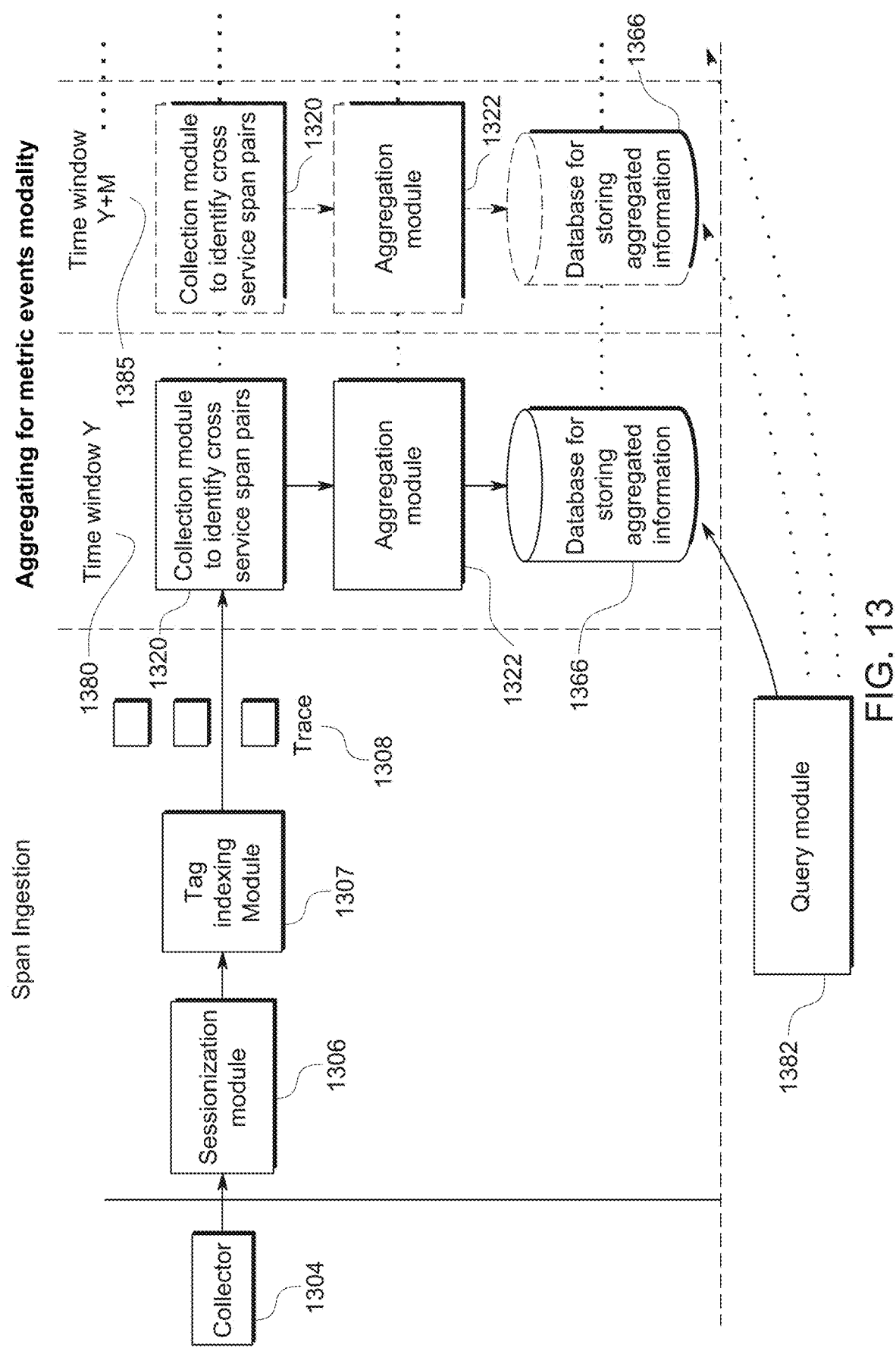
FIG. 13 is a flow diagram that illustrates an exemplary method of aggregating metrics data from ingested traces for the metric events modality, in implementations according to the present disclosure.

FIG. 13 is a flow diagram that illustrates an exemplary method of aggregating metrics data from ingested traces for the metric events modality, in implementations according to the present disclosure. As mentioned previously, span information is received at a monitoring service from a collector 1304. The span information is then combined into traces 1308 in real time using module 1306 in a process called sessionization as discussed in connection with FIG. 5. The sessionization process may consolidate traces (from spans) within a first time window (associated with time window Y 1380) before transmitting the traces to the collection module 1320. Thereafter, the sessionization process may consolidate traces within the subsequent window (associated with time window "Y+M" 1385).

Subsequent to consolidation, the trace data is indexed by tag indexing module 1307, which indexes one or more tags in the trace data. The tags may be client-selected tags or tags that the monitoring platform is configured to index by default. In one implementation, the metric events modality indexes a subset of tags associated with the spans of a trace, but indexes that set of tags with perfect accuracy because the metrics calculated take into account all the ingested spans.

In one or more implementations, collection module 1320 receives one or more traces 1308 generated within a predetermined time window Y 1380, and traverses the traces to identify and collect cross-service span pairs that represent cross-service calls. To collect the cross-service span pairs, the collection module 1320 identifies parent-child span pairs in a given trace where the service name for the parent and the child are different. Stated differently, the collection module 1320 will collect each pair of spans that has a parent-child relationship and where each of the two spans in the pair are associated with a different service. The service name of a span may be identified in a span-level tag included with each span. Alternatively, there may be other conventions for identifying a service name associated with a span, e.g., a special field within the span for the service name.

Identifying and collecting the cross-service span pairs from the incoming spans are advantageous because they enable the monitoring platform to track information that will be most relevant to a client, e.g., to render the service graph and display the SLIs associated with the various dependencies between services. Spans associated with calls to internal operations that a service might make may not be of interest to an application owner and may, therefore, be ignored by the collection module 1320 when determining the cross-service span pairs.

It should be noted that, in one implementation, once the cross-service span pair is identified, indexed tags may be extracted for the cross-service span pair by determining a service tier for the respective parent and child spans of the span pair. A service tier is a subset of spans in a trace that logically identifies a single request to a service. Accordingly, both a parent span and a child span in the cross-service span pair are associated with a respective subset of related spans known as a service tier. Indexed tags are extracted by the collection module 1320 from service tiers associated with a cross-service span pair. In a different implementation, however, the tags may be extracted directly from the parent span and child span in a cross-service span pair rather than the respective service tier associated with the parent span or child span.

In one or more implementations, once the cross-service span pairs are collected and the indexed tags extracted from the respective service tiers, the collection module 1320 maps one or more selected tags for each service in the cross-service span pair to tag attributes, e.g., selected tags in a parent span (associated with the originating service) are mapped to a "FROM" tag attribute and selected tags in a child span (associated with the target service) are mapped to a "TO" tag attribute. This enables directionality information for the cross-service calls to be preserved. It will be appreciated that while the discussion herein focuses on "FROM" and "TO" tag attributes to indicate the direction of the dependency between services in a cross-service call, there may be several different ways to record dependency information between the two services.

In one implementation, the aggregation module 1366 of the monitoring platform aggregates across the cross-service span pairs by maintaining a count for each unique set of "FROM" tag attributes (and their corresponding values) to "TO" tag attributes (and their corresponding values) for a cross-service pair. It should be appreciated that in this implementation, counts are maintained at the tag level for the cross-service span pair (rather than at the service level). Accordingly, a separate count is maintained for each set of parent span tags (mapped to a "FROM" tag attribute) and child span tags (mapped to a "TO" tag attribute) for a cross-service pair. The count is increased each time the aggregation module encounters the same unique set of "FROM" tag attributes (associated with tags of a parent span) and "TO" tag attributes (associated with tags of a child span) for the same cross-service span pair in one or more traces. In a different implementation, the count may be maintained at the service level. Accordingly, the count may be increased each time the same cross-service span pair is encountered within the trace information ingested from the client.

The aggregation module 1322 advantageously prevents duplication by storing a single instance of each unique set of "FROM" tag attributes and "TO" tag attributes for a given cross-service span pair with an associated count in the storage module 1366. The information in the storage module 1366 may be accessed by querying module 1382 where the querying module 1382 determines that the query is associated with the metric events modality. The querying module 1382 may, for example, be associated with the query engine and reporting system 324 discussed in FIG. 3.

The aggregated cross-service "FROM" and "TO" tag attribute sets and associated count values stored in the storage module 1366 may be used by the querying module 1382 to respond to queries in accordance with the metric events modality. Note that the collection and aggregation process is repeated for subsequent time windows (including window Y+M 1385) after time window Y 1380. In this way, the aggregation process is performed over time. This allows the metric events modality to deliver query results over varying time durations (as discussed, for example, in connection with the drop-down menu 1022 in FIG. 10).

FIG. 14 is a table illustrating an exemplary manner in which selected tags for each service in a cross-service span pair may be mapped to tag attributes and stored as part of a memory-resident data object associated with an edge in the service graph, in implementations according to the present disclosure. As noted above, in one or more implementations, once the cross-service span pairs are collected, the monitoring platform maps selected tags associated with each service in the cross-service span pair to tag attributes, e.g., selected tags in a parent span are mapped to a "FROM" tag attribute and selected tags in a child span are mapped to a "TO" tag attribute. The mapping is performed to allow directionality information for the cross-service calls to be preserved. For example, a data object for an "edge" (corresponding to an edge or dependency in the topology graph) may be created that comprises both the FROM-type of tag attributes and the TO-type of tag attributes. In one implementation, one or more edge data objects similar to the one shown in FIG. 14 is used to persist the data for the metric events modality (in addition to node data objects which will be discussed in connection with FIG. 15B).

The table of FIG. 14 illustrates an exemplary manner of storing a data object associated with an edge in the service graph. The table comprises two services, Service A and Service B, in an application. Both Service A and Service B comprise indexed tags "span.kind" and "region." Tag "span.kind" may have two possible values, "client" and "server." Similarly, tag "region" may have two possible values, "us-west" and "us-east."

If all possible combinations exist in Service A, there may be 4 unique tag combinations associated with the "FROM" tag attribute, e.g., {(span.kind=client, region=us-west) (span.kind=client, region=us-east) (span.kind=server, region=us-west) (span.kind=client, region=us-east). Similarly, if all possible combinations exist in Service B, there may also be 4 unique tag combinations associated with the "TO" tag attribute. Assuming there is a complete interaction between Service and Service B, there may be 16 (4×4) different edges between the two services based on the unique set of "FROM" and "TO" type tag attributes.

Note that the example in FIG. 14 illustrates information for two unique sets of "FROM" and "TO" tag attributes. Edge 1490 is associated with a TO-type attribute of "region=us-east" while edge 1492 is associated with a TO-type attribute of "region=us-west." Because the two sets of "FROM" and "TO" attributes are not identical, a separate count is maintained for each. The edge 1490 has an associated count of 2, while the edge 1492 has an associated count of 1. To determine the total number of requests or total count associated with the cross-service call from Service A to Service B, the number of counts for each set of "FROM" and TO" tag attributes for an associated cross-service call may be summed up. In the example of FIG. 14 then, a total of 3 requests is computed to occur between Service A and Service B.

In one implementation, data sets for the metric events modality are stored as row of metrics extracted from the indexed tags in the service tiers, where each row is associated with either an edge or a node in the service graph. In an implementation, the edges on the service graph (e.g., the edges 922 and 926 of FIG. 9) are rendered using both the "FROM" and "TO" tag attribute sets because rendering the edges requires information regarding directionality. The counts for the "FROM" and "TO" tag attribute sets for a given cross-service span pair are summed up to yield the number of requests made between the two services associated with the span pair. In other words, edges are rendered in the service graph by grouping "FROM" and "TO" tag attribute sets associated with a cross-service call and summing up the request counts associated with the cross-service call. In an implementation, this grouping may be performed using "group by" statements in a query language, e.g., SQL. In one implementation, the value of the number of requests between two services may be used to determine the thickness of the edge between the two services in the service graph.

In one implementation, the nodes (e.g., nodes associated with services 902, 904, 906) on the service graph are also rendered using the aggregated cross-service "FROM" and "TO" tag attribute sets. However, rendering the nodes does not require directionality information and, therefore, the nodes may be rendered by collecting and extracting information from the "TO" type tag attributes. Stated differently, the nodes are rendered by grouping the "TO" tag attributes associated with a given service and summing up the request counts associated with the service. In an implementation, this grouping may be performed using "group by" statements in a query language, e.g., SQL. The "TO" tag attributes represent new services being called within the microservices architecture. Accordingly, the counts associated with "TO" tag attributes for a given service may be summed up to determine the total number of requests made to the service. In one implementation, the value of the number of requests may also be used to determine the size of the node when rendering the service graph.

In an implementation, the "TO" type tag attributes for rendering the nodes may be aggregated separately from the "FROM" and "TO" tag attribute sets aggregated for rendering the edges. In the exemplary table of FIG. 14, information for Service B may be determined, for example, by analyzing the "TO" type tag attributes in the table.

Figure 15A:
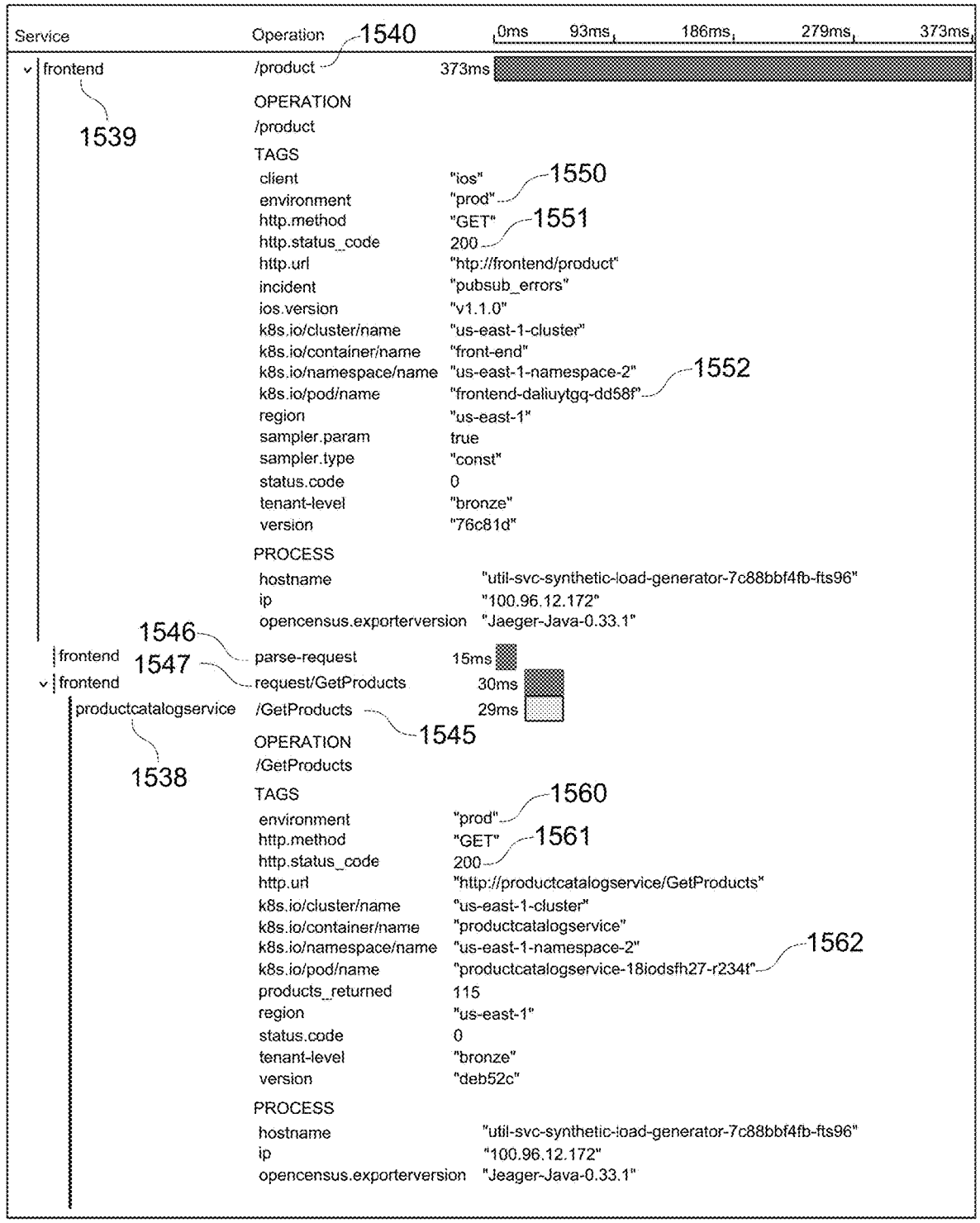
FIG. 15A illustrates an exemplary on-screen GUI showing a visual representation of a portion of an exemplary trace illustrating a cross-service call, in implementations according to the present disclosure.

FIG. 15A illustrates an exemplary on-screen GUI showing a visual representation of a portion of an exemplary trace illustrating a cross-service call, in implementations according to the present disclosure. As shown in FIG. 15A, front-end service 1539 makes a call to product catalog service 1538. Accordingly, the front-end service 1539 and the product catalog service 1538 comprise a cross-service span pair. Note that spans 1540, 1546 and 1547 may be part of the service tier for front-end service 1539. Accordingly, even though the call is made by the span 1547 ('frontend: request/GetProduct') to span 1545 ('productcatalogservice: /GetProducts), indexed tags associated with the front-end service 1539 may also be extracted from the spans that are part of the service tier for the front-end service 1539. In one implementation, the first matching tag within a service tier is extracted. For example, indexed tag "environment=prod" 1550 may be extracted from the span 1540, even though it is repeated in the spans 1546 and 1547 because the span 1540 comprises the first matching instance of the tag 1550. Assuming tags "environment" (referred to herein as "env"), "http.status_code" (referred to herein as "code") and "k8s.io/pod/name" (referred to herein as "pod") are indexed, then tags 1550, 1551 and 1552 are extracted from the front-end service 1539 while tags 1560, 1561 and 1562 are extracted from the product catalog service 1538.

In an implementation, the extracted indexed tags are mapped to tag attributes. The extracted tags 1550, 1551 and 1552 in the parent span (associated with the front-end service 1539) may be mapped to a "FROM" tag attribute while the extracted tags 1560, 1561 and 1562 in the child span may be mapped to a "TO" tag attribute. In one implementation, the mapped tags may be used to create node and edge data objects that are used to persist data for the metric events modality as shown in FIG. 15B.

Figure 15B:
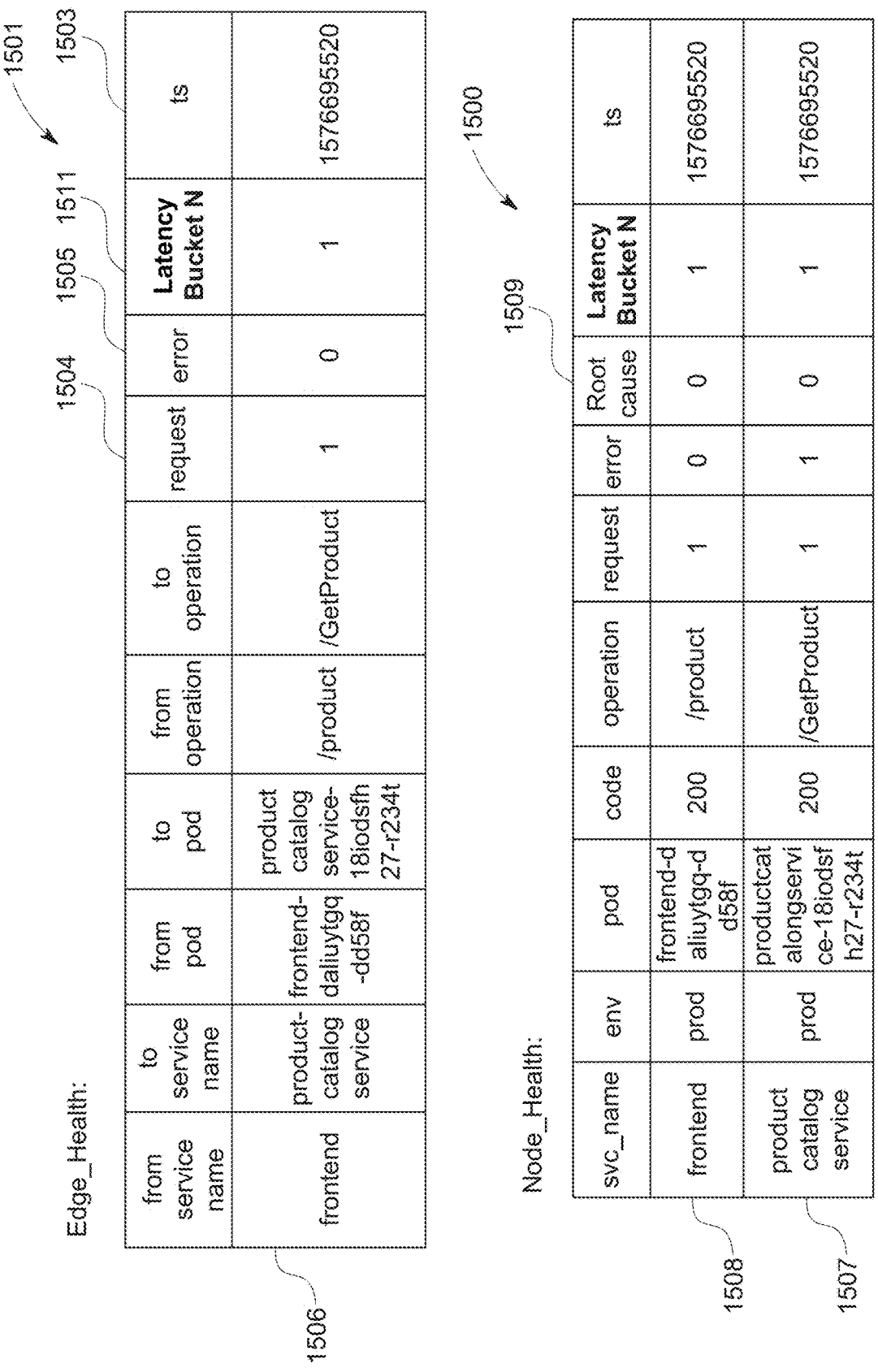
FIG. 15B illustrates the manner in which data in the metric events modality is persisted using an edge data object comprising a memory-resident table of tag attributes with associated counts and using a node data object comprising a memory-resident table of tags with associated counts, in implementations according to the present disclosure.

FIG. 15B illustrates the manner in which data in the metric events modality is persisted using an edge data object comprising a memory-resident table of tag attributes with associated counts and using a node data object comprising a memory-resident table of tags with associated counts, in implementations according to the present disclosure. In one implementation of the monitoring service disclosed herein, a memory-resident table 1501 titled "Edge Health" may be maintained to keep track of the various dependencies in the application. The table 1501 may be stored in, for example, in the storage module 1366 (in FIG. 13). A memory-resident table 1500 titled "Node Health" may be maintained to keep track of the various service nodes in the application. Both tables comprise aggregated rows comprising metrics values. In one implementation, these rows are stored efficiently for fast aggregation.

For example, the table 1501 may comprise one or more exemplary rows related to the cross-service span pair discussed in connection with FIG. 15A. Row 1506 is one exemplary row that may be generated for the cross-service span pair of FIG. 15A. Note that for simplicity, only tag attributes "from pod" and "to pod" are illustrated in row 1506 in FIG. 15B, but row 1506 would typically also comprise information for tag attributes associated with indexed tags "code" and "env" that are also indexed. As discussed above, each row for the cross-service span pair of FIG. 15A will comprise a unique set of "FROM" and "TO" tag attributes. For example, if the front-end service (e.g., front-end service 1539 in FIG. 15A) makes multiple calls to the product catalog service (e.g., product catalog service 1538 of FIG. 15A), but any of the calls are associated with different values for the "pod" tag from the values shown in row 1506, the information would be recorded in a new row. In other words, each row records a single unique combination of tag attributes and service names. If the value of either the "from pod" or "to pod" tag attribute changes, a new row is created to record the information. Accordingly, there may be multiple rows in the table 1501 for the cross-service call discussed in connection with FIG. 15A, where each row would comprise a unique combination of "FROM" and "TO" tag attributes for a given cross-service span pair.

Each row in the table 1501 comprises a count value for number of requests 1504, errors 1505 and latency 1511. The requests 1504 are incremented each time the same cross-service call with the same unique set of attributes for a respective row is observed on a trace. The errors 1505 are incremented each time a request associated with a respective row is observed on a trace that has an error. The latency 1511 metric relates to a histogram of the duration that a respective request took. Further, each row comprises a timestamp 1503 to record the time of the cross-service call.

Using the metrics associated with the requests 1504, errors 1505 and latency 1511 and the timestamp 1503, aggregations on the rows may be performed quickly and efficiently to determine SLIs for varying ranges of time. In response to a client query then, the numeric rows in the tables 1500 and 1501 may be summed into either timeseries buckets or into a single number depending on the query.

In one implementation, the metric events modality may maintain a separate memory-resident table 1500 titled "Node Health" in system memory associated with the service nodes in the application. Each row in the memory-resident table 1501 comprises a unique combination of service names and associated tags. For example, row 1508 is associated with the front-end service (e.g., service 1539 in FIG. 15A) and comprises corresponding tag values for "env," "pod" and "code." Similarly, row 1507 is associated with the product catalog service (e.g., product catalog service 1538 of FIG. 15A) and comprises corresponding tag values for "env," "pod" and "code."

Each unique combination of service name and corresponding tag values is associated with metrics that are maintained in the memory-resident table 1500, e.g., request, error and latency (as discussed in connection with table 1501). These metrics may be used to perform fast and efficient aggregations. For example, if the client queried the number of times "env=prod" in the application, assuming the two exemplary services illustrated in table 1500 are the only ones where "env=prod," the request counts in each row would be aggregated to provide a result of 2.

Note that the memory-resident table 1500 may also comprise a "root cause" metric 1509 which tracks the number of times the corresponding service was the root cause of an error. For example, the "root cause" metric may be aggregated using the memory-resident table 1500 across multiple rows to determine the number of times each given service in an application was the root cause for an error.

In one implementation, a software tool may be employed to perform faster aggregations across the rows of tables 1500 and 1501. For example, Apache Druid, which is an open-source data store designed for sub-second queries on real-time and historical data, may be used to perform the aggregations rapidly and efficiently. In different implementations, other tools may also be used to perform aggregations. In one implementation, the information in the memory-resident tables 1500 and 1501 may be used in the metric events modality to perform the metrics aggregations for rendering the service graph (e.g., graph 900 of FIG. 9) and computing the associated SLIs.

In one implementation, the metrics event modality may also store Trace IDs associated for each unique combination of cross-service span pairs and corresponding indexed tags. In one implementation, the aggregation module 1322 (of FIG. 13) of the monitoring platform aggregates across the cross-service span pairs by maintaining one or more exemplary Trace IDs for each unique set of "FROM" tag attributes (and their corresponding values) to "TO" tag attributes (and their corresponding values) for a cross-service pair.

Accordingly, exemplary Trace IDs may be maintained for each unique cross-service call.

The exemplary Trace IDs stored with each unique set of "FROM" and "TO" tag attributes for a cross-service span pair may be used by the querying module 1382 to respond to queries requesting more particularized information pertaining to non-indexed tags associated with the spans. For example, if a client needs particularized information regarding span performance or span duration, the querying module 1382 may be able to use the aggregated rows of information stored in a database associated with the storage module 1366 to access one or more exemplary Trace IDs associated with the call. Using the Trace IDs then, the querying module may be able to access the sessionized traces 1308 and perform analytics on the retrieved exemplary traces to deliver the requisite span performance and span duration information. In one implementation, the full trace information may be accessed from a storage set associated the full-fidelity modality, which stores the entire traces as ingested following sessionization. In a different implementation, however, the metric events modality may save full trace information for traces associated with the exemplary Trace IDs in a separate storage from the data set associated with the full-fidelity modality. In one implementation, because the metric events modality allows clients to retrieve raw trace data, it also allows clients to run an analysis on the retrieved data for an arbitrary set of tags (instead of being limited to the tags pre-indexed by indexing module 1307).

The metric events modality is particularly advantageous in circumstances where the client has identified a problem from the information provided by the metric time series. Having identified a problem either by manual monitoring of RED metrics or through an automatically generated alert, the client may be able to traverse deeper using the metric events data set and access relevant traces to receive more specific information regarding the problem. Also, the metric events modality allows the client to run an arbitrary analysis on the traces, e.g., on a set of tags that has not previously been indexed, which provides the client with specific information that may be used to diagnose and resolve the problem.

FIG. 15C illustrates the manner in which data in the metric events modality is persisted using an edge data object comprising a memory-resident table of extracted indexed tag attributes with associated Trace IDs and using a node data object comprising a memory-resident table of extracted tags with associated Trace IDs, in implementations according to the present disclosure. In one implementation of the monitoring service disclosed herein, a memory-resident table 1531 created to persist data is associated with the various dependencies in the application. Also, a memory-resident table 1530 created to persist data for the metric events modality is associated with the various service nodes in the application. Note that table 1531 is created in a similar way to table 1501 in FIG. 15B and that table 1530 is created in a similar way to table 1500 of FIG. 15B. Instead of tracking RED metrics, however, the tables in FIG. 15C comprise a column for Trace IDs 1590 and Exemplar Type 1591. It should be noted that, in one implementation, memory-resident table 1531 may be maintained in combination with memory-resident table 1501 and that memory-resident table 1530 may be maintained in combination with memory-resident table 1500.

Row 1597 in table 1531 is one exemplary row that may be generated for the cross-service span pair of FIG. 15C. Note that for simplicity, only tag attributes "from pod" and "to pod" are illustrated in row 1597 in FIG. 15C, but row 1597 would typically also comprise information for tag attributes associated with indexed tags "code" and "env." As discussed previously, each row for the cross-service span pair of FIG. 15A will comprise a unique set of "FROM" and "TO" tag attributes. Accordingly, there may be multiple rows in table 1531 for the cross-service call discussed in connection with FIG. 15A, where each row would comprise a unique combination of "FROM" and "TO" tag attributes for a given cross-service span pair. Each row in table 1531 comprises a Trace ID 1590, which keeps track of one or more Trace IDs associated with the unique combination of service names (and operation names) and tag attributes for the given row. In other words, the combination of service names (and operation names) and tag attributes in each row may comprise an index to access the associated Trace IDs.

In one implementation, the Exemplar Type column 1591 tracks the type of exemplary trace associated with the Trace ID. Types of exemplars may be request, error, root cause errors or some latency bucket identifier. The Trace IDs in each row may be accessed to identify and retrieve the full trace associated with the ID for further analysis, e.g., an analysis on an arbitrary set of tags associated with the trace.

In one implementation, the monitoring system may maintain a separate table 1530 associated with the service nodes in the application. Rows 1595 and 1596 in table 1530 are two exemplary rows that may be generated for the cross-service span pair of FIG. 15A. Each row in table 1530 comprises a unique combination of service and associated tags. For example, row 1595 is associated with the front-end service (e.g., service 1539 in FIG. 15A) and comprises corresponding tag values for "env," "pod" and "code." Similarly, row 1596 is associated with the product catalog service (e.g., product catalog service 1538 of FIG. 15A) and comprises corresponding tag values for "env," "pod" and "code."

Each unique combination of service name and corresponding tag values is associated with a Trace ID and Exemplar type that is maintained in table 1530.

As noted above, in one implementation, metrics event data may be persisted in tables that consolidate the data shown in FIG. 15B and FIG. 15C. For example, table 1501 may comprise an additional column to track Trace IDs and similarly table 1500 may comprise an additional column to track Trace IDs.

The Trace IDs may be used in metrics events modality to retrieve full traces for more detailed analysis. In one implementation, full traces associated with the exemplary Trace IDs may be maintained in a dedicated storage associated with the metric events. In a different implementation, the full traces may be accessed from a data set associated with the full-fidelity modality.

It should be noted that the metric events modality can comprise higher-cardinality metrics information because a higher number of tags may be indexed for the metric events data set as compared to the dimensions associated with the metric time series. However, the metric time series modality may provide higher-fidelity information because it retains metadata associated with incoming spans (e.g., service name, operation name, count values, etc.) that are not collected in the metric events modality. Further, the metric time series modality also allows clients to configure alerts against one or more time series to monitor incoming data in real-time. Because metric events are generated from post-sessionized traces, the metrics data associated with metric events may not be computed as rapidly as compared with the metric time series modality.

4.3 Full-Fidelity Modality

In one implementation, the full-fidelity module 524 of FIG. 5 stores all the incoming trace data from the sessionization process in real time. Unlike the prior two modalities, the full-fidelity modality stores the trace data in its raw form. In one implementation, the data is stored in parquet-formatted batches of full traces in an unstructured format (e.g., blob storage) along with some metadata. The metadata may comprise the tags associated with the trace (both indexed and unindexed) and other properties such as service name and operation for more efficient querying. In one implementation, the format of the metadata may comprise a map of a service name to a map of tag names, wherein each tag name may be mapped to a list of tag values. The batches of full traces in unstructured format and the metadata are queried in the full-fidelity modality using a robust data engine to search for any tag across the traces. For example, PRESTO is an open source distributed SQL query engine that may execute queries against data sources of varying sizes.

Figure 16:
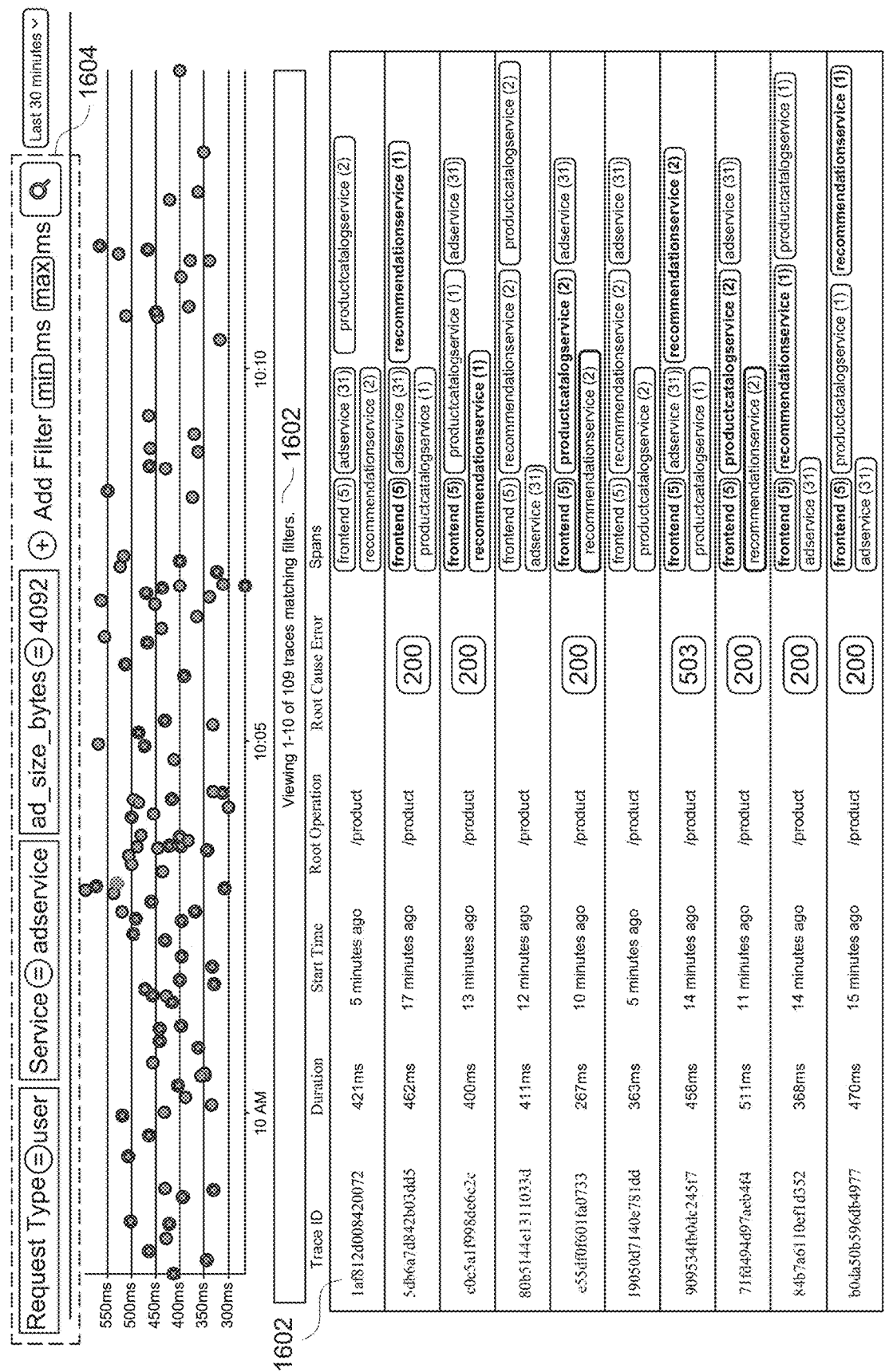
FIG. 16 is an exemplary on-screen GUI showing the manner in which a client may submit a query to be executed against the full set of traces stored in connection with the full-fidelity modality, in accordance with implementations of the monitoring service disclosed herein.

FIG. 16 is an exemplary on-screen GUI showing the manner in which a client may submit a query to be executed against the full set of traces stored in connection with the full-fidelity modality, in accordance with implementations of the monitoring service disclosed herein. The full-fidelity modality, in one implementation, allows a client to execute a query against arbitrary tags to receive a set of traces that matches the query. For example, in the GUI of FIG. 16, the client enters a query 1604 for traces where "Request Type=user," "Service=adservice" and the tag "ad_size_bytes=4092." In response, the platform returns a list 1602 of the traces matching the client-entered filters and, further, provides information about the traces, e.g., the Trace ID, duration, start time, root operation, root cause error status code and associated spans. As mentioned previously, the traces retrieved in response to a query may be analyzed to determine performance summaries for the spans comprised therein. Alternatively, the span performance analysis can be computed on all the traces stored as part of the full-fidelity data set.

In one implementation, the monitoring platform has the ability to run a full trace search (as shown in FIG. 16), and feed the traces collected into other modalities of analysis to get more detailed information about an arbitrary set of traces and an arbitrary set of attributes associated with the set of traces.

5.0 MULTIPLE MODALITIES FOR PERFORMING REAL USER MONITORING (RUM)

RUM is the practice of using data from an application or website's real-life users to monitor and understand application performance. RUM tracks metrics such as DNS timing, time-to-first-byte, full page load time, JavaScript errors and the time it takes to load specific elements. These metrics are collected by monitoring actual user sessions. By monitoring real-user data across a variety of end-user configurations, browser versions, operating systems, feature flags, user status, locations, etc., software delivery teams can identify problems that undercut the user's digital experience and user satisfaction. RUM is a specific type of application monitoring that relies on the passive collection of data produced by real users to identify application availability or performance issues. RUM provides insights that are difficult to achieve through other performance monitoring techniques because it synthesizes and reports on data collected from actual human users. While APM is used to monitor backend services and the interaction between them, RUM may be used to monitor activity and provide visibility all the way from the browser through the network down to the backend services.

There are several challenges associated with implementing an observability platform (e.g., monitoring service 306 of FIG. 3) that can perform both APM and RUM-related computations within a heterogeneous distributed system. One of the challenges associated with computing metrics for both RUM and APM, for example, is efficiently ingesting and aggregating significant amounts of span and trace data generated by a website or application. Conventional tracing and monitoring systems are simply unable to ingest vast amounts of span and tracing data and, therefore, have to resort to sampling the data intelligently to reduce the volume of stored trace data. Using sampling exclusively, however, results in data loss and, as a result, conventional monitoring tools do not allow clients access to all the spans and traces generated by real user interactions with a website or application. Furthermore, conventional monitoring tools may calculate real-user metrics based on the sampled set of data and, accordingly, the calculations may be approximate at best and inaccurate at worst.

Implementations of the monitoring service (e.g. monitoring service 306) disclosed herein advantageously allow clients of the monitoring service the ability to ingest up to 100% of both RUM and APM-related spans and to generate metric data using the ingested spans. For RUM-related spans, for example, streams of metric time series data may provide clients with valuable real-time information pertaining to webpages (e.g. metrics related to accessing a particular endpoint provider) and also allow alerts to be configured to manage anomalous behavior associated with the webpages. Ingesting up to 100% of all span data also allows clients of the monitoring platform to retrieve responses to queries requiring a high degree of resolution, e.g., specific queries pertaining to specific user interactions with an application or browser over specific periods of time. Conventional monitoring tools that sample data simply are not able to provide accurate responses to queries requiring a high degree of resolution because they do not save all the generated span or trace data.

Note that as used herein, "users" refers to real-life users of an application or website, whereas "client" refers to a frontend developer of the application or website or site reliability engineer (SRE) (associated with the application or website) using a monitoring platform (e.g. monitoring service 306) to monitor the interactions of the real-life users with the application or website.

In addition to ingesting and storing up to 100% of the APM-related spans, implementations of the monitoring service disclosed herein also sessionize and store up to 100% of the RUM-related spans (e.g., spans generated as a result of a real user interacting with a website or application) received from the client in real time. Implementations of the monitoring service comprise an ingestion streaming pipeline that can ingest and consolidate the incoming spans into traces, and is further able to use advanced compression methods to store the traces. Within the RUM instrumentation, implementations of the monitoring service may use traces to organize units of activity and may also extract all necessary metrics based on the trace data. In one or more implementations, the monitoring service may use spans to organize units of activity and may also extract all necessary metrics based on the span data. In one implementation, the monitoring platform may also be able to compute certain metrics associated with the entirety of a user session.

Because incoming trace and span information may be efficiently ingested and aggregated in real time, the monitoring platform is able to advantageously convey meaningful and accurate information (without the need for sampling) regarding the frontend interactions of a user with a website or an application, e.g., page load times, HTTP requests, time-to-first-byte, etc. High-cardinality metrics may be calculated with a high degree of accuracy because all incoming data is accounted for and there is no data loss as a result of sampling.

Implementations of the monitoring service disclosed herein further allow a client to store and analyze the RUM data using multiple modalities of analysis (similar to the modalities for APM data discussed in connection with FIG. 5). In one implementation, a first modality comprises converting incoming RUM-related spans (or traces) from one or more clients into a plurality of metric data streams (also referred to as metric time series) prior to sessionizing the spans. The plurality of metric data streams computed for RUM data are similar to the metric data streams created for APM data discussed above. Each metric time series is associated with a single span identity, where a base span identity comprises a tuple of information corresponding to an associated type of span. Each metric time series in this modality (referred to herein as "metric time series modality") represents a plurality of tuples, with each tuple representing a data point. Key performance metrics (KPIs) can be extracted directly from the metric time series in real-time and reported. Because the metric time series are created without paying a time penalty associated with sessionization, they can be used to perform real-time monitoring with sub-second resolution and to generate alerts within two to three seconds if a condition is violated.

In one or more implementations, a second modality of analysis sessionizes the incoming RUM-related spans and supports deriving higher-cardinality metrics (as compared with metric time series data) for a selected set of indexed tags, e.g., client-selected tags, global span tags, etc., over selected time durations (referred to herein as the "metric events modality"). The metric events computed from RUM data are similar to the metric events computed for APM data discussed above. In one implementation, however, the higher-cardinality metrics for the metric events modality for RUM data is generated directly from span data without needing to wait for the traces to be fully sessionized. In other words, generating metric events and extracting higher-cardinality metrics from spans for RUM may be more efficient that for APM because the monitoring service does not need to wait to store and consolidate the incoming spans into traces in order to generate the metric events or compute the higher-cardinality metrics. Because RUM data typically comprises spans generated by a user interacting with a browser or application, the metrics can be computed directly from the span data, as compared with APM data where the spans need to be consolidated into the traces to provide a complete picture of the manner in which the spans traverse through the various services in an application. Accordingly, generating metric events for RUM data is typically faster than generating metric events for APM data.

This modality is particularly useful for clients that need accurate SLI information for a larger set of high-value indexed tags. The metric events modality enables developers to aggregate metrics that have been pre-generated using the RUM span data to efficiently respond to queries submitted by a client. The aggregated real-user metrics help a client monitor end-user experience by providing visibility into the performance of a website or an application. Note that the metric events modality may not provide real-time streaming metrics and data retention that the metric time series modality provides.

In one or more implementations, the metric events modality track exemplary RUM-related spans associated with a pre-configured set of indexed tags (similar to the manner discussed in FIG. 15C for APM-related traces). The tags to be indexed may be pre-selected by the client or the monitoring platform. The Span IDs or the Trace IDs may be used to retrieve the associated spans or traces and analysis on the spans or traces may be performed to generate more particularized information regarding an end-user experience of a website or application. In one implementation, once the spans or traces are retrieved, an analysis may be run on an arbitrary set of tags (in addition to the pre-configured indexed tags).

Additionally, in one or more implementations, a third modality of analysis may comprise a "full-fidelity" modality where a full-fidelity analysis may be conducted on any dimension or attribute of RUM data to gauge the performance of services in the microservices-based application (similar to the manner discussed in connection with FIG. 16). The full-fidelity modality allows clients to search most or all of the incoming span data (including all the tag data) that was ingested by the monitoring platform without relying on sampling. The full-fidelity modality may sacrifice speed for accuracy, and may be used by clients that need a more thorough analysis of the services across every dimension or attribute.

In an implementation, the three modalities associated with analyzing RUM-related data may be simultaneously supported by the monitoring platform by storing ingested trace data using three different formats, where each format corresponds to one of the three available modalities of analysis. Note that implementations of the monitoring service disclosed herein are not restricted to three discrete data sets. The data sets for the different modalities may overlap or may be saved as part of a single data set. When a client submits a query, the monitoring platform may determine which of the data sets is most suitable for addressing the query. Thereafter, the monitoring platform executes the query against the selected data set to deliver results to the client of the monitoring platform. By comparison, conventional monitoring systems typically focus on a single modality and do not provide clients the ability to seamlessly navigate between different modalities. Conventional monitoring systems also do not provide the ability to automatically select the most appropriate modality based on the content, structure, syntax or other specifics pertaining to an incoming query.

Figure 17:
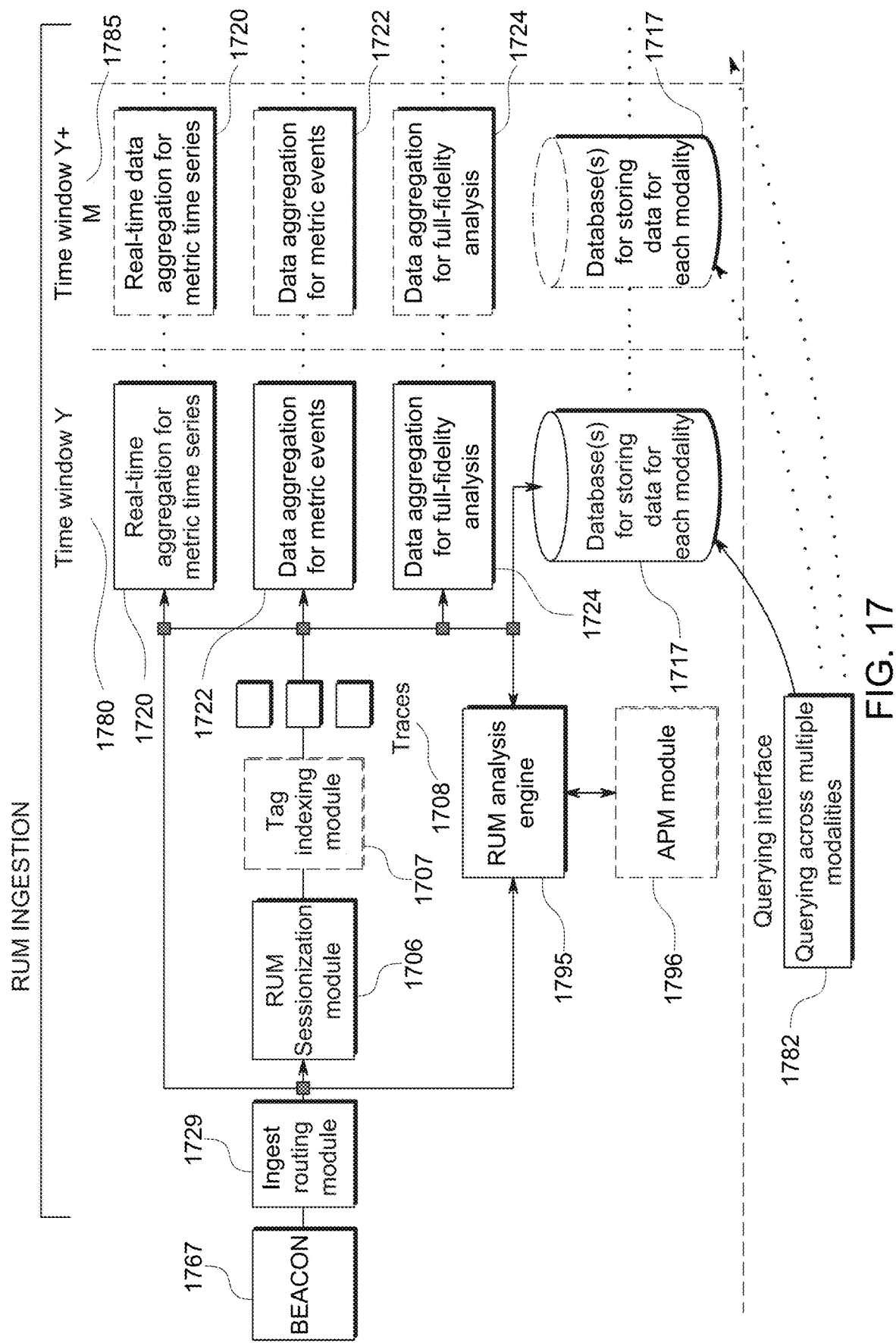
FIG. 17 is a flow diagram that illustrates an exemplary computer-implemented method of ingesting and aggregating span information to support multiple modalities of analysis for RUM, in accordance with implementations of the monitoring service disclosed herein.

FIG. 17 is a flow diagram that illustrates an exemplary computer implemented method of ingesting and aggregating span information to support multiple modalities of analysis for RUM, in accordance with implementations of the monitoring service disclosed herein. FIG. 17 illustrates the manner in which RUM ingest module 588 (discussed in FIG. 5) ingests and aggregates spans associated with RUM data. The RUM ingestion engine is similar to the APM ingestion engine, but may use a separate deployment from the APM ingestion engine.

In one implementation, RUM-related spans are received at the monitoring service 306 of FIG. 3 from the beacon 1767 (which performs substantially the same functions as beacon 567 of FIG. 5). The ingested spans may be sharded by session ID and organization ID. The spans received from the beacon 1767 are directed to an ingest routing module 1729 which may comprise different components, e.g., gateway services, load balancer, etc. In an implementation, ingest routing module 1729 may comprise a queue (not shown in FIG. 17) in which spans are stored prior to being sessionized by the RUM sessionization module 1706.

In one implementation, the incoming spans are converted into a plurality of metric data streams prior to consolidating the spans into traces. The metric data streams are generated by module 1720 prior to the spans being sessionized. Because the metric time series are created without paying a time penalty associated with sessionization, they can be advantageously used to perform real-time monitoring and alerting.

The incoming spans for RUM may also be sessionized where the span information is combined into traces in a process called sessionization. The RUM sessionization module 1706 is responsible for stitching together or combining the traces 1708. The traces associated with RUM may be used to organize units of activity and the necessary metrics may be extracted based on the trace data. Note that, in one implementation, the sessionized traces may also be input to the module 1720 to create metric time series to track traces (separately from the time series created to track spans).

In addition to a Trace ID, each trace also comprises a time-stamp; using the time-stamps and the Trace IDs, the RUM sessionization module 1706 creates traces 1708 from the incoming spans in real time and sessionizes them into discrete time windows. For example, the sessionization process may consolidate traces (from spans) within a first time window (associated with time window Y 1780) before transmitting the traces to modules 1720, 1722 or 1724. Note that in one implementation, the ingested RUM-related spans may be transmitted to modules 1720, 1722 and 1724 without consolidating them into traces, wherein metrics and other information may be extracted directly from the span data.

Subsequent to consolidating traces for the first time window, the sessionization process may consolidate traces within the subsequent time window (associated with time window "Y+M" 1785) before transmitting those traces to the modules 1720, 1722, or 1724. It should be noted that the time windows associated with each of the modules 1720, 1722, and 1724 may be different. In other words, the metric time series data may be collected over short time windows of 10 seconds each. By comparison, traces for the metric events modality (associated with the module 1722) may be collected over longer time duration windows. Note that while in certain implementations, each modality can persist at different resolutions, in other implementations, the time window durations and resolutions for all modalities may be the same.

In some implementations of the monitoring service disclosed herein, the RUM sessionization module 1706 for RUM-related spans is able to ingest, process and store all or most of the spans received from the beacon 1767 in real time. By comparison, conventional monitoring systems do not accept all of the incoming spans or traces; instead, they sample incoming spans (or traces) to calculate SLIs at the root level of a trace before discarding the spans. Implementations of the monitoring service disclosed herein, by comparison, comprise an ingestion streaming pipeline that is able to ingest all the incoming spans into traces in real time. Further, in one implementation, the monitoring service is also able to consolidate the spans into traces in real time, and is further able to use advanced compression methods to store the data. Further, implementations of the monitoring service disclosed herein are able to generate metric time series from the span data (prior to sessionizing the spans) to provide real-time monitoring and alerting of certain KPIs.

As noted above, the RUM sessionization module 1706 can collect all the traces within a first time window Y 1780 using the time-stamps for the traces. Subsequently, the sessionized traces are fed to the modules 1722 and 1724, for the respective modalities (metric events and full-fidelity) for extraction and persistence. Note that the tags analyzed for all three modalities in connection with RUM may be different than the tags analyzed for APM. In other words, each of the modules 1720, 1722 and 1724 may be configured to perform a RUM-focused tag analysis.

In one implementation, the incoming span or trace data is indexed by an optional tag indexing module 1707, which indexes one or more tags in the data. The tags may be client-selected tags or tags that the monitoring platform is configured to index by default. In a different implementation, tag indexing may be performed as part of data aggregation, e.g., by the modules 1720, 1722 and 1724. Note that in the implementation of FIG. 17, the tag indexing module 1707 will be configured to index tags that are needed to perform a RUM-focused tag analysis.

In an implementation, data sets associated with each of the modalities may be persisted in one or more databases 1717. It should be noted that while modules 1720, 1722 and 1724 perform substantially the same computations on RUM-related spans, as the corresponding modules 520, 522 and 524 perform on APM-related spans, the schema for persisting the RUM data in database 1717 may be different from the schema for persisting APM data in one or more databases 555 of FIG. 5. For example, RUM data may be aggregated at the session level (rather than at the trace level). Accordingly, even though incoming RUM-related spans may be sessionized into traces and trace data may be ingested for the full-fidelity modality (e.g., into module 1724), the data is consolidated and persisted based on session IDs.

As noted previously, the spans associated with RUM (ingested, for example, from the beacon 1767 may need to be treated differently from APM-related spans. For example, the spans related to RUM may need to be ingested and sharded by a session identifier (session ID) (and, optionally, an organization identifier) instead of using the Trace ID. A session ID is an identifier that connects a series of traces. RUM data is typically organized into page views (which show details of a page visit) and sessions (which group all the page views by a user in a single visit). A session ID is typically used to filter for all the views in a specific session. For RUM, a developer is typically more interested in the behavior of a user over the course of a session, e.g., a user session interacting with a particular website or application. Spans associated with RUM are usually sharded and tracked using a session identifier (or session ID). Accordingly, the way full-fidelity data for RUM data is persisted in database 1717 may be different from the way full-fidelity data is persisted for APM data.

For RUM, data is persisted in shards (or chunks) based on time and session TD rather than by traces where each shard or chunk is associated with a window of time in a user session. The full-fidelity modality for RUM data stores the chunks of data in raw form, e.g., in parquet formatted batches of spans in an unstructured format with some metadata. The metadata may comprise the tags associated with the trace (both indexed and unindexed) and other properties such as service name and operation for more efficient querying. In one implementation, the format of the metadata may comprise a map of a service name to a map of tag names, wherein each tag name may be mapped to a list of tag values. The batches of spans in unstructured format and the metadata are queried in the full-fidelity modality using a robust data engine to search for any tag across the traces. For example, PRESTO is an open source distributed SQL query engine that may execute queries against data sources of varying sizes.

At query time, data is retrieved in chunks from the memory to be analyzed to generate a response to the query. In one implementation, indexes are created within the full-fidelity data set in database 1717 to be able to efficiently find relevant data within the data set.

Figure 26:
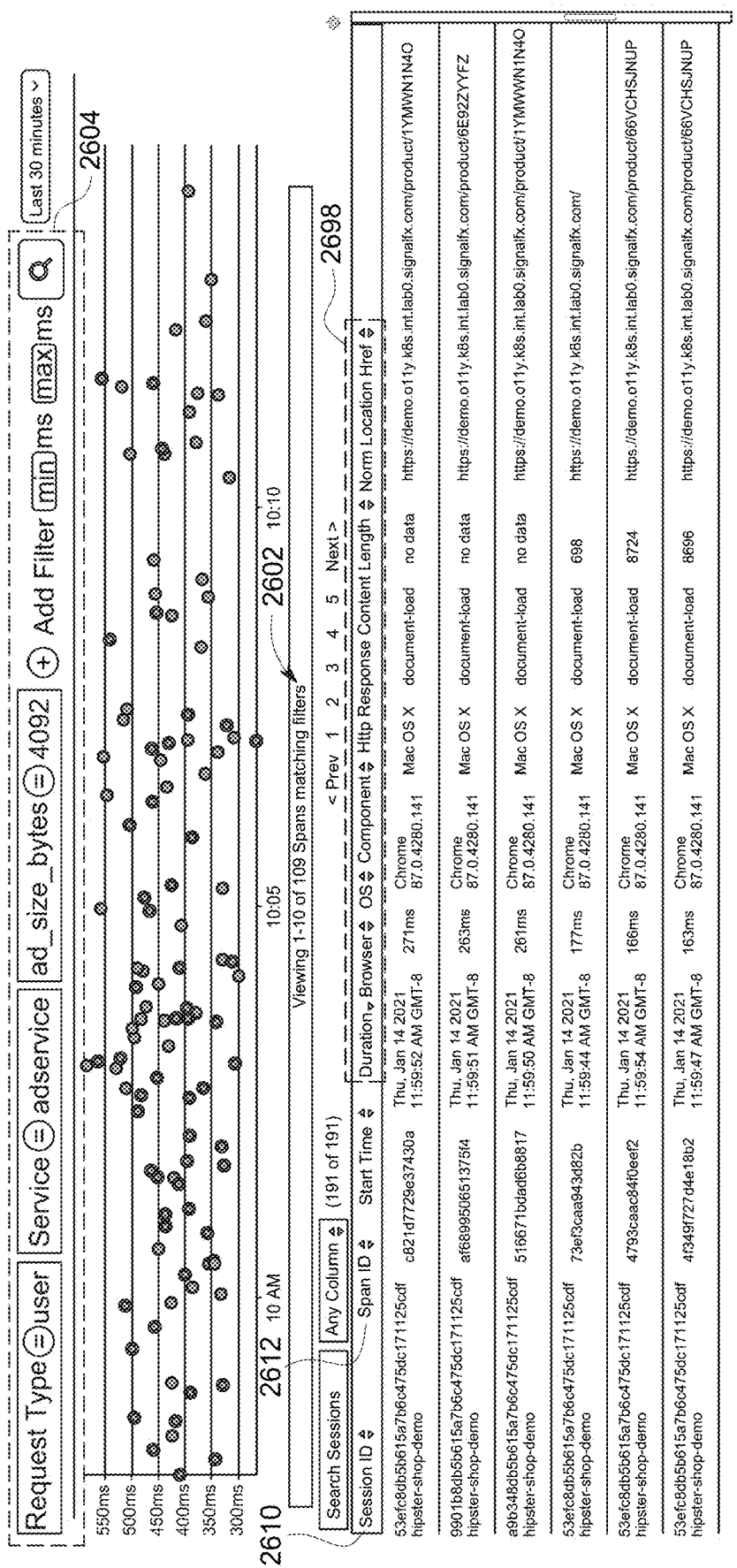
FIG. 26 is an exemplary on-screen GUI showing the manner in which a client may submit a query to be executed against the full set of spans for RUM data stored in connection with the full-fidelity modality, in accordance with implementations of the monitoring service disclosed herein.

FIG. 26 is an exemplary on-screen GUI showing the manner in which a client may submit a query to be executed against the full set of spans for RUM data stored in connection with the full-fidelity modality, in accordance with implementations of the monitoring service disclosed herein. The full-fidelity modality, in one implementation, allows a client to execute a query against arbitrary tags to retrieve a set of spans that matches the query. For example, in the GUI of FIG. 26, the client enters a query 2604 for traces where "Request Type=user," "Service=adservice" and the tag "ad_size_bytes=4092." In response, the platform returns a list 2602 of the spans matching the client-entered filters and, further, provides information about the spans, e.g., the session ID 2610, the span ID 2612, etc. Further, the platform provides other fields 2698 (e.g., duration, browser, Operating System, etc.) extracted from the frontend emitted span to represent RUM data. Note that the spans returned in response to the query 2604 are associated with a session ID 2610 (as compared to a Trace ID in connection with the APM full-fidelity modality discussed in FIG. 16).

In one implementation, the monitoring platform has the ability to run a full span search using the full-fidelity modality (as shown in FIG. 26), and perform a secondary analysis on the spans collected from with full-fidelity modality. The secondary analysis may yield valuable insights for the client and the results can be persisted in storage for efficient retrieval. Further, in one implementation, data extracted from the other modalities may be augmented with specific spans extracted from the full-fidelity modality to perform the secondary analysis.

In one embodiment, the specific spans may be input into other modalities of analysis to get more detailed information about an arbitrary set of spans and an arbitrary set of attributes associated with the set of spans.

Referring back to FIG. 17, the data sets for the respective modalities may be separate data sets, overlapping data sets or a single data set that supports all the modalities. Note that the databases 1717 may be a single database that stores data sets corresponding to all three modalities. Alternatively, the databases 1717 may represent different respective databases for each of the three modalities. Furthermore, the databases 1717 may also represent distributed databases across which relevant information for each of the three modalities is stored.

In one implementation, a RUM analysis engine 1795 retrieves information regarding backend traces from APM module 1796. APM module 1796 may extract APM trace information received from, for example, traces 508 in FIG. 5. The RUM analysis engine 1795 receives APM trace information and forms connections between the fronted RUM traces 1708 and the backend APM traces 508. This allows a client to monitor the manner in which errors or problems arising at the backend propagate to the frontend and vice versa. By connecting the frontend and backend traces, the monitoring platform is able to provide complete visibility into any transaction all the way from a user browser, through the network, and to any backend service.

In one implementation, data associated with each of the three modalities is generated at the time of ingestion and stored separately from each other. The structure, content, type or syntax of query submitted by a client will typically dictate which of the three modalities and corresponding data set will be selected. In one implementation, an interface through which the query is submitted may also determine which of the three modalities and corresponding data set is selected. In an implementation, there may be some commonality in the data for the three modalities in which case the storage for the data may overlap. An alternative implementation may also comprise one or two of the three modalities (instead of all three) described above.

A client may send in a request to retrieve information pertaining to a website or application through query interface 1782. Note that query interface 1782 may, in one implementation, be a common interface for querying both APM and RUM data. The underlying querying engine (e.g., the query engine and reporting system 324 from FIG. 3) will analyze the structure, content, type and/or syntax of the query, and also the interface through which the query is submitted, to determine to which of the modalities and respective data set to route the query for servicing.

In one implementation, the monitoring service may be able to consolidate both RUM and APM data at query time in order to respond to a user query. The query interface 1782 may be able to access modalities for both the APM and RUM-related data and provide a client with an appropriate response based on the query. In other words, in one implementation, the query can apply constraints to both the frontend RUM metadata and backend APM metadata, which allows a client to target both RUM and APM data using a single unified query. As noted above, the RUM analysis engine 1795 may form connections between the frontend and backend traces (as will be further explained below), which allow the query interface 1782 to target both the RUM and APM metadata with a single unified query. For example, at query time when a user submits a query through the query interface 1782, the monitoring service may retrieve RUM related data from the database 1717 and further retrieve APM data from the APM module 1796 (via the RUM analysis engine 1795). This way the frontend RUM span data may be aggregated with the corresponding APM backend traces in order to provide a response to the user query. Implementations of the monitoring service disclosed herein are, therefore, able to create a query time join of the RUM and APM data in response to a user submitting a query through the query interface 1782.

In an implementation, the data sets corresponding to the modalities are structured in a way that allows the querying engine to navigate between them fluidly. For example, a client may submit a query through the query interface 1782, which may potentially result in the query engine accessing and returning data associated with the metric events modality for RUM data. Thereafter, if the client requires more in-depth information, the querying engine may seamlessly navigate to data associated with a different modality (e.g., full-fidelity) to provide the client with further details.

By way of further example, a client may submit a query through the query interface 1782, which may potentially result in the query engine accessing and returning metric events associated with both RUM and APM data (using the linkage information from the RUM analysis engine 1795). Conventional monitoring systems, by comparison, do not provide more than a single modality or the ability to navigate between multiple modalities of data analysis. Further, conventional monitoring systems do not provide developers the ability to query both APM and RUM data using the same interface, or provide an aggregate analysis of the manner in which the APM and RUM data are connected, for example, by rendering a service graph that shown both frontend browser data and backend microservice data.

5.1 End-to-End Visibility of a Real User Session

In certain instances, a frontend developer or site reliability engineer may need an overview of an entire session (e.g., the entire time duration that a user is session-interacting with a particular website or application) of a real user interacting with a website, application or web interface to gain insights into the end-user experience. A session typically groups all successive page views by a single user in a single visit and can be upwards of an hour. The developer may also need end-to-end visibility of a user session for troubleshooting purposes, e.g., to determine where the user experienced lags or had problems with navigation. As noted previously, conventional monitoring tools are unable to provide developers with end-to-end visibility into a user's session nor do they offer the ability to intelligently and more thoroughly explore areas of interest within the session.

As noted previously, implementations of the monitoring platform disclosed herein are able to ingest, store and analyze significant amounts of data (e.g., span data, trace data, etc.) generated by both the frontend (e.g., a website) or the backend (e.g., a service on the backend) of an application owner's architecture. Further, implementations of the monitoring platform disclosed herein use the data efficiently to provide the developer with insights into the performance of a website or application or to detect problematic conditions associated with, for example, browser performance, network performance, erroneous processes, failing services, etc. In particular, implementations of the present monitoring platform are able to construct an end-to-end representation of an entire user session by ingesting up to 100% of the incoming spans from the client (e.g., clients' browser, etc.) into the SaaS backend of the monitoring platform and analyzing them.

Figure 18:
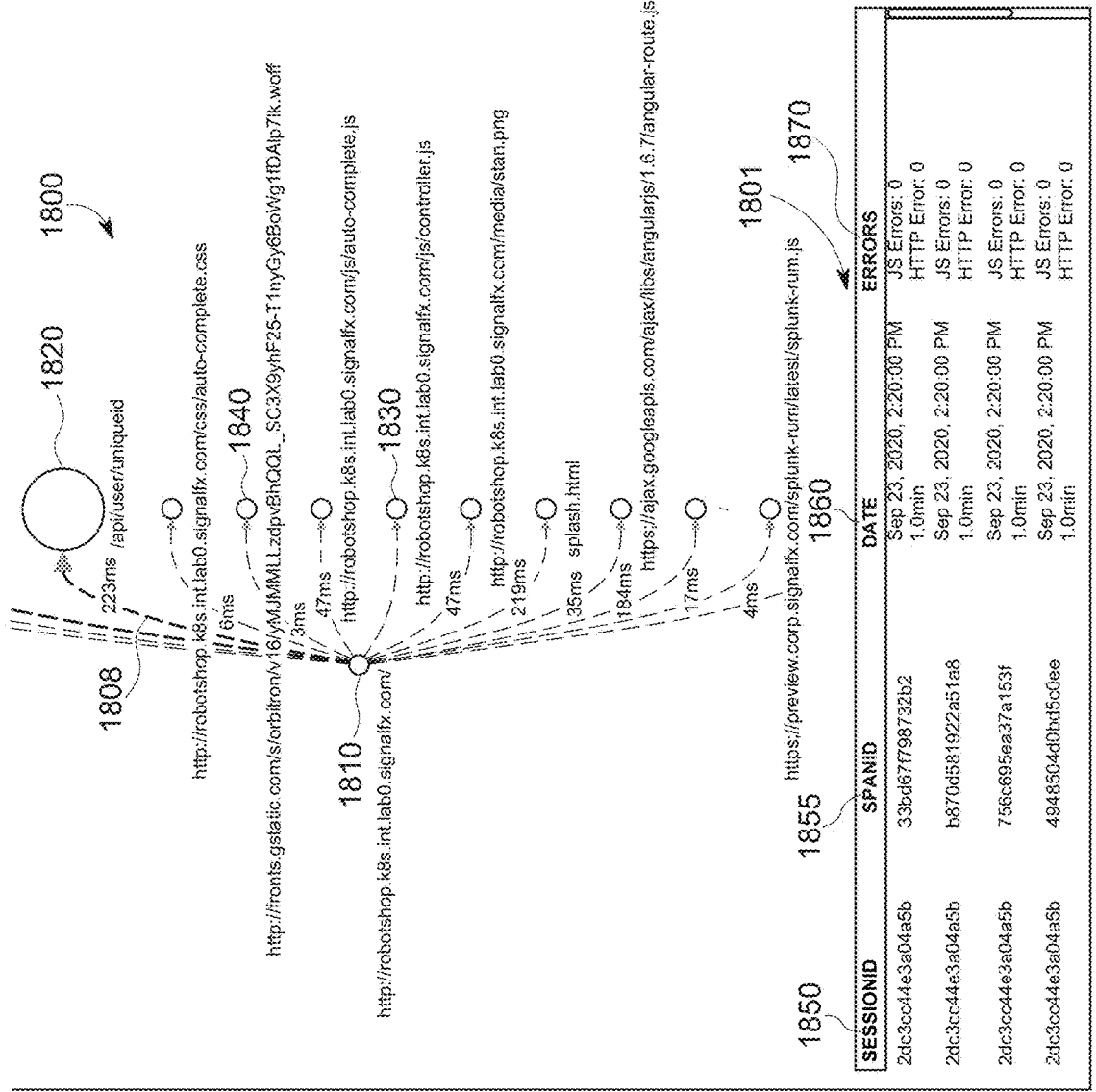
FIG. 18 illustrates an exemplary on-screen GUI comprising a service graph illustrating an access of one or more endpoints by a page with which a user is interacting, in accordance with implementations of the monitoring service disclosed herein.

FIG. 18 illustrates an exemplary on-screen GUI comprising a service graph illustrating an access of one or more endpoints by a page with which a user is interacting, in accordance with implementations of the monitoring service disclosed herein. The service graph 1800 may comprise one or more nodes (e.g. node 1810) that correspond to a page or a view (e.g., associated with a website URL or application) with which a user is interacting.

As shown in service graph 1800, the page represented by node 1810 makes calls to several endpoints (e.g., endpoints associated with nodes 1820, 1830, 1840, etc.). The endpoints correspond to resources that the page (represented by node 1810) is attempting to access. Several different types of endpoints may be displayed in service graph 1800, e.g., endpoints associated with static resources, endpoints associated with third party providers, etc. This allows a client to gain insight into the manner in which different endpoints and endpoint providers (e.g., third party providers) are influencing the end user experience. In one implementation, the size of a node associated with either a page or an endpoint provider conveys the amount of traffic related to the node (as was discussed in connection with FIG. 9).

In one implementation, an application name and/or activity name for a node may be displayed alongside the node. For example, the URL for the page associated with node 1810 (http://robotshop.k8s.int.lab0.signalfx.com) may be displayed alongside the node 1810 in the GUI. The application name or activity name may be extracted from span tags of spans associated with the node.

Note that in one implementation, the connections (e.g., edge 1808) shown in service graph 1800 may comprise metric information regarding the respective access as was discussed in detail in connection with FIG. 9. For example, the access from node 1810 to the endpoint provider associated with node 1820 takes 223 ms as shown on the edge 1808. In one implementation, the connection may also comprise information pertaining to an error rate.

The resources or endpoints may be either be internal or external with respect to a client of the monitoring platform. In one implementation, the endpoints may relate to external resources, e.g., an external service such as a payment processor, a content delivery network (CDN), etc. Alternatively, in one implementation of the monitoring platform, the resources may be part of a backend owned by the client. More specifically, the client may own existing backend infrastructure that supports one or more of the endpoints and can, therefore, exercise control over those endpoints. For example, nodes 1820 and 1840 may correspond to endpoints that a client's backend infrastructure supports. Because nodes 1820 and 1840 correspond to endpoints that a client controls, the client may be able to glean additional information regarding the behavior of those endpoints from its own backend, where the additional information may provide a client further insight into the performance of the endpoints.

Note that in one implementation, the service graph 1800 may be scoped by several constraints as discussed in connection with FIG. 10. To scope a service graph or similar visualization entails filtering and displaying the service graph or visualization across one or more constraints. In one implementation the GUI of FIG. 18 may include drop-down menus (not shown) that allow service graph 1800 to be filtered in accordance with different constraints, e.g., tags associated with environment, incident, etc. Further, the service graph 1800 may be filtered to display a particular type of endpoint or a specific view (or page).

In one implementation, the monitoring platform also provides information regarding spans that may be of particular interest to a client. For example, the GUI of FIG. 18 provides a list of exemplar spans (and the associated sessions in which they originate) associated with service graph 1800 in an adjacent panel 1801. The list of spans, in one implementation, may provide information regarding a session ID 1850, the span ID 1855 of the exemplary span, a timestamp 1860 for the respective span and any errors 1870 associated with the edge, page or endpoint which with the respective span is associated (e.g., HTTP errors, Javascript errors, etc.). As explained previously, the session ID 1850 is associated with a specific session that a user is actively participating on a platform provided by a client.

Note that a span ID 1855 is displayed in the panel 1801 as opposed to a Trace ID because for RUM (as compared with APM), the spans provide a higher level of resolution and convey more meaningful information to a client. One of the differences between browser-emitted spans (associated with RUM) and backend spans (associated with APM) is that each browser span has all the metadata needed to analyze it, e.g., sessionId, location.href, activity, all tags, etc. As explained above, in order to analyze events for RUM, a client need not wait for a sessionized browser trace to be able to analyze individual spans or any propagation of metadata. The client can extract necessary information directly from the spans. Accordingly, for example, metric events may be generated for RUM faster than they are generated for APM data because the monitoring platform does not need to wait for the spans to be sessionized into traces.

Note that the spans displayed in the panel 1801 may be exemplars that capture representative spans associated with the service graph 1800. Alternatively, the panel 1801 may list all the spans associated with the service graph 1800. Because the monitoring platform ingests all the spans associated with user activity, the monitoring platform has the option of either displaying up to 100% of the spans associated with the service graph 1800 or exemplar representative spans that provide an overview of the activity in the service graph 1800 (as shown in FIG. 18).

In one implementation, the panel 1801 may list one or more exemplar spans (for each session ID 1850) that capture activity in which a client may be interested, e.g., spans associated with a certain threshold number of errors, spans associated with different types of errors, spans associated with specific client selected endpoints or pages, spans associated with a key metric, etc. The monitoring platform may, therefore, be configured to either display one or more representative spans for a session that would be of particular interest to a client.

The list in the panel 1801 may comprise spans that are generated as a result of the calls made by one or more pages (or views) during a user session to various endpoints or resources. Each of the spans in panel 1801 may be associated with an access to a particular resource or endpoint as depicted in service graph 1800. Each span may be the result of an activity that is either user-generated or was generated for the user by a browser (or application) with which the user is interacting. Note that not all the spans shown in the list are the result of direct user-interactions with a browser. Some of the calls depicted in the service graph 1800 or spans shown in the panel 1801 may, for example, be generated by background threads or by other processes that support the browsing session.

In one implementation, the spans in the panel 1801 may be categorized to provide a user better insight into the types of resources with which the spans are associated. For example, spans may be categorized, for example, based on whether the resources being accessed are internal or external to a client of the monitoring platform. There may be other criteria for organizing the spans in the panel 1801 as well, e.g., spans related to CDN traffic, spans categorized by type of endpoint or resource accessed, spans relevant to a key metric, etc. Categorizing the spans advantageously allows a client of the monitoring platform to better understand traffic patterns and user behavior. In one implementation, the service graph 1800 may also be categorized so a client can visually distinguish between the various types of pages, endpoints and connections.

Figure 19:
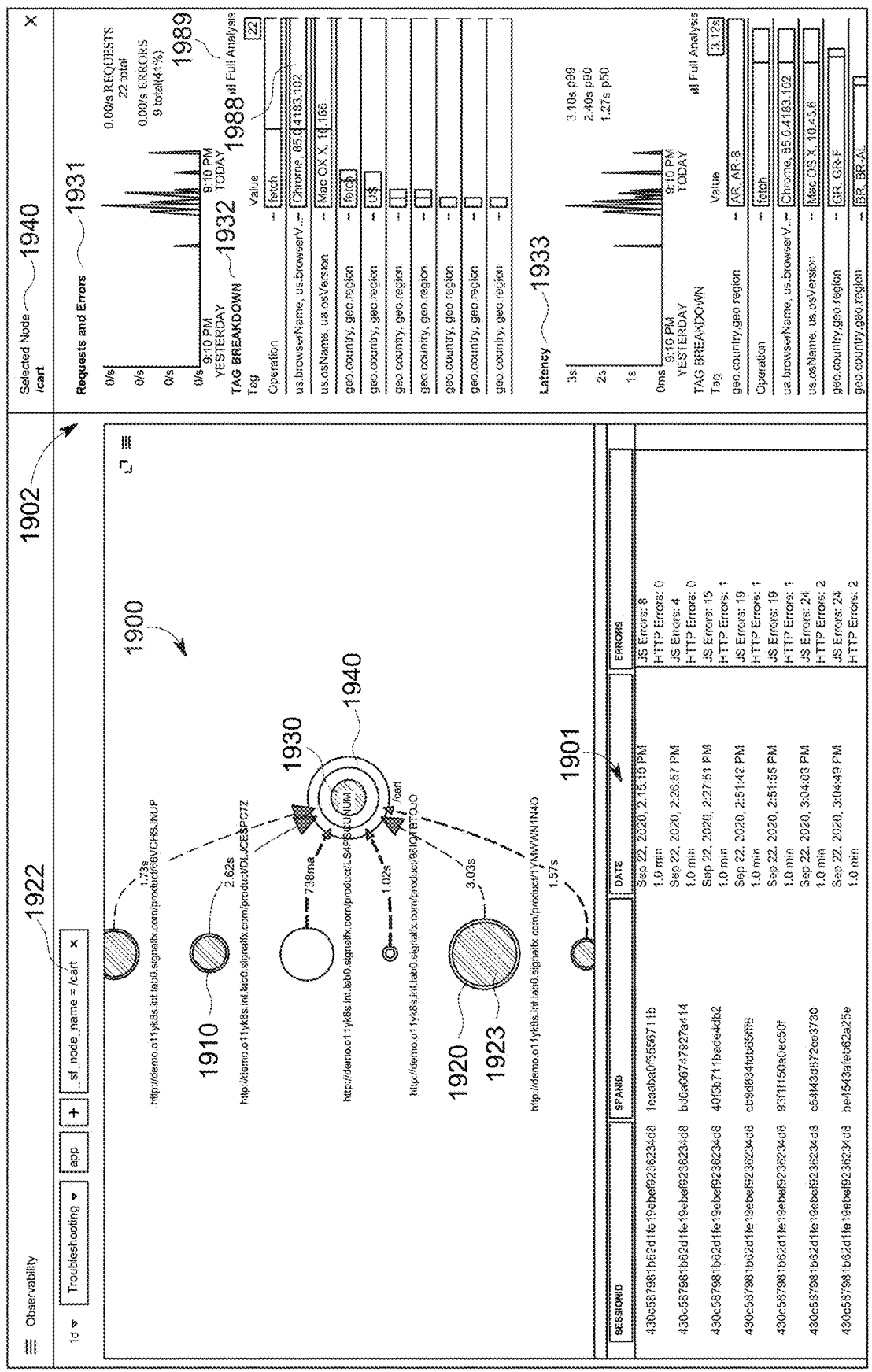
FIG. 19 illustrates an exemplary on-screen GUI comprising a service graph illustrating an access of an endpoint by multiple pages, in accordance with implementations of the monitoring service disclosed herein.

FIG. 19 illustrates an exemplary on-screen GUI comprising a service graph illustrating an access of an endpoint by multiple pages, in accordance with implementations of the monitoring service disclosed herein. The service graph 1900 depicts certain pages (e.g., pages associated with nodes 1910, 1920, etc.) in an application or website accessing a particular endpoint provider (e.g., the/cart endpoint 1940). As shown in FIG. 19, the service graph 1900 can be filtered by a particular endpoint, e.g., /cart endpoint 1940 using drop-down menu 1922. While FIG. 18 illustrates a page accessing several different endpoint providers, FIG. 19 illustrates that the service graph 1900 may also show several pages accessing a single endpoint provider.

In one implementation, similar to the service graph discussed in connection with FIG. 9, the service map may indicate the health of the various nodes. For example, certain endpoint nodes such as the/cart endpoint 1940 may comprise a solid-filled circular region 1930 indicating errors associated with the particular endpoint, where the size of the region 1930 indicates an approximate percentage of errors returned when the node is accessed. For example, the endpoint 1940 returns errors approximately 50% of the time when called. A page node, e.g., node 1920 with a solid-filled circular region, e.g., region 1923 indicates that the associated view had an error, e.g., a console error.

In one implementation selecting a particular node (e.g., endpoint 1940) may highlight corresponding spans associated with the node in an adjacent panel 1901. The client may then be able to further examine errors (e.g., HTTP errors, JavaScript errors, etc.) associated with various calls made from or to the node. In a different implementation, the panel 1901 may list exemplary spans of interest associated with the service graph 1900 (similar to the panel 1801 of FIG. 18) regardless of node or edge selection by a client.

In one implementation, the nodes in the service graph 1900, including nodes for both pages and endpoints, may be normalized. For example, a page or view in the service graph 1900 may be associated with several accesses corresponding to different HTTP URLs with slight variations. Instead of displaying a separate connection for each access, implementations of the monitoring service normalize the URLs by collapsing the different URL variations into a single URL, e.g., by substituting the more dynamic components of the URL using wildcards.

In one implementation, aggregated metrics associated with a selected node (e.g. the /cart endpoint 1940) may be displayed in a side-panel 1902. For example, requests and errors 1931 and latency 1933 associated with the/cart endpoint 1940 may be displayed in the side-panel 1902. It should be noted that metrics shown in the side-panel 1902 may be aggregated and computed using the metric events modality (e.g., using aggregated metrics from the metric event aggregation module 1722). In a different implementation, real-time metrics may also be computed using the metric time series modality (e.g., using metrics aggregated from the metric time series module 1720).

In one implementation, the side-panel 1902 may also provide a tag breakdown 1932 with values of all the indexed tags. The tag breakdown and analysis surfaces problems that a client may be interested in and prevents the client from going through all the data manually. For example, the tag value 1988 associated with the browser tag informs a client that most of the tags associated with errors for the/cart endpoint 1940 correspond to the Chrome browser. In other words, most of the errors for the/cart endpoint 1940 resulted from an access through a Chrome browser. In one implementation, clicking the full analysis option 1989 provides the client a full tag analysis. The full tag analysis allows a client to access a breakdown of the errors by the various tags.

Figure 20A:
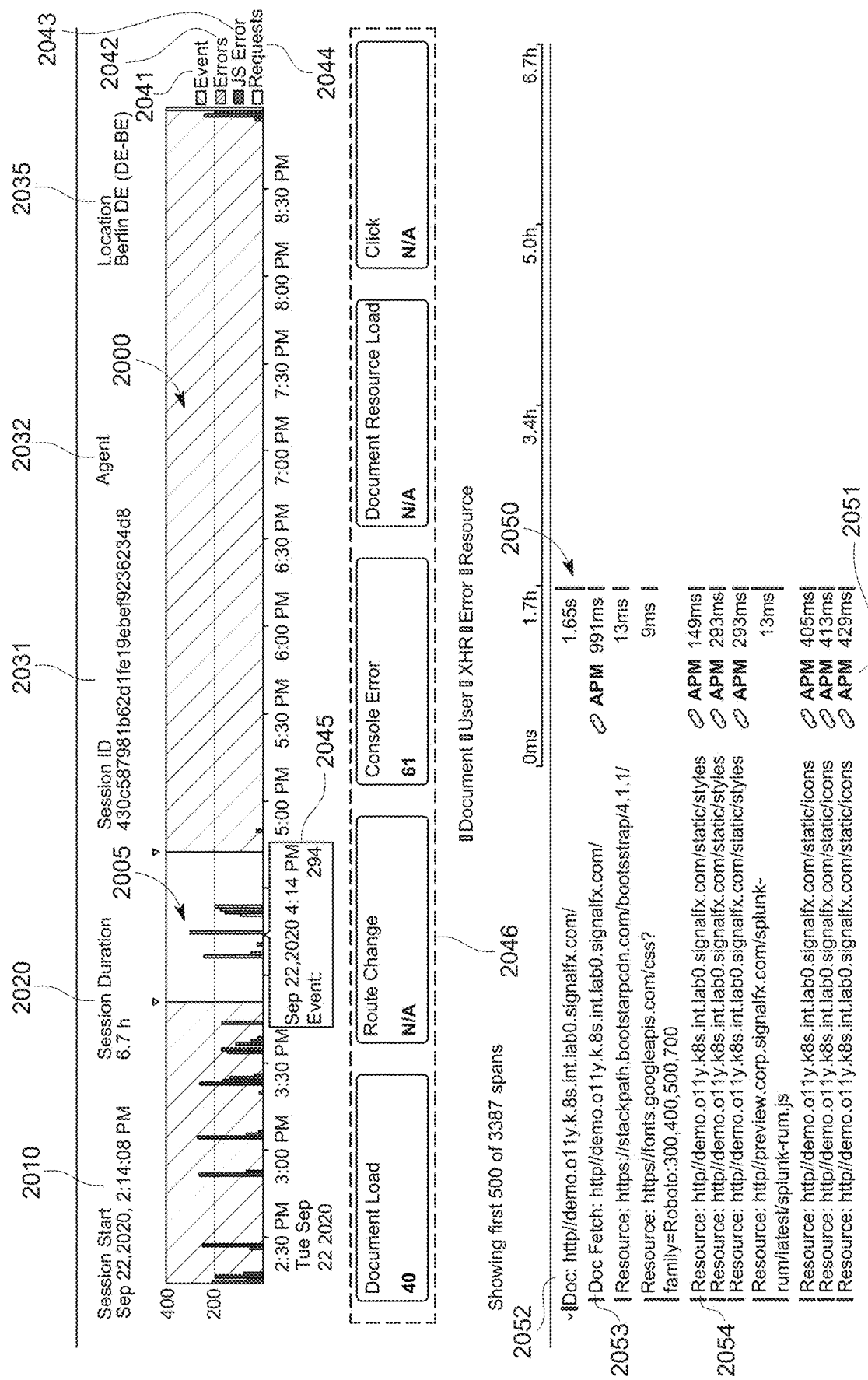
FIG. 20A illustrates an exemplary on-screen GUI comprising an end-to-end view of a user session, in accordance with implementations of the monitoring service disclosed herein.

FIG. 20A illustrates an exemplary on-screen GUI comprising an end-to-end view of a user session, in accordance with implementations of the monitoring service disclosed herein. As noted earlier, implementations of the present monitoring platform construct an end-to-end representation of an entire user session by ingesting up to 100% of the incoming spans from the client (e.g., clients' browser, etc.) into the SaaS backend of the monitoring platform and analyzing them. Further, implementations of the monitoring platform disclosed herein also provide end-to-end visibility of a single user session (e.g. a user session interacting with a particular website or application) with the ability to perform more in-depth investigation of specific chunks of time associated with a user session. The chunks of time may either be client-selected or automatically selected by the monitoring platform based on a determination of the types of behavior a client may be interested in examining. In one implementation, the service graphs illustrated in FIGS. 18 and 19 are constructed using spans collected and analyzed during a single user session.

The GUI of FIG. 20A, in one implementation, conveys high-level metrics and information about the session including the start time 2010, the session duration 2020, the session ID 2031, the agent 2032 and the location 2035. As noted above, the session duration may be upwards of an hour depending on how long the user is interacting with an application or browser. The session illustrated in FIG. 20A, for example, is 6.7 hours. In one implementation, the field for the agent 2032 may comprise information about the browser and operating system (OS) used by the user. Agent information may enable a client to identify browsers, devices and platforms most used by users which can be beneficial in making informed optimizations to an application or website. In one implementation, the location 2035 may comprise information about the location of the browser, user, etc. As noted above, a session ID is an identifier that connects a series of traces.

The graphic visualization 2000 is meant to capture the entire user session at an aggregate level along a time axis. In particular, the visualization graphically displays aggregated events and metrics computed for the user session. In one implementation, for example, the visualization graphically displays events 2041 (e.g., page load events), errors 2042, JavaScript errors 2043 and requests 2044 associated with the session. Note that the errors 2042 are aggregated separately from the JavaScript errors 2043 to provide the client some insight into where the errors occurred, e.g., to distinguish between a frontend JavaScript error and an error that may have surfaced from the backend.

The aggregated metrics may comprise metrics aggregated for the duration of the entire session or a selected portion thereof. The graphic visualization 2000 provides a client with an efficient overview regarding the most active segments of time within the session. In one implementation, the graphic visualization provides visual or other types of indicators to direct the client's attention to the portions of the visualization in which the client would be most interested, e.g., page transitions, errors, etc., that a user experienced during the session.

In one implementation, a client of the monitoring platform may zoom into select parts of the user session. For example, a client may select region 2005 based on some activity of interest during the selected region. The client may be interested in the region 2005 based on a visual indication of a high number of events, errors, JavaScript errors or requests. For example, a client may select the region 2005 based on the several spikes in the number of events occurring during that region.

In one implementation, the graphic visualization 2000 may also display an aggregate number of events, errors, or requests associated with a selected region. For example, a pop-up box 2045 indicates the aggregate number of events associated with the region 2005. In one implementation the GUI may provide additional event activity metrics 2046 pertaining to the transactions in the selected region 2005, e.g., the number of document loads, route changes, console errors, document resource loads, clicks, etc.

Note that in one implementation, the aggregated metrics related to events, errors and requests may be computed using the full-fidelity module 1724 from FIG. 17. Because visualization 2000 represents a single user session, the events 2041, errors 2042, JavaScript errors 2043 and requests 2044 may, in one implementation, all be computed using the set of traces associated with the single user session. These set of traces may be available in the full-fidelity data set corresponding to module 1724. The set of traces associated with a single user session may also be persisted in module 1724 for efficient queries thereafter. Note, however, that as discussed above, the full-fidelity modality persists RUM data in shards based on a session ID (rather than a Trace ID).

In one implementation, a client may select a region of interest based on time values. For example, a client may be interested in user activity between the second and third hour of the user session. A client can then select the desired time bounds to define the region of interest and collect aggregated metrics associated with events, requests and errors for that region.

In one implementation, the GUI may provide a waterfall view of spans associated with all the events in the user session. In this implementation, all the events in the user session would be viewable in the panel 2050. In a different implementation, the waterfall view displayed in the panel 2050 is scoped to the client selected region 2005. In other words, the spans shown in the panel 2050 are associated with all the events encapsulated within client selected region 2005. In one implementation, only exemplar spans associated with the client selection region 2005 are displayed. In a different implementation, all the spans associated with the client selected region 2005 are listed in the panel 2050.

The spans displayed may be root-level or parent spans (e.g., span 2052) that can be expanded out to reveal other child spans (e.g., spans 2053, 2054, etc.). For example, the document load event associated with parent span 2052 may be a combination of other sub-events, e.g., a document fetch associated with the child span 2053 and other different resource accesses such as the one associated with child span 2054. Although not shown in FIG. 20A, in one implementation, each of the spans shown in the waterfall view of the panel 2050 is displayed adjacent to an icon indicating whether one or more errors are associated with the span. Displaying an error status of a span enables a client to visually identify whether a particular span needs to be explored further. Note that each of the spans (including both the parent and children spans) may be expanded out to get further information regarding the various attributes associated with the spans, as shown in connection with FIG. 20B.

Figure 20B:
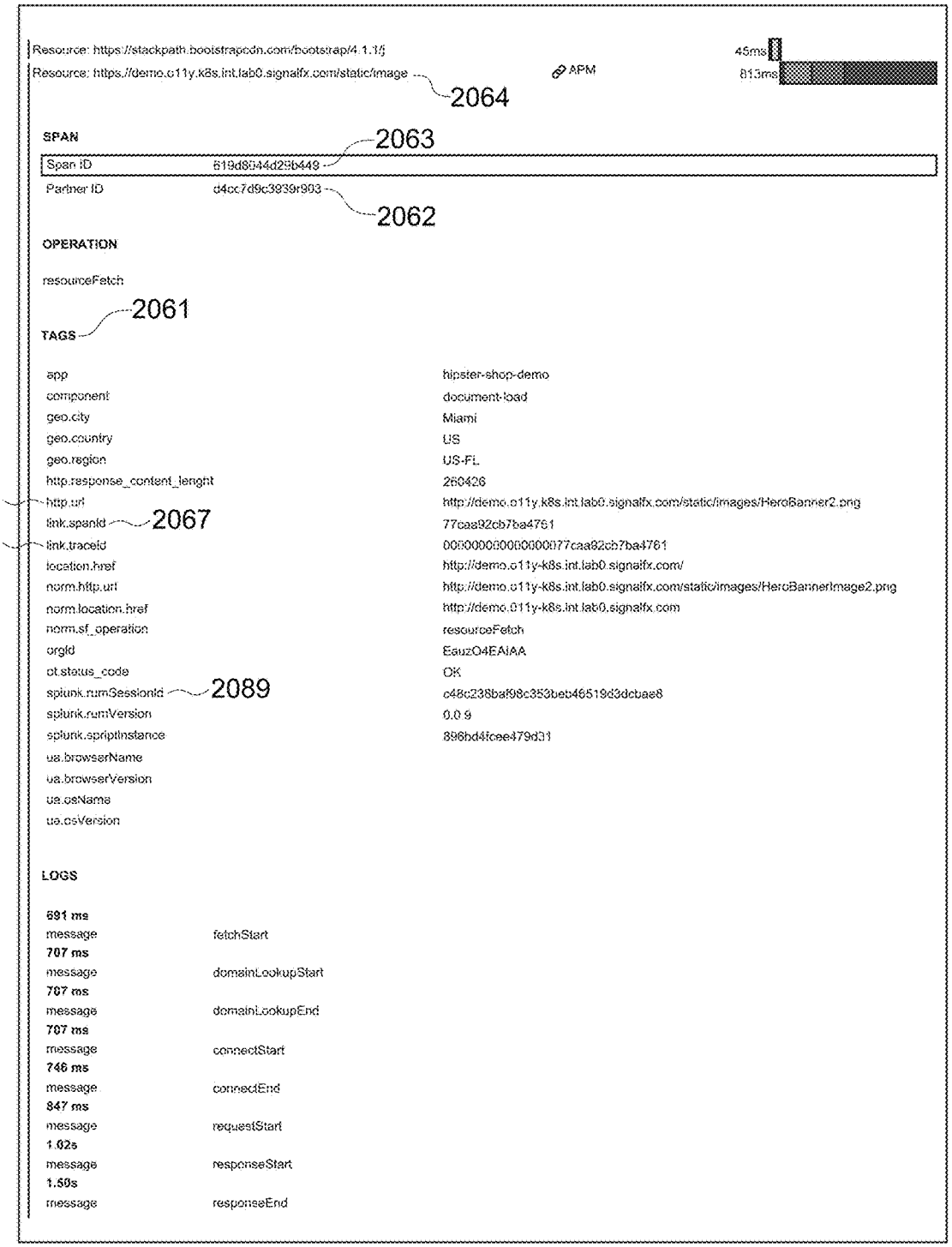
FIG. 20B illustrates an exemplary on-screen GUI illustrating the manner in which a span may be expanded within the waterfall view to obtain further information regarding the attributes of the span, in accordance with implementations of the monitoring service disclosed herein.

FIG. 20B illustrates an exemplary on-screen GUI illustrating the manner in which a span may be expanded within the waterfall view to get further information regarding the attributes of the span, in accordance with implementations of the monitoring service disclosed herein. As mentioned above, any of the spans shown in the waterfall view of the panel 2050 may be further expanded to view the span attributes. For example, span 2064 shown in FIG. 20B may be expanded to display its various associated tags. The expanded view for the span 2064 shows the Span ID 2063 and the Parent ID 2062 for the span 2064. Also, the expanded view shows all the related tags 2061. For example, the related tags may include the HTTP URL 2088 associated with the page that generated the span 2064, the session ID 2089, and links to a backend span and trace associated with the span 2064 (e.g., links 2067 and 2068). In one implementation, additional information extracted from the attributes for one or more spans may be aggregated and conveyed to a client in the GUI of FIG. 20A.

As mentioned previously, some of the resources accessed by a page may be part of a backend owned by the client. In such cases, the frontend spans, e.g., spans 2053, 2054, etc. displayed in the GUI of FIG. 20A may be linked to backend APM traces to allow the client further insight into the performance of related endpoint providers. Where a frontend span associated with the user session can be linked to a backend APM trace, an APM icon 2051 is provided next to the frontend span in the waterfall view to indicate that linkage information exists for the respective span. The APM icon 2051 may also comprise a hyperlink to the linked backend trace. The linked trace is a backend representation of a user request for the resource associated with the respective span. A client may then be able to expand the span in the GUI to retrieve the link to the backend trace, where the link is provided as one of the attributes of the respective span. As shown in FIG. 20B, the attributes of the span 2064 comprise a backend trace link 2068 and a backend span link 2067. In one implementation, when the links are accessed, the monitoring platform directs the client to a GUI that provides further information regarding the backend spans or traces. In one implementation where the span 2064 is associated with an error, the backend trace link 2068 and the backend span link 2067 may link directly to the trace or span respectively in the backend where the error originated.

In one implementation, the RUM analysis engine 1795 of FIG. 17 performs the analysis necessary to link the frontend span (e.g., the span 2064) with the backend trace. For example, for a given span comprising a link to a backend trace, the RUM analysis engine 1795 may first check the corresponding APM deployment to determine if a backend trace exists that has the corresponding Trace ID included in the span attributes. Once the RUM analysis engine 1795 determines that the Trace ID exists in the backend deployment and that it is accessible, the monitoring platform can add a hyperlink to the backend trace next to the span in the panel 2050.

Figure 20C:
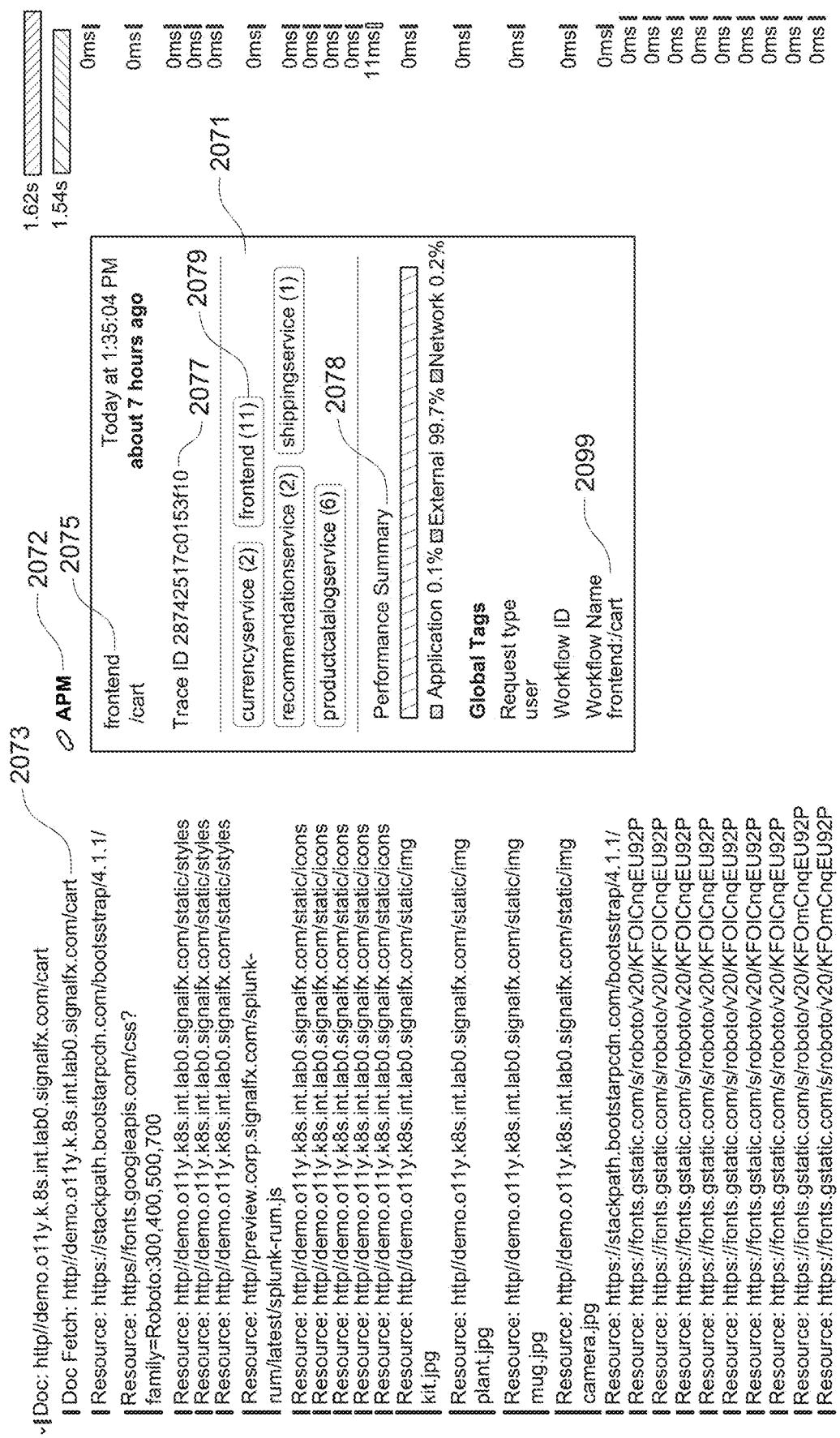
FIG. 20C illustrates an exemplary on-screen GUI illustrating the manner in which hovering a cursor over a backend trace link provided for a span in the waterfall view conveys further information regarding a backend trace in a pop-up window, in accordance with implementations of the monitoring service disclosed herein

FIG. 20C illustrates an exemplary on-screen GUI illustrating the manner in which hovering a cursor over a backend trace link provided for a span in the waterfall view conveys further information regarding a backend trace in a pop-up window, in accordance with implementations of the monitoring service disclosed herein. In one implementation, a client may hover a cursor over the APM icon 2051 of FIG. 20A (or even over one of the links 2067 and 2068 in FIG. 20B) to receive further information regarding a backend trace (or span). For example, hovering over an APM icon 2072 shown in FIG. 20C may result in a pop-up window 2071 on-screen and displaying summary information regarding the backend trace that connects to the associated frontend span 2073. The pop-up window may further convey meaningful information regarding the linked backend trace, e.g., a performance summary 2078, associated services 2079, a Trace ID 2077 and a service/operation name 2075 related to the trace.

The pop-up window 2071 provides a client a preview of the trace so the client knows what to expect if the backend trace is accessed and loaded. The pop-up window 2071 also provides a hyperlinked Trace ID 2077 to be able to fast-track a client to the actual APM trace on the backend. Because the monitoring platform has access to full-fidelity data, the client can click the hyperlink to directly access the backend trace, which may, for example, be stored in a data set associated with the full-fidelity modality discussed in connection with FIG. 17. In one implementation, the client may also access the Workflow link 2099 to access the aggregate behavior for the transaction in the system related to the span 2073. Accessing the Workflow link 2099 may direct the client to a service graph associated with the backend services monitored by APM, which allows the client to perform an in-depth investigation.

Implementations of the monitoring platform therefore, advantageously provide a client with an end-to-end view of an entire user session graphically while indicating regions of interest in which a user may be interested. Implementations of the monitoring platform, for example, may provide a graphical representation of the entire user session which tracks the number of events, errors, and requests in the session. Conventional monitoring methods, for example, did not provide the ability to provide clients with an overview of an entire session while also providing the ability to gain further resolution into specific client-selected portions of the session.

In one or more implementations, the monitoring platform allows a client to more intelligently navigate around the user session to discover portions of the session in which a client may be interested. In one implementation, for example, the visualization 2000 is automatically segmented into various chunks with certain vital statistics provided in the GUI for each chunk of time so a client can assess which regions are of particular interest. Thereafter, a client may be able to select a pre-segmented chunk or region of interest to receive information regarding the spans associated with the respective selected chunk in the panel 2050. For example, the region 2005 may be associated with a chunk of time that the monitoring platform automatically flags as being of interest to a client based on the spikes in event activity during that time period. A client is then able to review the metrics (e.g., event activity metrics 2046) associated with the pre-segmented chunk of time to determine if further exploration is warranted and also review the spans associated with the chunk in the panel 2050.

In one implementation, the monitoring platform is able to intelligently pre-select a region of interest for a client based on spans in which the client is interested. For example, a client may want to investigate the edge 1808 in FIG. 18 associated with a call to the endpoint or node 1820. Alternatively, a client may want to investigate a node (e.g., a page node or an endpoint node) and explore exemplar spans associated with calls from or to the respective node. In either case, a client may start by selecting an exemplar span associated with either the relevant edge or node from the panel 1801.

Upon selecting the relevant span, the client, in one implementation, may be directed to the graphic visualization 2000 of FIG. 20A with a region of interest (e.g., region 2005) pre-selected for the client, where the region of interest would include information regarding the selected endpoint or edge. In this way, a client needing to explore a particular endpoint, page or edge in the GUIs of FIGS. 18 and 19 may be directed to the GUI of FIG. 20A with the relevant portion of the graphic visualization 2000 scoped to the portion in which the client is most interested. This allows the client to not only investigate the segment of interest but also advantageously provides the client with an overview of the relative location of the region of the interest within the overall session. Thereafter, the client can inspect the segment of interest more closely while having an overall idea of other proximate events that were taking place during the user session.

By way of further example, a client may need to explore errors generated by a page associated with node 1920. The client may identify exemplar spans within the panel 1901 associated with node 1920 and select one of those spans.

Upon selection of the relevant span, the monitoring platform would automatically bring up the GUI of FIG. 20A with a portion of the graph pre-selected where the selected portion comprises information regarding the span selected through the GUI of FIG. 19. The monitoring platform therefore automatically takes a client to a specific segment on graphical visualization 2000 associated with the user selection in FIG. 19. The client can then visually analyze where the error occurs within the session in relation to other events in the session. For example, the client is able to determine whether the user continued to navigate around the page after experiencing the error or if the user chose to leave the page and transition to a different page.

In one implementation, upon selection of an exemplar span in the panel 1801 of FIG. 18 or the panel 1901 of FIG. 19, in addition to pre-selecting a region of interest within the graphic visualization 2000, the monitoring platform may also present the specific span of interest to the client within the waterfall view of the panel 2050 of the GUI. In other words, the monitoring platform can direct the client to the actual instance of the span that exhibited the behavior in which the client expressed an interest. The client then has the option of expanding the span and analyzing the relevant attributes of interest associated with the span. In one implementation, the span within the waterfall view of the panel 2050 may either be highlighted or already expanded to allow a client to easily review the span attributes. For example, the span of interest may be expanded similar to the manner shown in FIG. 20B so the client can visually inspect the various attributes associated with the span. In one implementation, the GUI of FIG. 20A may be configured to visually indicate to the client that a span displayed in the panel 2050 is related to the specific edge, endpoint or span selected in the interfaces of FIGS. 18 and 19.

Note that a client may also be able to select (or interact in some way with) a node or an edge in the service graph 1800 of FIG. 18 (or service graph 1900 of FIG. 19) and be directed to the graphical visualization 2000 of FIG. 20A with a region of interest pre-selected and a specific instance of a span of interest highlighted (or expanded) in the waterfall view of the panel 2050. In this way, a client is provided not only specific information regarding an error span of interest in the waterfall view but also an overview of where in relation to other events the error occurs on the session timeline.

An exemplary manner in which a client may approach troubleshooting latency problems experienced by one or more users may start with the client investigating a user's interactions with a page or application at the service graph level. Viewing the service graph of FIG. 19, for example, the client may observe that the/cart endpoint 1940 is returning errors when invoked in response to a call. The client may select the endpoint 1940 and view information regarding an associated error span in the panel 1901. Subsequently, the client may select or double-click on the entry corresponding to the error span in the panel 1901 and be directed to the session view of FIG. 20A, where a region (e.g., region 2005) associated with the selected error span may be pre-selected for a client. Event activity metrics 2046 for the pre-selected segment may also be displayed to provide a client with some aggregated metrics associated within the segment. The client's attention may also be directed to the actual error span of interest within the panel 2050, for example, by having the error span expanded to display its attributes. If the client controls the backend services to which the/cart endpoint 1940 maps, the error span will typically contain a link to the backend trace associated with the error span. The client can then access the link to be directed to the backend trace. As noted earlier, implementations of the monitoring platform are, therefore, able to map endpoint provider (or page provider) nodes on the frontend to the backend microservices comprised within a software architecture.

In one implementation of the monitoring platform, the spans within the waterfall view of the panel 2050 may be organized by page access. Instead of laying out the spans in a chronological order, in this implementation, the spans may be organized and grouped by page view. This allows clients to have clearer insight into the manner in which a user navigated around a particular website or application. Any time a user transitions to a new page, either through a document load or a route change, the waterfall is reset and any activity subsequent to the transition is grouped separately from the prior activity.

By way of example, selecting the region 2005 of FIG. 20A allows a user to view a list of all the spans associated with the region 2005 in the panel 2050 grouped by page view. This allows the client to easily determine if the event spikes within the region 2005 are all associated with a single page view or multiple different page views. The client is also able to easily receive insight into a user's journey, in particular, the manner in which the user navigated from one page to the next.

Grouping the spans by page view also allows the client to conveniently determine which of the pages had the most associated errors. For example, if the number of errors within the region 2005 were high, grouping the activity by page view allows a client to easily determine which of the page views is the most problematic. As noted previously, each of the spans are displayed adjacent to an icon indicating whether the span comprises an error. Accordingly, grouping the spans by page view may also allow a client to visually determine which of the pages were associated with the most error spans.

Figure 21:
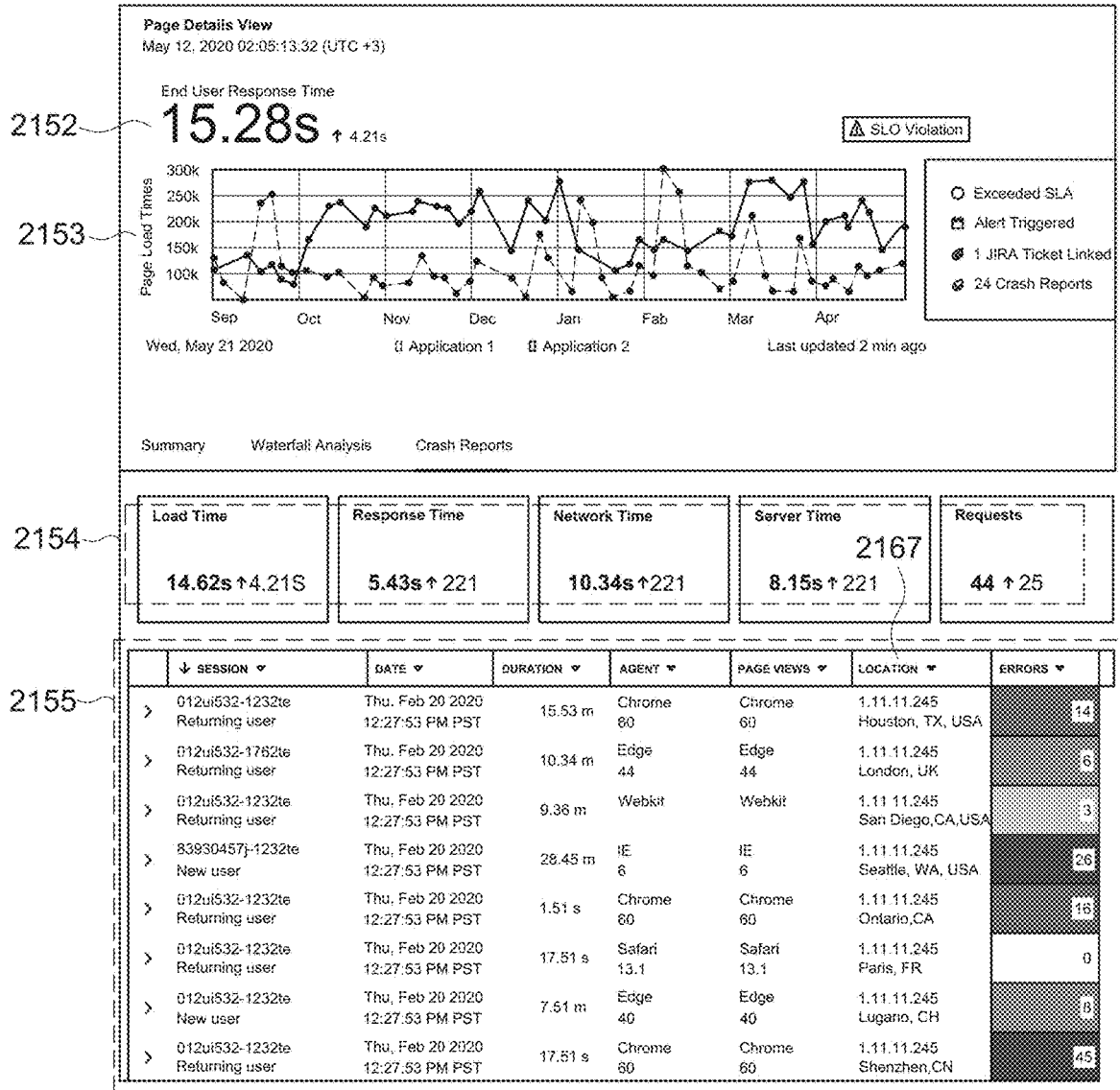
FIG. 21 illustrates an exemplary on-screen GUI displaying aggregate metrics for a specific page, in accordance with implementations of the monitoring service disclosed herein.

FIG. 21 illustrates an exemplary on-screen GUI displaying aggregate metrics for a specific page, in accordance with implementations of the monitoring service disclosed herein. In one implementation, the monitoring platform may be able to provide the client with aggregated metrics for a specific page or even an endpoint selected, for example, from the service graphs displayed in FIGS. 18 and 19. FIG. 21 illustrates aggregated metrics associated with a particular page or endpoint for a select time period. The aggregated metrics can, in one implementation, be calculated using the metric events modality for RUM-based spans discussed in connection with FIG. 17. Alternatively, in a different implementation, more real-time metrics may be calculated using the metric time series modality also discussed in FIG. 17. In another implementation, the full-fidelity modality may also be used to compute the metrics.

The aggregated metrics, among other things, include end user response time 2152 and a graph 2153 conveying page load times over a selected time period. Other metrics 2154, e.g., network time, response time, server time, requests, load time, etc. may also be displayed for the convenience of a client in the GUI of FIG. 21. In one implementation, the client may be provided additional details regarding how much of the latency associated with a page load was due to network latency versus latency attributable to a client's backend. In one implementation, the metrics (e.g., network time, server time, etc.) may be used to provide a client a way to visualize network time and/or server time across the service graphs shown in the GUIs of FIGS. 18 and 19. Providing metrics for specific pages and/or endpoints through an interface such as the one shown in FIG. 21 allows the monitoring platform to advantageously provide a client with more targeted information, especially, in instances where the service graph view (in FIGS. 18 and 19) or the session view (in FIG. 20A) may be particularly crowded with information.

Session exemplars associated with the page or endpoint associated with the GUI may be displayed in a panel 2155. The session exemplars may comprise details regarding the session ID, a timestamp associated with the session, the duration of the session, the agent (e.g., a browser, platform, OS) used during the session, a location of the user and a number of errors encountered during the session. In one implementation, where aggregated metrics for a specific page are displayed (as shown in FIG. 21), information extracted from the location field 2167 associated with each session may be used to construct a geo-map allowing a client to visualize page views broken down by location.

Location information, among other uses, helps a client understand regional performance of a website. In one implementation, the location information may also be used to visualize page load times broken down by location (e.g., by city, by country, by zip code, etc.). For example, an exemplary GUI may provide a client a map of the world allowing a client to hover over any country (or region) to see average load times or average page views for that country.

In one implementation, page views and other metrics may also be filtered based on URL, browser type and version, operating system, user id, etc. The GUI of FIG. 21 may provide visualizations that enable a client to see a breakdown of the page views based on URL, browser type and version, user id or operating system.

In one implementation, for each page, a geo-map may be constructed to analyze the endpoint traffic for the respective page, e.g., the map may be able to visually indicate to a client the physical location of the various endpoints. This allows a client to obtain a better understanding of the proximity of the various resources being accessed by any particular page.

In one implementation, where aggregated metrics for a particular endpoint are displayed, information from the location field 2167 may be used to construct a geo-map of pages accessing the particular endpoint. This allows a client to obtain a better understanding of where the pages or related users accessing a particular endpoint or resource are located.

Figure 22:
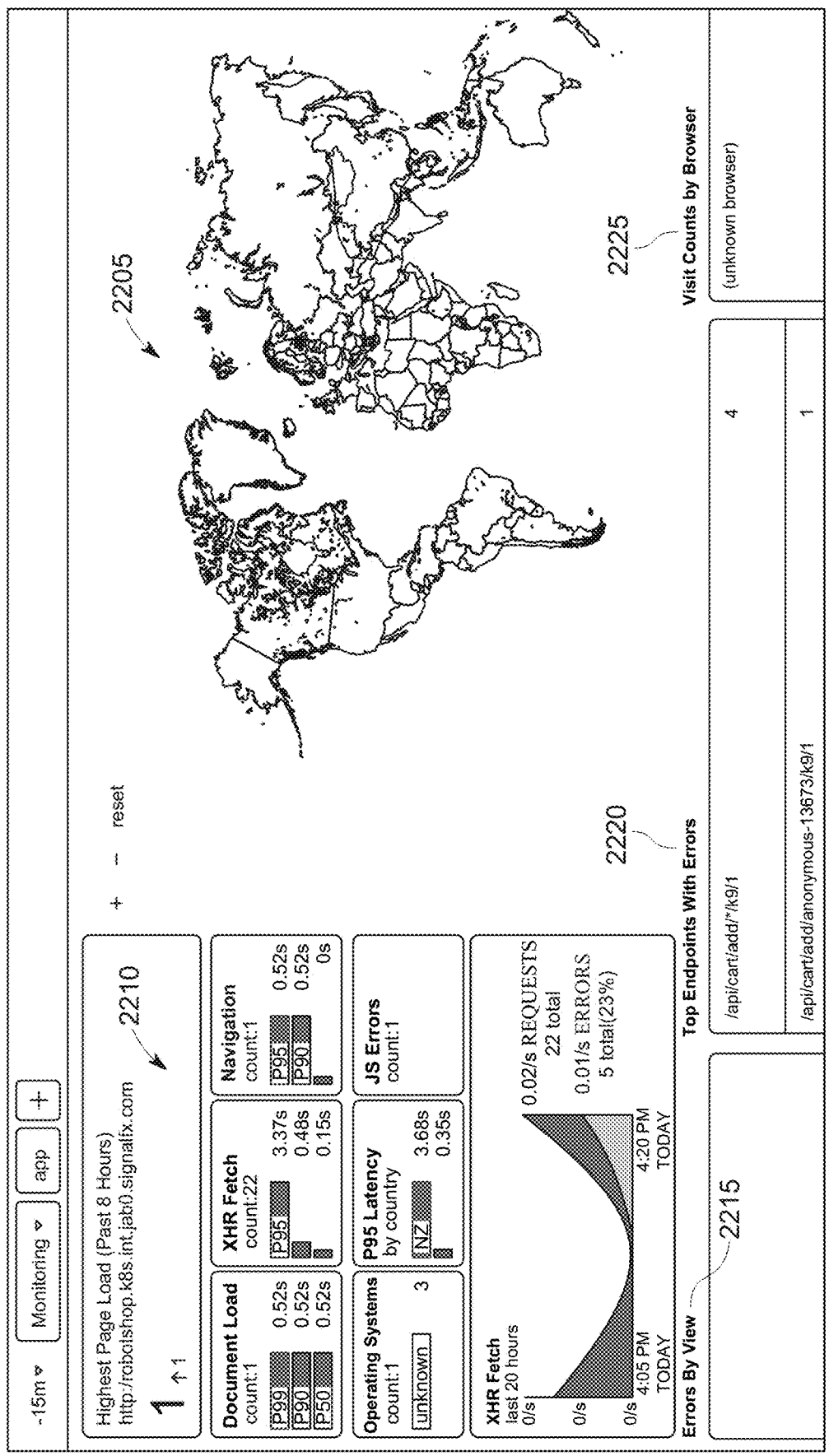
FIG. 22 illustrates an exemplary on-screen GUI displaying a geo-map associated with a particular website or application, in accordance with implementations of the monitoring service disclosed herein.

FIG. 22 illustrates an exemplary on-screen GUI displaying a geo-map associated with a particular website or application, in accordance with implementations of the monitoring service disclosed herein. The geo-map 2205 provides, among other things, a bird's eye view of where the traffic for a particular site or application is coming from. In addition to understanding the regional performance of a site, the geo-map can be used to visualize page load times broken down by location, to analyze resource access for a respective page by location, etc. The GUI of FIG. 22 may also provide other relevant information to a client, e.g., high-level metrics 2210 for an application that are easily accessible, errors by view 2215, top endpoints with errors 2220, or visit counts by browser 2225.

The disclosed system advantageously addresses a problem in traditional data analysis of instrumented software tied to computer technology, namely, the technical problem of aggregating and tracking metrics associated with a particular page or application with which a real user is interacting over the course of an entire user session. The disclosed system advantageously solves this technical problem by providing a solution also rooted in computer technology, namely, by aggregating up to 100% of the spans generated by the particular page or application and rendering a visualization in a GUI that tracks, among other things, events, errors and requests over the duration of the entire session. The disclosed subject technology further provides improvements to the functioning of the computer itself because it increases the capability of the computer by tracking metrics associated with specific pages (for a website or application) that a user is browsing to be tracked.

Figure 23:
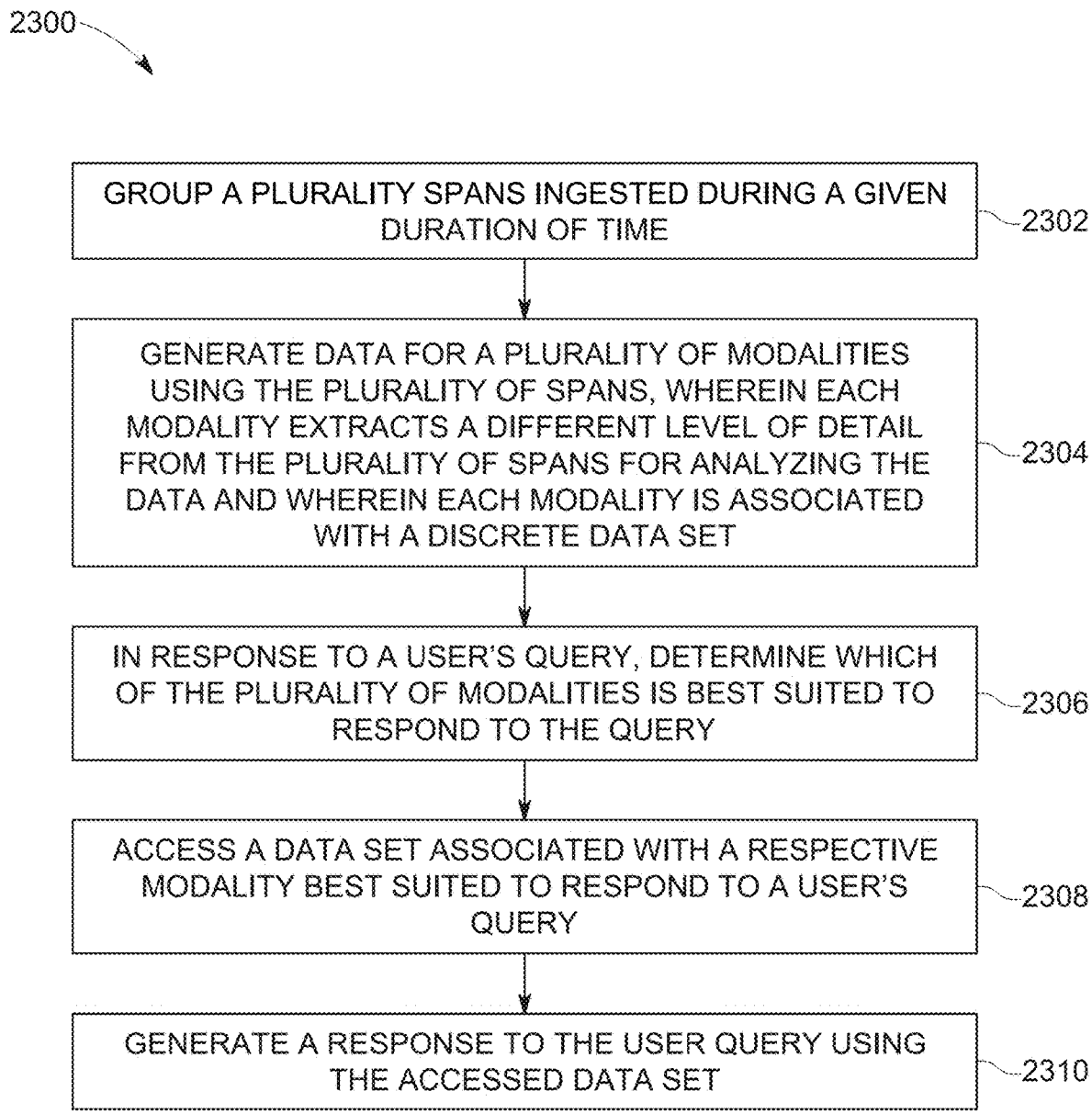
FIG. 23 presents a flowchart illustrating a computer-implemented process for persisting and querying RUM data in a computer system comprising microservices, in accordance with implementations of the present monitoring service.

FIG. 23 presents a flowchart illustrating an exemplary computer implemented process 2300 for persisting and querying RUM data in a computer system comprising microservices, in accordance with implementations of the present monitoring service. Blocks 2302-2310 describe exemplary steps comprising the computer implemented process 2300 depicted in FIG. 24, in accordance with the various implementations herein described. In one implementation, the process 2300 is implemented at least in part as computer-executable instructions stored in a computer-readable medium and executed in one or more processing devices.

At block 2302, a plurality of spans associated with a real user interaction with a GUI (e.g., a GUI for a website or an application) are automatically ingested for a given time duration as discussed in connection with FIG. 17. In one implementation, all the spans are ingested and grouped into traces in a sessionization process. The monitoring platform is able to ingest all the incoming spans without sampling. In an alternate implementation, the spans may be grouped based on session ID or a different parameter.

At block 2304, data is automatically generated for a plurality of modalities using the plurality of spans and the traces, where each modality extracts a different level of detail from the plurality of spans associated with the plurality of traces for analyzing the data and where each modality is associated with a discrete data set. At block 2306, in response to a client's query, a monitoring platform may be configured to determine which of the modalities is best suited to respond to the client's query. At block 2308, the data set associated with the respective modality determined in block 2306 is accessed to compute a response to the client's query.

At block 2310, a response is generated to the client query using information extracted from the accessed data set.

5.2 Connecting Frontend RUM-Related Spans with Backend APM-Related Traces

Implementations of the monitoring platform disclosed herein are able to provide a unified monitoring view for diagnosing problems and troubleshooting by using information extracted from the ingested spans to connect and stitch frontend RUM data with backend APM data in order to provide a client with insight into the manner in which backend problems surface at the frontend and vice versa. By connecting the frontend and backend traces, the monitoring platform is able to provide full visibility into any transaction all the way from a user browser, through the network and to any backend service. This allows a client to determine, for example, which of the errors on the backend surface and translate into a degradation experience for an end-user at the frontend. Also, for example, a client is able to determine, for example, if a latency issue on the frontend propagates and manifests as a problem at the backend. By comparison, conventional monitoring tools do not provide a single interface from which the client can track metrics and diagnose problems related to both the frontend and backend performance of an application (or website) and observe the manner in which the frontend and backend impact each other.

In order to connect the frontend and the backend traces, in one implementation, the instrumentation for the frontend and the backend are linked. In one implementation, when the frontend receives a request (e.g., through a browser or otherwise) from a user, a Span ID and a Trace ID are generated for that request by the RUM instrumentation at the frontend. When the request propagates to the backend, the instrumentation for the backend (e.g., the APM instrumentation) responds with a header (e.g., a server-timing header). As discussed earlier, context propagation is based on REST, which is header-based. The response to the request comprises, among other things, the time required by the server to process the request and the Trace ID associated with the trace generated at the backend in response to the request. When the headers are received at the client, the Trace ID is extracted by the browser instrumentation (e.g., the JavaScript instrumentation installed at the browser) and attached to the frontend spans that are transmitted to the beacon 1767 shown in FIG. 17. In one implementation, the Trace IDs and Span IDs associated with the backend APM traces are embedded in the frontend RUM spans or traces. The beacon forwards the spans to the RUM ingestion framework of FIG. 17.

At query time then, for example, if a client requests a certain session to be loaded, the RUM Analysis Engine 1795 may use the Trace ID attached to one or more ingested RUM spans (or traces) and may compare them with the Trace IDs gathered from the ingested APM spans (received from the APM module 1796) to establish the link between the frontend spans or traces and the corresponding backend traces. As noted before, in one implementation, the RUM analysis engine 1795 of FIG. 17 performs the analysis and computation necessary to link the frontend span with the backend trace. If a link is established between a frontend span or trace and a backend trace, the monitoring platform is able to establish full end-to-end visibility between the RUM and APM frameworks. A hyperlink (similar to the hyperlinked APM icon 2051) may also be added to the backend trace for faster access.

In one implementation of the monitoring platform disclosed herein, up to 100% of spans associated with both RUM and APM may be ingested which guarantees that if the RUM-related spans have corresponding APM-related traces with which they connect in the backend, the RUM Analysis Engine 1795 can locate a specific backend trace and establish the connection. A client is, therefore, assured that if an error that surfaces at the frontend originated in a service at the client's backend, implementations of the monitoring platform can and will find the precise problematic traces at the backend and advantageously connect those traces with the error spans on the frontend. Conventional monitoring platforms, by comparison, rely on sampling and, accordingly, cannot guarantee linking substantially all the spans or traces across the frontend and the backend. Further, because of the reliance on sampling, conventional monitoring solutions would, therefore, not be able to find specific spans or traces that a client may be interested in examining further.

5.2.1 Rendering a Service Graph to Illustrate Page Provider Dependencies at an Aggregate Level As noted previously, where a client controls the backend services associated with one or more page providers, connecting frontend RUM data and backend APM data is important because certain errors that surface on the frontend may be a result of a failure in a client's backend service. Diagnosing problems surfacing at the frontend, therefore, requires further insight into the backend services. Implementations of the monitoring platform disclosed herein can generate a service graph at an aggregate level that allows a client visibility into the page provider dependencies on the backend. The service graph allows a client to obtain an overview of the manner in which the frontend connects to the client's backend and provides the client insight into the end user impact of any backend incidents on the frontend and vice versa. The service graph, for example, may provide information regarding the root cause of any errors that are observed at the frontend and, further, may pinpoint the service at the backend where the errors originate.

Figure 24:
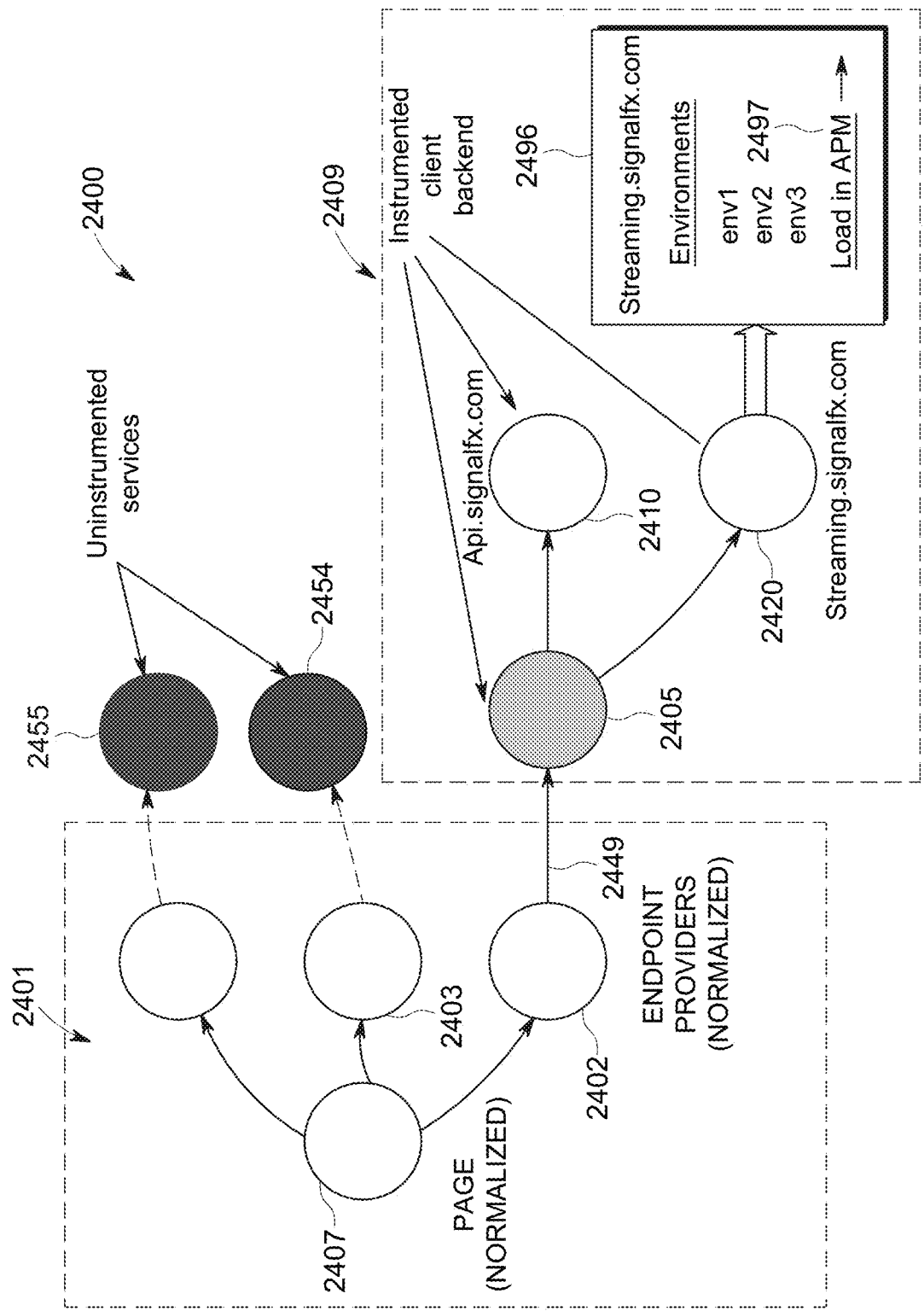
FIG. 24 illustrates an exemplary on-screen GUI comprising a service graph rendered at an aggregate level that provides a visualization of frontend RUM browser data connected with backend APM microservice data, in accordance with implementations of the monitoring service disclosed herein.

FIG. 24 illustrates an exemplary on-screen GUI comprising a service graph 2400 rendered at an aggregate level that provides a visualization of frontend RUM browser data connected with backend APM microservice data, in accordance with implementations of the monitoring service disclosed herein. The RUM browser data is used to render page nodes (e.g., page node 2407) accessing endpoint provider nodes or resource nodes (e.g., endpoint provider nodes 2402 and 2403), as also shown in FIGS. 18 and 19. Note that both the page nodes and the endpoint provider nodes are normalized as discussed above. In instances where the client has visibility into the backend, the monitoring platform has access to the backend APM microservice data, which may be used by the monitoring platform to render service nodes (e.g., nodes 2405, 2410, 2420, etc.).

Where the client does not have visibility into the backend, the service graph 2400, in one implementation, may render nodes for uninstrumented services (e.g., nodes 2455 and 2454), where information pertaining to the uninstrumented services is inferred from spans generated and returned by the uninstrumented services in response to calls. In one implementation, the monitoring platform can render a node and provide some information within the service graph regarding the uninstrumented services based on information extracted from spans returned to the corresponding endpoint provider from the respective uninstrumented services. For example, even though service node 2454 is uninstrumented, a call made to the service from endpoint provider node 2403 results in a span being returned to node 2403 from the uninstrumented service. In one implementation, the monitoring platform is able to use the metadata from the span to make inferences about the uninstrumented service (e.g., a type of service, an environment associated with the service, etc.). The information inferred from the tags of the span is then used to render the node for the uninstrumented service and provide further information regarding it. Because there is no visibility into the backend for uninstrumented nodes 2455, typically only a single node (with no further connecting nodes) may be rendered for an uninstrumented service.

Implementations of the monitoring service are able to provide end-to-end mapping between the data on the browser spans and the data on the backend spans or traces, thereby, providing a client with end-to-end visibility. Linkage information between the frontend and the backend is used to stitch together nodes 2402 and 2405 and may be determined by the RUM analysis engine 1795 of FIG. 17. As noted previously, in order to connect the frontend with the backend, in one implementation, the browser instrumentation receives a header (e.g., a server-timing header) from the backend containing the Trace ID in response to a request that propagates to the backend from the frontend. The Trace ID may be extracted and attached to the frontend spans that are transmitted to the RUM ingestion engine through the beacon.

While FIG. 24 only shows a single endpoint provider node 2402 connecting to a single backend service node 2405, implementations of the monitoring platform are not so limited. In one or more implementations, a single endpoint provider node 2402 may route requests to multiple different services on the backend, e.g., as a result of network routing rules, load balancing rules, etc. The provider node, for example, may resolve to several services on the backend running in different time zones or different regions. Or, for example, several different endpoint providers may route requests through a single service.

In one implementation, the service graph 2400 is created at aggregation time (during the ingestion process as discussed in connection with FIG. 17). As noted previously, service graphs can be created using, for example, aggregated metrics events data (associated with module 1722 of FIG. 17) or aggregated metric time series data (associated with module 1720 of FIG. 17). Because the data for RUM and the data for APM may have different aggregation times, the aggregated data sets for RUM and APM may not be available at the same time. Accordingly, connecting the RUM endpoints with the APM endpoints during aggregation can be complex. In order to construct service graph 2400 in the aggregate, implementations of the monitoring platform process the incoming aggregated data from both the RUM and APM ends in batch mode. As further subsets of aggregated data from the APM and RUM ends are digested in batch mode, additional connections for the overall service graph are rendered. Further, the RUM analysis engine 1795 of FIG. 17 can analyze the data in batches to form all the links (e.g., link 2449) between the frontend and the backend. For example, the RUM analysis engine 1795 determines the frontend spans that correspond to the backend traces by determining if the Trace ID of each backend trace corresponds with the Trace ID included in the attributes of a frontend span.

In one implementation, aggregated data for the backend services (e.g., services associated with nodes 2410 and 2420) is computed and may be viewed by interacting with the service graph 2400. For example, the client may select node 2420 and view a pop-up window 2496 comprising aggregated metrics for the associated service and, further, can breakdown the aggregated data by environment (or any other tag). In one implementation, the client may also be provided a link 2497 in the pop-up window 2496 to launch the client into the full-context APM service graph (e.g., similar to the service graph illustrated in FIG. 9).

As discussed above, the service graph 2400 may be created at aggregation time (as compared with query time). In one or more implementations, the aggregated data for constructing the service graph 2400 is computed using the metric events modality discussed in connection with FIG. 17. In this implementation, for example, the linkage information between the frontend and the backend including nodes that link the frontend with the backend (e.g., node 2505) may be determined at aggregation time using exemplar spans or traces associated with the metrics events modality. The nodes connecting the frontend with the backend comprise backend services that serve as entry points on the backend for the resource provider nodes associated with the frontend.

In one implementation, exemplar spans or traces associated with the metric events modality are used to find a connection point between the RUM and APM data. For example, in order to find the link 2449 between the endpoint provider node 2402 and the service node 2405, the RUM analysis engine 1795 of FIG. 17 samples the incoming RUM data and finds provider nodes (e.g. endpoint provider node 2402) that contain a link to the backend APM trace. Thereafter, the RUM analysis engine 1795 performs a lookup in the APM data for the root service associated with that link (e.g., the service associated with the root span for the trace). Having established the endpoint provider node and the root service in the APM trace, the RUM analysis engine 1795 has obtained enough information to establish a link between the frontend and backend data and to track the connection. The monitoring platform can thereafter render the service graph 2400 with the endpoint provider node (e.g., node 2402) linked to the first service (e.g. service node 2405) via the edge or the link 2449.

It should be noted that while the RUM portion of the service graph 2401 and the APM portion of the service graph 2409 may be rendered using full-fidelity aggregates (using the metric events modality), in one implementation, the nodes and edges connecting the RUM and APM ends are rendered using data sampled from exemplar traces within the metric events modality. The sampled data provides the necessary information to establish the logical connection between the RUM and APM ends. In a different implementation, the entire service graph 2400 may be rendered using full-fidelity aggregates, which may require a slightly longer time duration for rendering. In one implementation, the data for rendering the service graph 2400 may also be aggregated using the metric time series modality discussed in connection with FIG. 17.

Implementations of the monitoring platform are able to stitch together RUM and APM data to generate a cumulative service graph that displays the interactions and connections between the frontend and backend. This allows a client to visually determine actual user impact as well as gain insight into resources that a user would typically not have visibility into using just the APM data, e.g., service nodes 2455 and 2454 that are inferred using the RUM data.

5.2.2. Rendering a Service Graph to Illustrate Page Provider Dependencies at Query Time Using Exemplars Implementations of the monitoring platform disclosed herein ingest up to 100% of the spans associated with both the frontend (RUM data) and backend (APM data) as discussed previously. One of the significant advantages of ingesting up to 100% of the spans and maintaining those spans using a full-fidelity data modality as discussed in connection with FIG. 17 is that the monitoring platform has access to any number of exemplar spans and traces at query time to provide a client with the information being sought.

In one implementation, the monitoring platform can create an ad hoc service map for a client based on a specific query, where the service map renders the page provider dependencies on the backend (assuming that the client controls the backend and has access to that information). As noted earlier, creating the service map at aggregate time is challenging because the RUM and APM data may be aggregated at different rates and be available at different times. At query time, however, the monitoring platform has access to up to 100% of both the RUM and the APM ingested spans thereby allowing the query engine and reporting system 324 of FIG. 3 to process complex queries requesting specific data sets.

Figure 25:
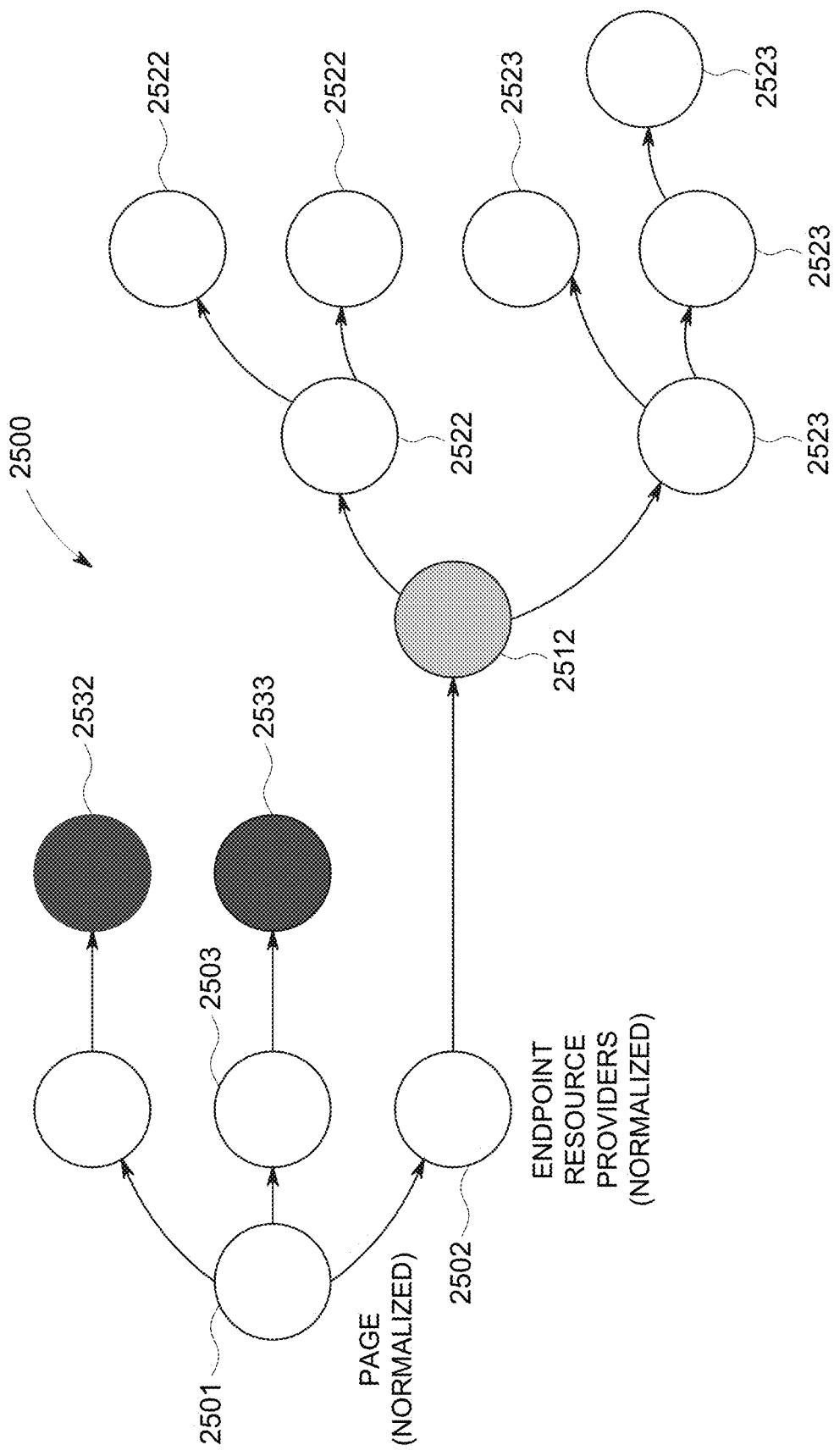
FIG. 25 illustrates an exemplary on-screen GUI comprising a service graph rendered using exemplars that provides a visualization of frontend RUM browser data connected with backend APM microservice data, in accordance with implementations of the monitoring service disclosed herein.

FIG. 25 illustrates an exemplary on-screen GUI comprising a service graph 2500 rendered using exemplars that provides a visualization of frontend RUM browser data connected with backend APM microservice data, in accordance with implementations of the monitoring service disclosed herein. In an implementation, similar to the one shown in FIG. 24, the RUM browser data is used to render page nodes (e.g., page node 2501) accessing endpoint provider or resource nodes (e.g., endpoint provider nodes 2503 and 2502). Note that both the page nodes and the endpoint provider nodes are normalized. In instances where the client controls and has visibility into the backend, the monitoring platform has access to the backend APM microservice data, which may be used by the monitoring platform to render service nodes (e.g., nodes 2512, 2522, 2523 etc.). Where the client does not have visibility into the backend, the service graph 2500, in one implementation, may render nodes 2532 and 2533 for uninstrumented services as discussed in connection with FIG. 24.

Implementations of the monitoring service are able to provide end-to-end mapping between the data on the browser spans and the data on the backend spans, thereby, providing a client with end-to-end visibility. Linkage information between the frontend and the backend may be determined by the RUM analysis engine 1795 of FIG. 17 and used to stitch together nodes 2502 and 2512 as discussed previously.

The difference between the implementations of FIG. 24 and FIG. 25 is that the service graph 2500 is created using exemplars (e.g., exemplar spans or traces from the metric events modality or exemplars loaded from the full-fidelity data set) at query time. By comparison, the aggregate level service map of FIG. 24 was rendered in near real-time during the ingestion and aggregation process. The exemplars for the service graph 2500 are not extracted in real time—rather, they are retrieved on demand based on client requests at query time. As noted earlier, at query time, RUM data from the front-end spans and APM data from the backend traces can be retrieved and consolidated together to provide a response to a user query.

In one implementation, a higher fidelity for rendering the service graph 2500 is achieved by extracting a corresponding high number of exemplars. In other words, a larger number of exemplars will result in more accuracy and precision in rendering the service graph than a relatively small number.

In one implementation, a client can construct any arbitrary query and retrieve a responsive set of exemplars based on the client criteria that may be visually represented in the service graph. For example, a client may be able to retrieve exemplar spans associated with users accessing www.splunk.com between 3 p.m. and 3:20 p.m. on Aug. 4, 2020, using the Safari browser from San Francisco, CA. Implementations of the monitoring platform would then be able to retrieve all the spans or traces responsive to that query from either the metric events data set or the full-fidelity data set and render a service graph responsive to the query that reconstructs a view of the world at the time designated in the query and also clearly illustrates the page provider dependencies.

By way of further example, a client may notice errors showing up on a browser and may need to determine if there a particular region where all the backend calls are being routed to where the errors are originating. A client's service may be running in two regions (e.g., US-West1 and US-East 1) where one of those regions may be consistently associated with errors. The client may construct a query to retrieve some exemplars and render a service graph that would provide the client with insight into the source of the problem. Using the service graph rendered from, for example, 100 exemplars retrieved by the client's query, the client may notice a trend that most of the errors are originating in the US-West1 region.

In one implementation, the exemplar traces for the frontend and backend may be stored separately and consolidated at query time. For example, the exemplar frontend RUM spans or traces may be stored as part of the metric events modality or as part of the full-fidelity modality discussed in connection with FIG. 17. The exemplar backend APM traces may be stored as part of the metric events modality or as part of the full-fidelity modality discussed in connection with FIG. 5. At query time, exemplar spans and/or traces responsive to the query are retrieved from both the frontend and the backend and consolidated at query time using linkage information associated with the traces. The consolidated traces are used to render the service graph and respond to the query.

In a different implementation, the exemplar traces are consolidated into end-to-end traces prior to query time and stored. The client query in this implementation may comprise a unified query that can be applied to the consolidated end-to-end traces that are stitched together using the RUM and APM data. When the client query is submitted, the responsive end-to-end traces may be used to render the service graph and respond to the query.

In one implementation, the client query can apply constraints, on demand, to both the frontend nodes and associated metadata and the backend nodes and the associated metadata. In an implementation, in response to a client query, the monitoring platform may be able to analyze frontend traces across attributes associated with backend traces and vice versa. Where the traces are consolidated into end-to-end traces, the monitoring platform may be able to analyze the end-to-end traces across all attributes.

6.0 SEAMLESS NAVIGATION BETWEEN MODALITIES

The monitoring platform, in one embodiment, allows a user to easily navigate between the three different modalities for both APM and RUM to perform searches with varying levels of resolution. FIGS. 27A-27D illustrates the manner in which the user may seamlessly navigate between modalities to perform queries requesting different levels of performance detail. Note that as explained above, the monitoring service is not only able to navigate between the various modalities but is also able to retrieve and join data from both the RUM and APM side at query time.

Figure 27A:
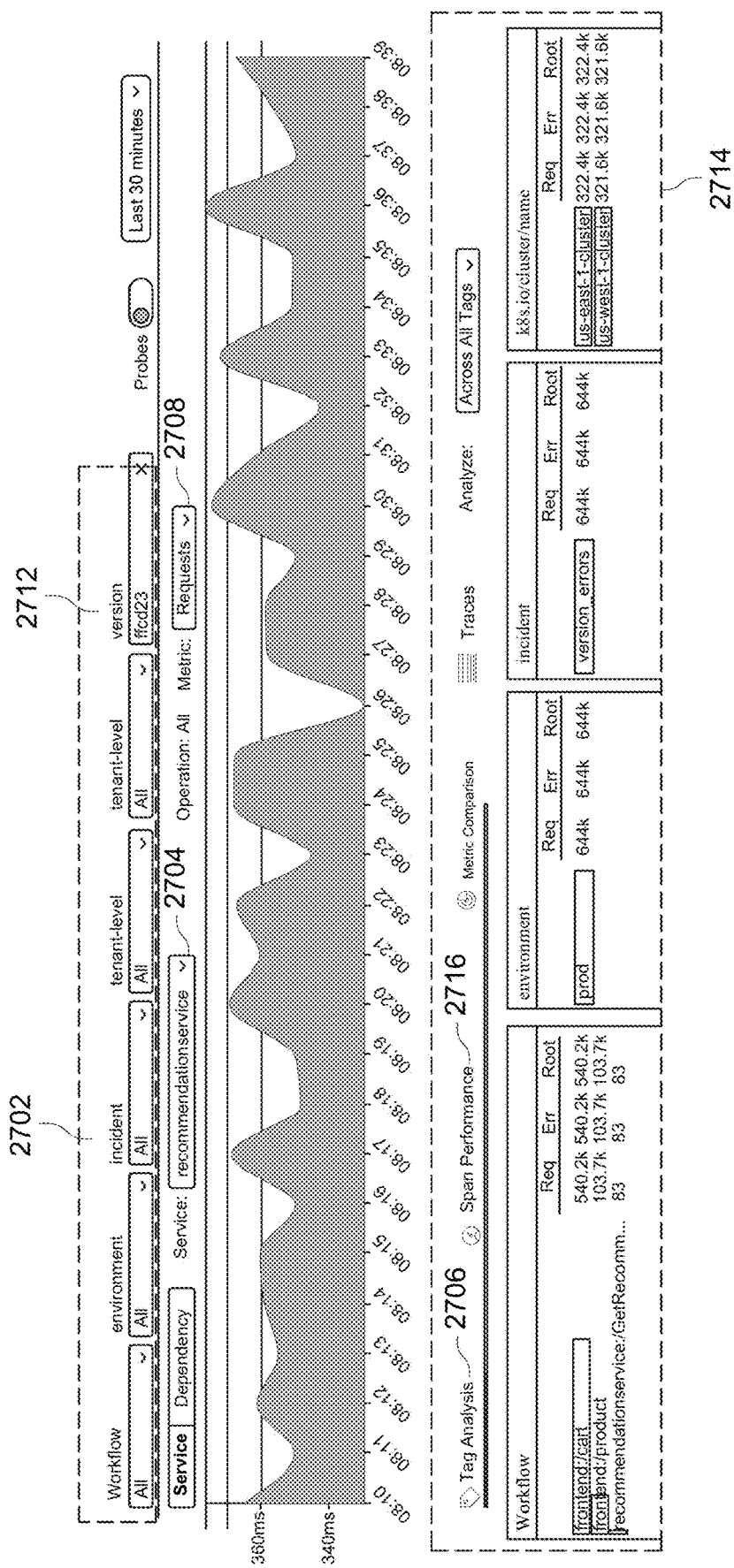
FIG. 27A is an on-screen GUI showing the manner in which a client may submit a query that is executed using the metric time series modality, in accordance with implementations of the monitoring service disclosed herein.

FIG. 27A is an on-screen GUI showing the manner in which a client may submit a query that is executed using the metric time series modality, in accordance with implementations of the monitoring service disclosed herein. For example, a user may need to diagnose problems associated with recommendation service 2704. Accordingly, using the exemplary GUI of FIG. 27A, a user may use drop-down menus to query the number of requests 2708 associated with the recommendation service 2704, where the "version" tag 2712 equals a value of "ffd23." Note, that the user has the option to select various combinations of tags or attributes using drop-down menus 2702. In accordance with the metric time series modality, a tag analysis (as selected using tab 2706) may be performed for indexed tags and presented to the user through panel 2714 in the GUI. As shown in panel 2714 of the exemplary GUI, request, error and root cause metrics may be provided for each of the indexed tags.

If the user needs detailed analysis on the spans associated with recommendation service 2704, the user may switch to a span performance analysis (as selected using tab 2716).

Figure 27B:
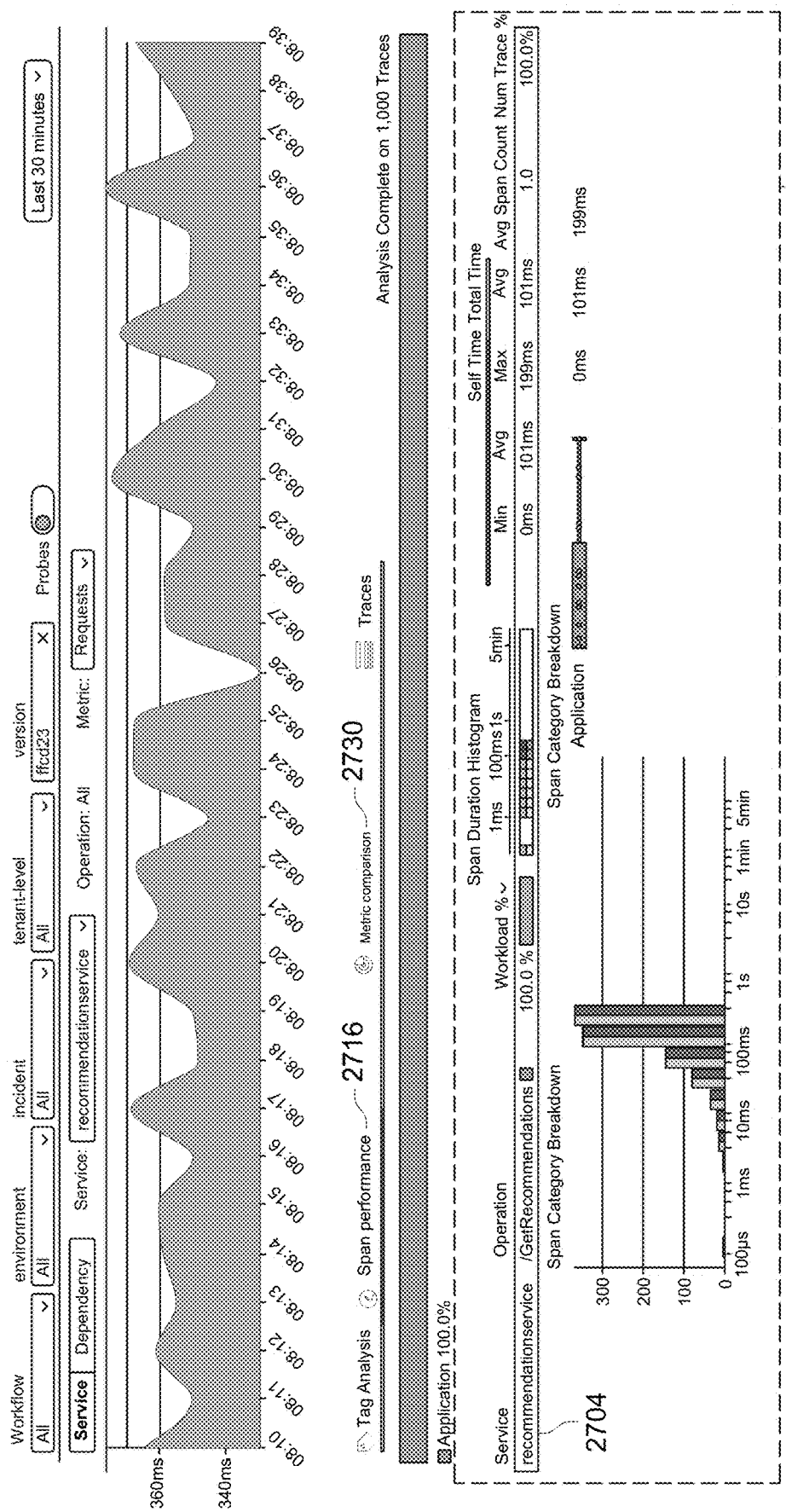
FIG. 27B is an on-screen GUI showing the manner in which a client may be able to receive span performance data for the service analyzed in FIG. 27A, in accordance with implementations of the monitoring service disclosed herein.

The monitoring platform seamlessly transitions to the metric events modality and provides the user with span performance data as shown in FIG. 27B.

FIG. 27B is an on-screen GUI showing the manner in which a client may be able to receive span performance data for the service analyzed in FIG. 27A, in accordance with implementations of the monitoring service disclosed herein. Having selected the span performance tab 2716, panel 2714 of the GUI seamlessly transitions from displaying tag analysis data (under the metric time series modality) to displaying detailed information about the span(s) associated with the recommendation service 2704 under the metric events modality.

In an embodiment, the user may elect to perform a metrics comparison by selecting the corresponding metrics comparison tab 2730. The information displayed in panel 2714, in response to the selection, transitions to providing a metrics comparison chart as shown in FIG. 27C.

Figure 27C:
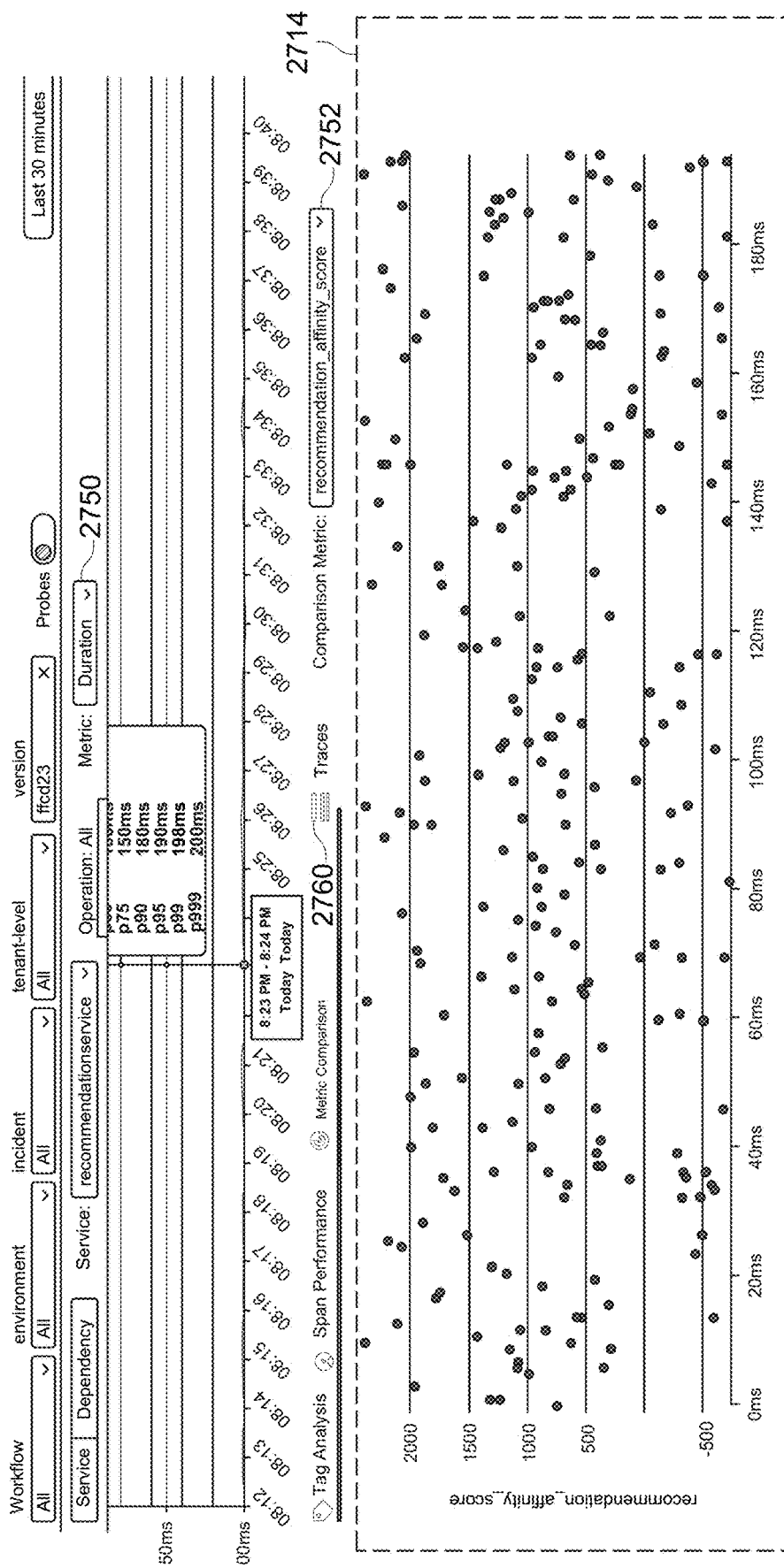
FIG. 27C is an on-screen GUI showing the manner in which a client may be able to receive metrics comparison associated with the service analyzed in FIG. 27A, in accordance with implementations of the monitoring service disclosed herein.
Figure 27D:
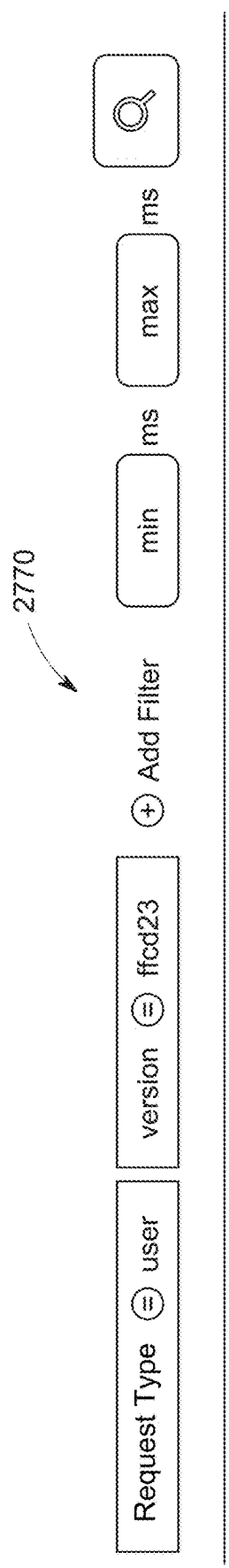
FIG. 27D is an on-screen GUI showing the manner in which a client may be able to able to perform a full trace search under the full-fidelity modality, implementations of the monitoring service disclosed herein.

FIG. 27C is an on-screen GUI showing the manner in which a client may be able to receive metrics comparison associated with the service analyzed in FIG. 27A, in accordance with implementations of the monitoring service disclosed herein. Panel 2714 in FIG. 27C provides a metrics comparison for "recommendation_affinity_score," 2752, a tag associated with the recommendation service 2704 that is extracted out and saved as metrics in a time-series. Note that instead of analyzing the requests associated with recommendation service (as was the case with FIGS. 27A and 27B), the user has selected "Duration" 2750 as the metric of choice in order to review the associated latency values.

In an embodiment, the user has the option to click on the full-trace search tab 2760 in order to perform a full trace search to perform more detailed analyses. FIG. 23D is an on-screen GUI showing the manner in which a client may be able to able to perform a full trace search under the full-fidelity modality, implementations of the monitoring service disclosed herein. Responsive to user clicking on the full-trace search tab 2760 in FIG. 27D, the GUI seamlessly navigates to providing the user filters for performing an in-depth trace search (similar to the one discussed in connection with FIG. 16). Note that the value for the "version" tag is preserved and carried over from when the user selected the tag 2712 in FIG. 27A. When the query 2770 is executed, the monitoring platform will seamlessly access the data set associated with the full-fidelity modality to respond to the query. In this way, the GUI provides an application owner or developer the option of seamlessly navigating between the three different modalities to extract various level of details associated with the services in the architecture.

The disclosed system addresses a problem in traditional data analysis of instrumented software tied to computer technology, namely, the technical problem of generating a service graph at an aggregate level that allows a client visibility into the page provider dependencies on the backend. The disclosed system solves this technical problem by providing a solution also rooted in computer technology, namely, by determining the manner in which frontend traces link up with backend traces and using the information to render a service graph that provides end-to-end visibility. The disclosed subject technology further provides improvements to the functioning of the computer itself because it increases the capability of the computer by allowing clients to submit unified queries that can be applied to consolidated end-to-end traces that are stitched together using the RUM and APM data.

While the principles of the invention have been described above in connection with specific apparatus, it is to be clearly understood that this description is made only by way of example and not as a limitation on the scope of the invention. Further, the foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as may be suited to the particular use contemplated.

What is claimed is:

1. A method of persisting and querying user monitoring data, the method comprising:
   grouping a plurality of spans associated with a user-interaction with an application and ingested during a given time duration, wherein the application corresponds to a frontend of a microservices based architecture;
   generating a plurality of data sets each associated with a respective analysis modality of a plurality of analysis modalities using the plurality of spans, wherein each analysis modality extracts a different level of detail from the plurality of spans and provides a different degree of response resolution to user queries;
   selecting, based on a first user query, a first analysis modality from the plurality of analysis modalities for generating a response to the first user query, wherein (i) the first analysis modality is associated with computing a time series of metrics using a first information extracted from the plurality of spans, the first information including a tuple of attributes that summarize the plurality of spans, (ii) a second analysis modality is associated with aggregating metrics from a set of indexed tags associated with a subset of the plurality of spans corresponding to cross-service calls, and (iii) a third analysis modality is associated with analyzing raw span data associated with the plurality of spans to analyze a performance of the application in response to the user-interaction;
   accessing a data set of the plurality of data sets that is associated with the first analysis modality; and
   generating the response to the first user query using the data set associated with the first analysis modality, wherein the first user query requests information pertaining to the performance of the application in response to the user-interaction.

2. The method of claim 1, wherein the plurality of spans are ingested in real time.

3. The method of claim 1, wherein the plurality of spans comprise up to 100% of spans generated by the user-interaction with the application.

4. The method of claim 1, wherein the selecting further comprises:
   determining the first analysis modality from the plurality of analysis modalities based on at least one of a structure of the first user query, a type of the first user query, a syntax of the first user query, and a content of the first user query.

5. The method of claim 1, further comprising:
   selecting, based on a second user query, a second analysis modality from the plurality of analysis modalities for generating a response to the second user query;

navigating from the first analysis modality to the second analysis modality;

accessing a data set of the plurality of data sets associated with the second analysis modality; and generating a response to the second user query using the data set associated with the second analysis modality.

6. The method of claim 1, wherein the plurality of analysis modalities comprises the first analysis modality, a second analysis modality and a third analysis modality, and wherein the first analysis modality is associated with computing a time series of metrics using information extracted from the plurality of spans, wherein the second analysis modality is associated with aggregating metrics from a set of indexed tags associated with the plurality of spans and wherein the third analysis modality is associated with analyzing raw span data associated with the plurality of spans to analyze the performance of the application in response to the user-interaction.

7. The method of claim 1, wherein at least one analysis modality of the plurality of analysis modalities is associated with computing a time series of metrics associated with the user-interaction using information extracted from the plurality of spans and wherein at least one analysis modality of the plurality of analysis modalities is associated with sampling spans from the plurality of spans to analyze the performance of the application in response to the user-interaction.

8. The method of claim 1, wherein at least one analysis modality of the plurality of analysis modalities is associated with computing a time series of metrics associated with the user-interaction using information extracted from the plurality of spans.

9. The method of claim 1, wherein at least one analysis modality of the plurality of analysis modalities is associated with aggregating metrics from a set of indexed tags associated with the plurality of spans to analyze the performance of the application in response to the user-interaction.

10. The method of claim 1, wherein at least one analysis modality of the plurality of analysis modalities is associated with computing a time series of metrics associated with the user-interaction and performs analysis by:

mapping each span in the plurality of spans to a span identity, where the span identity comprises a plurality of attributes associated with a respective span; and computing the time series of metrics for the plurality of spans by aggregating the plurality of attributes associated with each span over the given time duration.

11. The method of claim 1, wherein at least one analysis modality of the plurality of analysis modalities is associated with aggregating metrics from a set of indexed tags associated with the plurality of spans and performs analysis by:

computing metrics data from the set of indexed tags extracted from the plurality of spans; and aggregating the metrics data to deliver a response to the first user query.

12. The method of claim 1, wherein at least one analysis modality of the plurality of analysis modalities performs analysis by:

storing exemplary spans from the plurality of spans associated with the user-interaction;

accessing one or more exemplary spans associated with the user-interaction in response to the first user query; and analyzing the one or more exemplary spans to extract metrics associated with the user-interaction.

13. The method of claim 1, wherein at least one analysis modality of the plurality of analysis modalities performs analysis by:

storing raw span information for the plurality of spans with corresponding metadata extracted from the plurality of spans, wherein the corresponding metadata comprises tag information associated with the plurality of spans;

grouping the plurality of spans using a session identifier associated with the plurality of spans; and querying the raw span information and metadata to analyze the performance of the application in response to the user-interaction.

14. The method of claim 1, wherein the first user query is directed to the user monitoring data and to application monitoring data associated with a backend of the application, and wherein the generating the response to the first user query further comprises:

retrieving information from the backend of the application, wherein the information comprises APM data; and consolidating the information from the backend of the application with the response to the first user query retrieved from the data set associated with the first analysis modality.

15. The method of claim 1, wherein the generating the plurality of data sets comprises:

generating a first data set associated with the first analysis modality from the plurality of analysis modalities, wherein the generating the first data set comprises:

indexing a plurality of tags from the plurality of spans; and generating metrics for pages and endpoints associated with the application by tracking a number of occurrences of at least one indexed tag from the plurality of tags in connection with a respective page or a respective endpoint over the given time duration.

16. The method of claim 1, wherein the generating the plurality of data sets comprises:

generating a first data set associated with the first analysis modality from the plurality of analysis modalities, wherein the generating the first data set comprises:

indexing a plurality of tags from the plurality of spans; and generating metrics for pages and endpoints associated with the application by tracking a number of occurrences of at least one indexed tag from the plurality of tags in connection with a respective page or a respective endpoint over the given time duration; and rendering an application topology graph for display in a GUI using the metrics.

17. The method of claim 1, wherein the generating the plurality of data sets comprises:

generating a first data set from the plurality of data sets associated with a first analysis modality from the plurality of analysis modalities, wherein the generating the first data set comprises:

indexing a plurality of tags from the plurality of spans;

determining an exemplary span for each combination of a page and associated endpoint;

extracting indexed tags corresponding to the exemplary span; and storing in memory the exemplary span and the indexed tags in connection with each combination of a page and associated endpoint.

18. The method of claim 1, wherein the plurality of data sets comprise a first data set associated with the first analysis modality, a second data set associated with a second analysis modality of the plurality of analysis modalities and a third data set associated with a third analysis modality of the plurality of analysis modalities, wherein the first data set is operable to store a time series of metrics computed from information extracted from the plurality of spans, wherein the second data set is operable to store metrics aggregated from a set of indexed tags associated with the plurality of spans and wherein the third data set is operable to store raw span data associated with the plurality of spans.

19. A non-transitory computer-readable medium having computer-readable program code embodied therein for causing a computer system to perform a method of persisting and querying user monitoring data, the method comprising:

grouping a plurality of spans associated with a user-interaction with an application and ingested during a given time duration, wherein the application corresponds to a frontend of a microservices based architecture;

generating a plurality of data sets each associated with a respective analysis modality of a plurality of analysis modalities using the plurality of spans, wherein each analysis modality extracts a different level of detail from the plurality of spans and provides a different degree of response resolution to user queries;

selecting, based on a first user query, a first analysis modality from the plurality of analysis modalities for generating a response to the first user query, wherein (i) the first analysis modality is associated with computing a time series of metrics using a first information extracted from the plurality of spans, the first information including a tuple of attributes that summarize the plurality of spans, (ii) a second analysis modality is associated with aggregating metrics from a set of indexed tags associated with a subset of the plurality of spans corresponding to cross-service calls, and (iii) a third analysis modality is associated with analyzing raw span data associated with the plurality of spans to analyze a performance of the application in response to the user-interaction;

accessing a data set of the plurality of data sets that is associated with the first analysis modality; and generating the response to the first user query using the data set associated with the first analysis modality, wherein the first user query requests information pertaining to the performance of the application in response to the user-interaction.

20. A system for performing a method for persisting and querying user monitoring data, the system comprising:

a processing device communicatively coupled with a memory and configured to:

group a plurality of spans associated with a user-interaction with an application and ingested during a given time duration, wherein the application corresponds to a frontend of a microservices based architecture;

generate a plurality of data sets each associated with a respective analysis modality of a plurality of analysis modalities using the plurality of spans, wherein each analysis modality extracts a different level of detail from the plurality of spans and provides a different degree of response resolution to user queries;

select, based on a first user query, a first analysis modality from the plurality of analysis modalities for generating a response to the first user query, wherein (i) the first analysis modality is associated with computing a time series of metrics using a first information extracted from the plurality of spans, the first information including a tuple of attributes that summarize the plurality of spans, (ii) a second analysis modality is associated with aggregating metrics from a set of indexed tags associated with a subset of the plurality of spans corresponding to cross-service calls, and (iii) a third analysis modality is associated with analyzing raw span data associated with the plurality of spans to analyze a performance of the application in response to the user-interaction;

access a data set of the plurality of data sets that is associated with the first analysis modality; and generate the response to the first user query using the data set associated with the first analysis modality, wherein the first user query requests information pertaining to the performance of the application in response to the user-interaction.

* * * * *